United States Patent
Speier

(10) Patent No.: US 9,206,956 B2
(45) Date of Patent: Dec. 8, 2015

(54) ILLUMINATION DEVICE PROVIDING DIRECT AND INDIRECT ILLUMINATION

(71) Applicant: Quarkstar LLC, Las Vegas, NV (US)

(72) Inventor: Ingo Speier, Saanichton (CA)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 14/417,774

(22) PCT Filed: Feb. 7, 2014

(86) PCT No.: PCT/US2014/015346
§ 371 (c)(1),
(2) Date: Jan. 27, 2015

(87) PCT Pub. No.: WO2014/124285
PCT Pub. Date: Aug. 14, 2014

(65) Prior Publication Data
US 2015/0211710 A1    Jul. 30, 2015

Related U.S. Application Data

(60) Provisional application No. 61/762,507, filed on Feb. 8, 2013.

(51) Int. Cl.
*F21V 7/00* (2006.01)
*F21V 13/00* (2006.01)
(Continued)

(52) U.S. Cl.
CPC .............. *F21V 7/0016* (2013.01); *F21V 13/02* (2013.01); *G02B 6/0055* (2013.01);
(Continued)

(58) Field of Classification Search
CPC .. F21V 7/00–7/22; F21V 13/00; F21V 13/02; G02B 6/0055; G02B 6/0063; F21Y 2101/02; F21S 8/00–8/12; F21S 10/00–10/066
See application file for complete search history.

(56) References Cited

U.S. PATENT DOCUMENTS 2,194,841 A    3/1940   Welch
2,626,120 A    1/1953   Baker
(Continued)

FOREIGN PATENT DOCUMENTS

CA    2 702 690         11/2010
DE    19917401 A1       10/2000
(Continued)

OTHER PUBLICATIONS

Notification of Transmittal of the International Search Report and the Written Opinion of the International Searching Authority, International Application No. PCT/US2014/015346, mailed Sep. 19, 2014, 15 pages.

(Continued)

*Primary Examiner* — Jong-Suk (James) Lee
*Assistant Examiner* — Colin Cattanach
(74) *Attorney, Agent, or Firm* — Fish & Richardson P.C.

(57) ABSTRACT

A variety of illumination devices are disclosed that are configured and arranged to output a direct intensity distribution onto work surfaces and an indirect intensity distribution towards background regions. The illumination devices include direct and indirect optical components configured to provide direct and indirect illumination. The illumination devices can be configured to allow interdependent as well as independent control of the direct and indirect illumination, e.g., by a user or by pre-programmed internal or external control circuitry.

17 Claims, 29 Drawing Sheets

(51) Int. Cl.
*F21V 8/00* (2006.01)
*F21V 13/02* (2006.01)
*F21S 4/00* (2006.01)

(52) U.S. Cl.
CPC ............... *G02B 6/0063* (2013.01); *F21S 4/00* (2013.01); *F21V 7/00* (2013.01); *F21V 7/0008* (2013.01); *F21V 13/00* (2013.01)

(56) References Cited

U.S. PATENT DOCUMENTS

| | | | |
|---|---|---|---|
| 3,772,506 A * | 11/1973 | Junginger | ............... 362/572 |
| 3,836,767 A | 9/1974 | Lasker | |
| 4,112,483 A | 9/1978 | Small et al. | |
| 4,240,692 A | 12/1980 | Winston | |
| 4,254,456 A | 3/1981 | Grindle et al. | |
| 4,271,408 A | 6/1981 | Teshima et al. | |
| 4,358,817 A | 11/1982 | Bielemeier | |
| 5,075,827 A | 12/1991 | Smith | |
| 5,134,550 A | 7/1992 | Young | |
| 5,289,356 A | 2/1994 | Winston | |
| 5,436,805 A | 7/1995 | Hsu et al. | |
| 5,438,485 A | 8/1995 | Li et al. | |
| 5,810,463 A | 9/1998 | Kawahara et al. | |
| 5,868,489 A | 2/1999 | Fuller et al. | |
| 5,988,836 A | 11/1999 | Swarens | |
| 6,058,271 A | 5/2000 | Tenmyo | |
| 6,234,643 B1 | 5/2001 | Lichon | |
| 6,241,369 B1 | 6/2001 | Mackiewicz | |
| 6,273,577 B1 | 8/2001 | Goto et al. | |
| 6,350,041 B1 | 2/2002 | Tarsa et al. | |
| 6,441,943 B1 | 8/2002 | Roberts et al. | |
| 6,505,953 B1 | 1/2003 | Dahlen | |
| 6,527,420 B1 | 3/2003 | Chuang | |
| 6,540,373 B2 | 4/2003 | Bailey | |
| 6,543,911 B1 | 4/2003 | Rizkin et al. | |
| 6,572,246 B1 | 6/2003 | Hopp et al. | |
| 6,598,998 B2 | 7/2003 | West et al. | |
| 6,834,979 B1 | 12/2004 | Cleaver et al. | |
| 6,880,963 B2 | 4/2005 | Luig et al. | |
| 6,932,499 B2 | 8/2005 | Ogura | |
| 7,083,315 B2 | 8/2006 | Hansler et al. | |
| 7,097,337 B2 | 8/2006 | Kim et al. | |
| 7,156,540 B2 | 1/2007 | Haines | |
| 7,164,842 B2 | 1/2007 | Chen | |
| 7,182,480 B2 | 2/2007 | Kan | |
| 7,259,403 B2 | 8/2007 | Shimizu et al. | |
| 7,275,841 B2 | 10/2007 | Kelly | |
| 7,286,296 B2 | 10/2007 | Chaves et al. | |
| 7,290,906 B2 | 11/2007 | Suzuki et al. | |
| 7,293,889 B2 | 11/2007 | Kamiya | |
| 7,331,691 B2 | 2/2008 | Livesay et al. | |
| 7,334,932 B2 | 2/2008 | Klettke | |
| 7,341,358 B2 | 3/2008 | Hsieh et al. | |
| 7,386,214 B1 | 6/2008 | Canciotto | |
| 7,387,399 B2 | 6/2008 | Noh et al. | |
| 7,434,951 B2 | 10/2008 | Bienick | |
| 7,530,712 B2 | 5/2009 | Lin et al. | |
| 7,645,054 B2 | 1/2010 | Goihl | |
| 7,850,347 B2 | 12/2010 | Speier et al. | |
| 7,855,815 B2 | 12/2010 | Hayashide et al. | |
| 7,942,546 B2 | 5/2011 | Naijo et al. | |
| 7,947,915 B2 | 5/2011 | Lee et al. | |
| 7,967,477 B2 | 6/2011 | Bloemen et al. | |
| 8,002,446 B1 | 8/2011 | Plunk et al. | |
| 8,006,453 B2 | 8/2011 | Anderson | |
| 8,042,968 B2 | 10/2011 | Boyer et al. | |
| 8,061,867 B2 | 11/2011 | Kim et al. | |
| 8,068,707 B1 | 11/2011 | Simon | |
| 8,075,147 B2 | 12/2011 | Chaves et al. | |
| 8,192,051 B2 | 6/2012 | Dau et al. | |
| 8,348,489 B2 | 1/2013 | Holman et al. | |
| 8,573,823 B2 | 11/2013 | Dau | |
| 8,740,407 B2 | 6/2014 | Kotovsky et al. | |
| 2003/0117798 A1 | 6/2003 | Leysath | |
| 2004/0012976 A1 | 1/2004 | Amano | |
| 2004/0080947 A1 | 4/2004 | Subisak et al. | |
| 2004/0105264 A1 | 6/2004 | Spero | |
| 2004/0120160 A1 * | 6/2004 | Natsume | ............... 362/544 |
| 2004/0137189 A1 | 7/2004 | Tellini et al. | |
| 2004/0208019 A1 | 10/2004 | Koizumi | |
| 2004/0228131 A1 | 11/2004 | Minano et al. | |
| 2004/0257803 A1 | 12/2004 | Kermoade | |
| 2005/0057922 A1 | 3/2005 | Herst et al. | |
| 2005/0063169 A1 | 3/2005 | Erber | |
| 2005/0111235 A1 | 5/2005 | Suzuki et al. | |
| 2005/0185416 A1 | 8/2005 | Lee et al. | |
| 2005/0207177 A1 | 9/2005 | Guy | |
| 2005/0243570 A1 | 11/2005 | Chaves et al. | |
| 2005/0265044 A1 | 12/2005 | Chen et al. | |
| 2005/0270774 A1 | 12/2005 | Pan | |
| 2006/0061990 A1 | 3/2006 | Chinniah et al. | |
| 2006/0076568 A1 | 4/2006 | Keller et al. | |
| 2006/0098444 A1 | 5/2006 | Petruzzi | |
| 2006/0139917 A1 | 6/2006 | Ward | |
| 2006/0164839 A1 | 7/2006 | Stefanov | |
| 2006/0187661 A1 | 8/2006 | Holten | |
| 2007/0047228 A1 | 3/2007 | Thompson et al. | |
| 2007/0061360 A1 | 3/2007 | Holcombe et al. | |
| 2007/0081360 A1 | 4/2007 | Bailey | |
| 2007/0097696 A1 | 5/2007 | Eng et al. | |
| 2007/0201234 A1 | 8/2007 | Ottermann | |
| 2007/0280593 A1 | 12/2007 | Brychell et al. | |
| 2008/0074752 A1 | 3/2008 | Chaves et al. | |
| 2008/0080166 A1 | 4/2008 | Duong et al. | |
| 2008/0170398 A1 | 7/2008 | Kim | |
| 2008/0192458 A1 | 8/2008 | Li | |
| 2008/0198603 A1 | 8/2008 | Sormani et al. | |
| 2009/0103293 A1 | 4/2009 | Harbers et al. | |
| 2009/0168395 A1 | 7/2009 | Mrakovich et al. | |
| 2009/0201698 A1 | 8/2009 | Klick et al. | |
| 2009/0231831 A1 | 9/2009 | Hsiao | |
| 2009/0231878 A1 | 9/2009 | Van Duijneveldt | |
| 2009/0316414 A1 | 12/2009 | Yang | |
| 2010/0085773 A1 | 4/2010 | Richardson | |
| 2010/0220497 A1 | 9/2010 | Ngai | |
| 2011/0063870 A1 | 3/2011 | Nomoto et al. | |
| 2011/0103067 A1 | 5/2011 | Ago et al. | |
| 2011/0164398 A1 | 7/2011 | Holten et al. | |
| 2011/0175533 A1 | 7/2011 | Holman et al. | |
| 2011/0182084 A1 | 7/2011 | Tomlinson | |
| 2011/0199005 A1 | 8/2011 | Bretschneider et al. | |
| 2011/0227487 A1 | 9/2011 | Nichol et al. | |
| 2011/0234121 A1 | 9/2011 | Ding et al. | |
| 2011/0235318 A1 | 9/2011 | Simon | |
| 2011/0267836 A1 | 11/2011 | Boonekamp et al. | |
| 2011/0273900 A1 | 11/2011 | Li et al. | |
| 2011/0286200 A1 | 11/2011 | Iimura | |
| 2012/0020066 A1 | 1/2012 | Chang | |
| 2012/0044675 A1 | 2/2012 | Buelow et al. | |
| 2012/0069595 A1 | 3/2012 | Catalano | |
| 2012/0099310 A1 | 4/2012 | Kropac et al. | |
| 2012/0147624 A1 | 6/2012 | Li et al. | |
| 2012/0155110 A1 | 6/2012 | Pijlman et al. | |
| 2012/0155116 A1 | 6/2012 | Gardner | |
| 2012/0170260 A1 | 7/2012 | Gardner | |
| 2012/0236586 A1 | 9/2012 | Wang | |
| 2012/0250346 A1 | 10/2012 | Williams | |
| 2012/0268966 A1 | 10/2012 | McCollum et al. | |
| 2012/0281432 A1 | 11/2012 | Parker et al. | |
| 2012/0294037 A1 | 11/2012 | Holman et al. | |
| 2013/0039041 A1 * | 2/2013 | Yeh et al. | ............... 362/147 |
| 2013/0208495 A1 | 8/2013 | Dau | |
| 2013/0272015 A1 | 10/2013 | Weaver | |
| 2014/0126236 A1 | 5/2014 | Speier | |

FOREIGN PATENT DOCUMENTS

| | | |
|---|---|---|
| DE | 10 2011 001 769 | 10/2012 |
| EP | 1 182 395 | 2/2002 |
| EP | 2 163 701 | 3/2010 |
| EP | 2 196 725 | 6/2010 |
| EP | 2264359 A2 | 12/2010 |
| EP | 2 439 564 | 4/2012 |

(56) References Cited

FOREIGN PATENT DOCUMENTS

| FR | 2784739 | 4/2000 |
|---|---|---|
| FR | 2934353 | 1/2010 |
| WO | WO 01/07828 | 2/2001 |
| WO | WO 03/009012 | 1/2003 |
| WO | WO 2005/073629 | 8/2005 |
| WO | WO 2005/090854 | 9/2005 |
| WO | WO 2008/007315 | 1/2008 |
| WO | WO 2008/047278 | 4/2008 |
| WO | WO 2008/139383 | 11/2008 |
| WO | WO 2009/105168 | 8/2009 |
| WO | WO 2010/079391 | 7/2010 |
| WO | WO 2010/113091 | 10/2010 |
| WO | WO 2012/131560 | 10/2010 |
| WO | WO 2011/112914 | 9/2011 |
| WO | WO 2012/093126 | 7/2012 |
| WO | WO 2012/176352 | 12/2012 |
| WO | WO 2013/023008 | 2/2013 |
| WO | WO 2013/066822 | 5/2013 |
| WO | WO 2013/154835 | 10/2013 |

OTHER PUBLICATIONS

Authorized Officer Blaine R. Copenheaver, Notification of Transmittal of the International Search Report and the Written Opinion of the International Searching Authority, International Application No. PCT/US2013/059416, mailed Feb. 19, 2014, 9 pages.

Authorized Officer Blaine R. Copenheaver, Notification of Transmittal of the International Search Report and the Written Opinion of the International Searching Authority, International Application No. PCT/US2014/015255, mailed May 19, 2014, 12 pages.

Authorized Officer Shane Thomas, Notification of Transmittal of International Search Report and Written Opinion, International Application No. PCT/US14/15707, mailed May 29, 2014, 21 pages.

Authorized Officer Shane Thomas, Notification of Transmittal of International Search Report and Written Opinion, International Application No. PCT/US14/27583, mailed Jul. 24, 2014, 12 pages.

Supplementary European Search Report for European Patent Application No. 12822822.8, mailed Jul. 4, 2014, 3 pages.

Thomas, "International Search Report and Written Opinion" from co-pending PCT Application No. PCT/US13/24525 dated Apr. 16, 2013, 16 pages.

Young, "International Search Report and Written Opinion" from co-pending PCT Application No. PCT/US12/50046 dated Oct. 26, 2012, 34 pages.

http://www.everlight.com/datasheets/OL-Flat_Series_Data_Sheet_v5.pdf, "Datasheet: Office Lighting Flat Luminaire Series", product catalog, Everlight, Issue No. DBM-0000054_v5, May 5, 2011, pp. 1-5.

Philips Lighting Company, "Philips EnduraLED Candle LED Lamps", Downloaded from the internet at: www.lighting.philips.com/us_en/browseliterature/download/p-6027 on Jan. 27, 2012, 2 pages (2010).

* cited by examiner

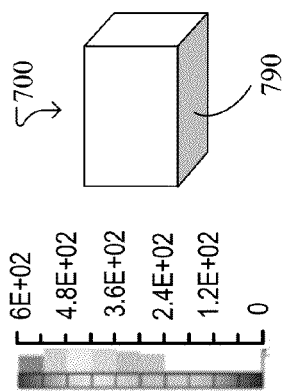
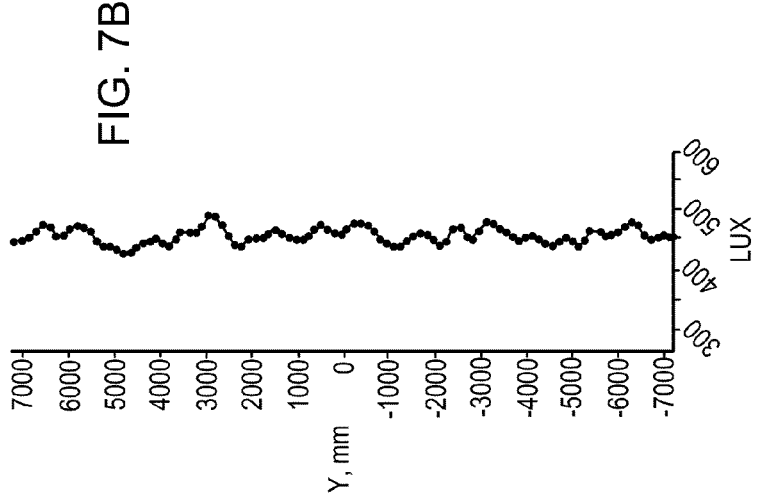
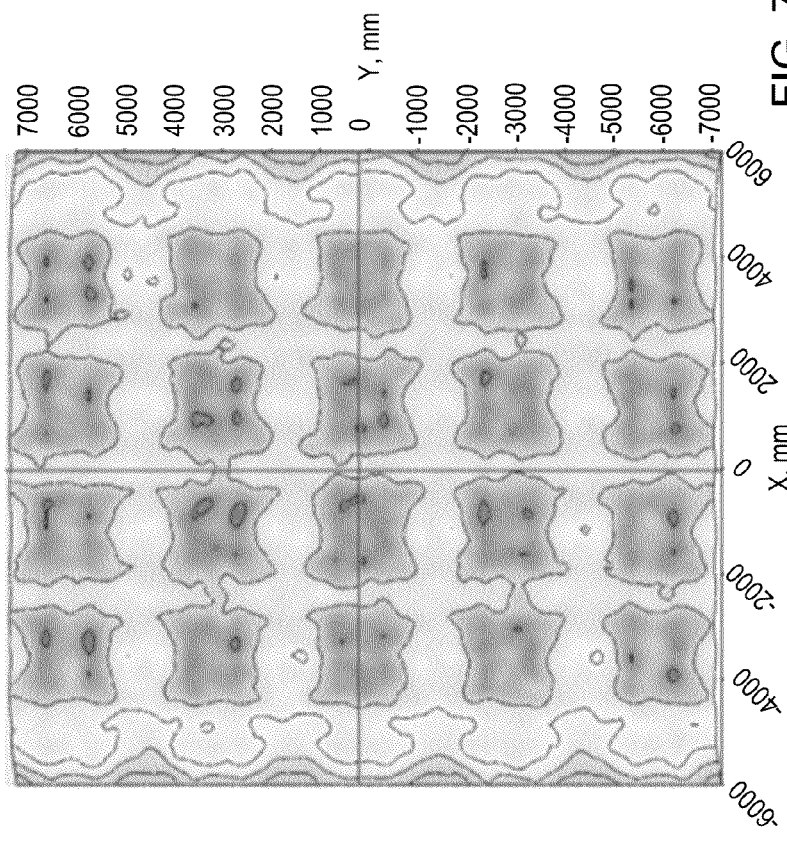
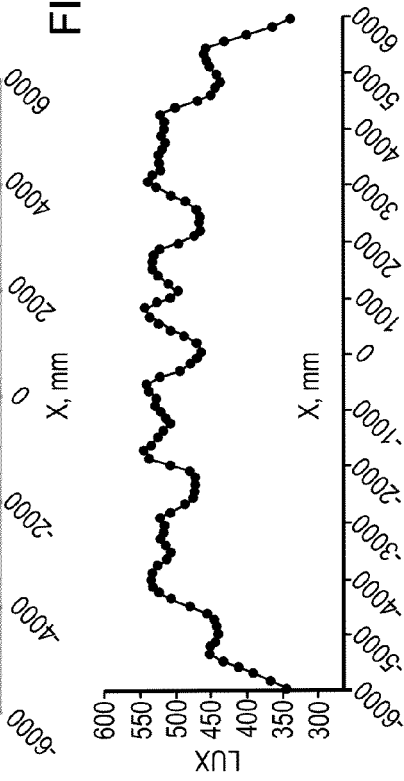

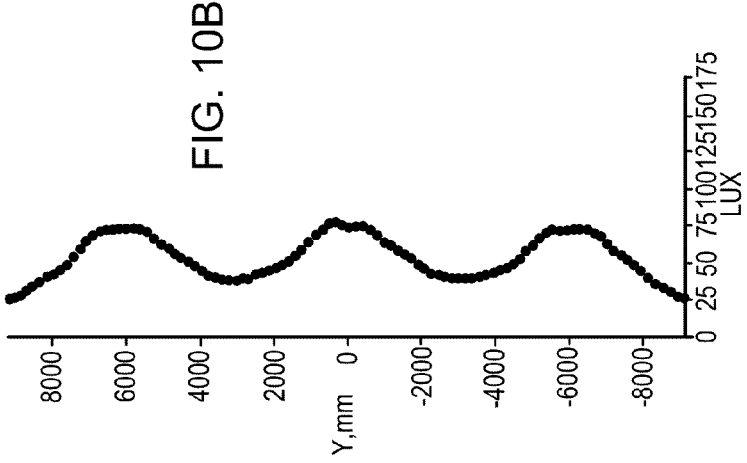
FIG. 10B
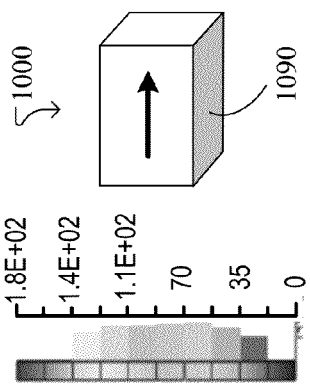
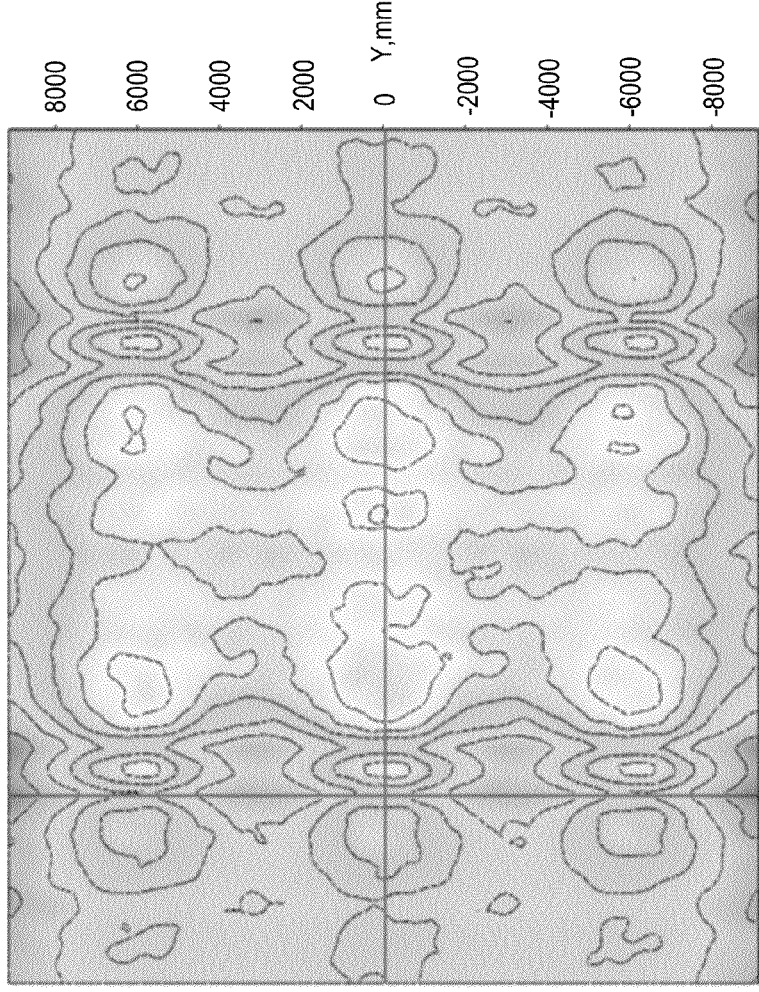
FIG. 10A
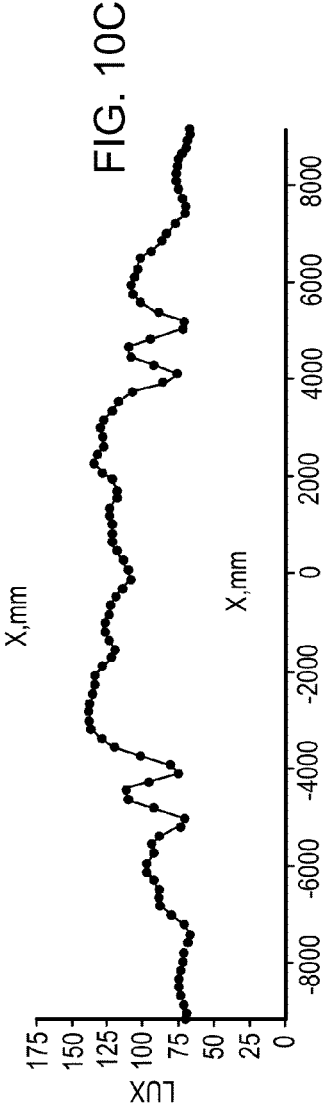
FIG. 10C

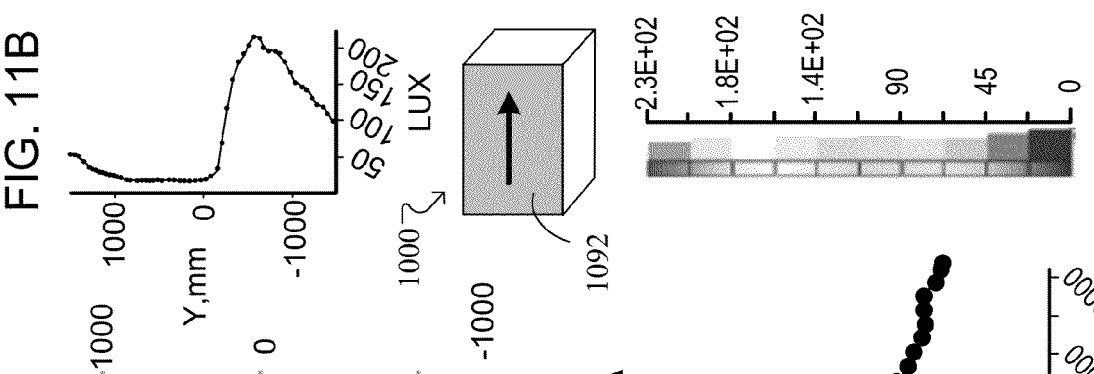
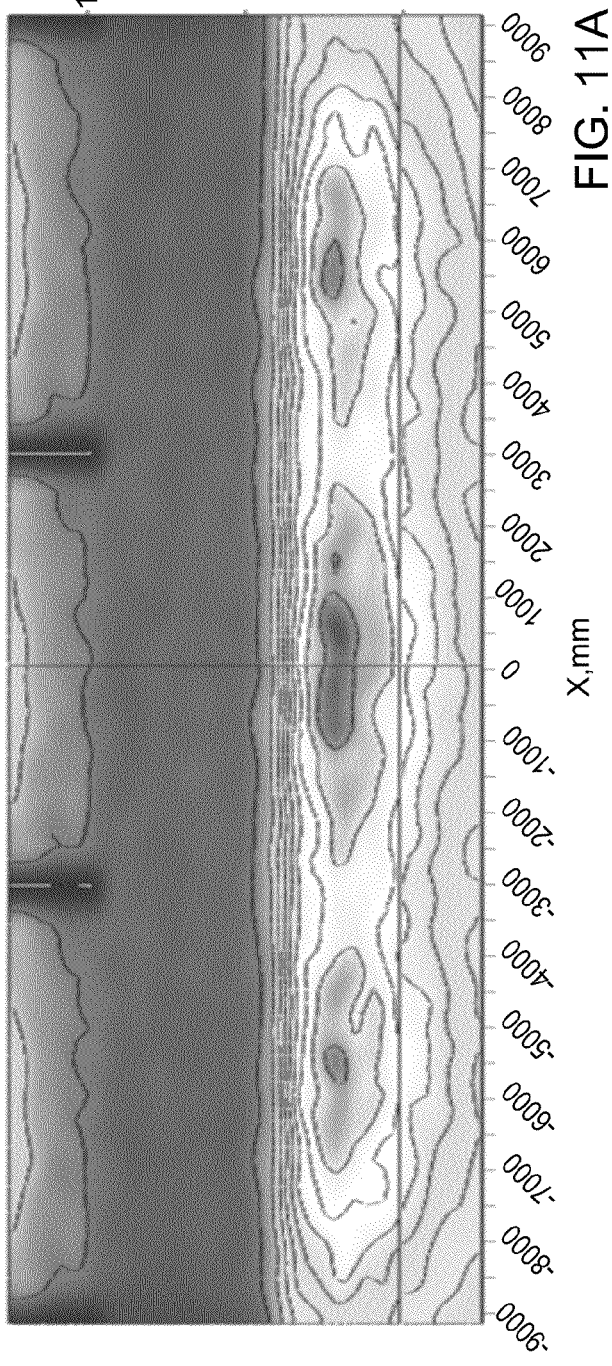
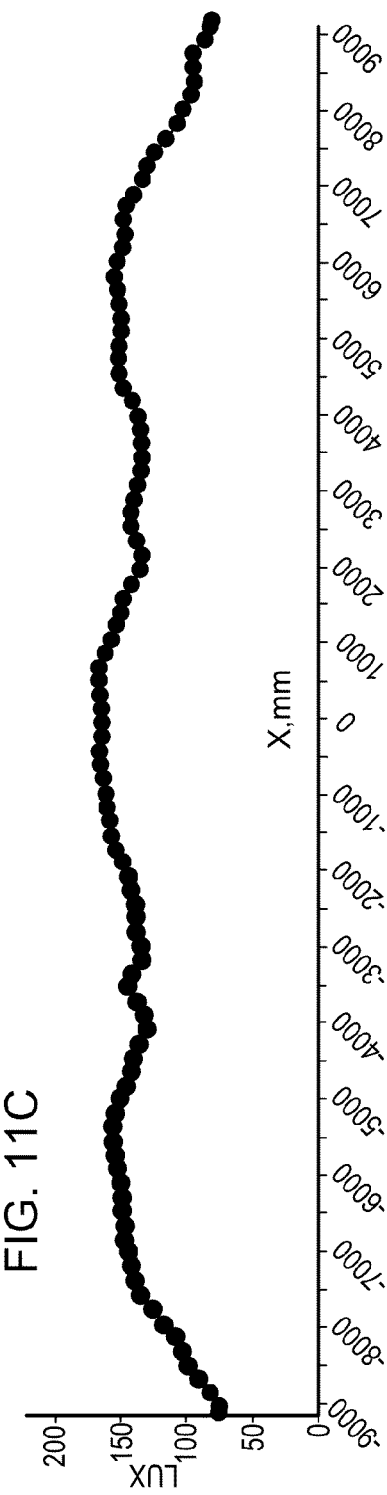
FIG. 11A
FIG. 11B
FIG. 11C

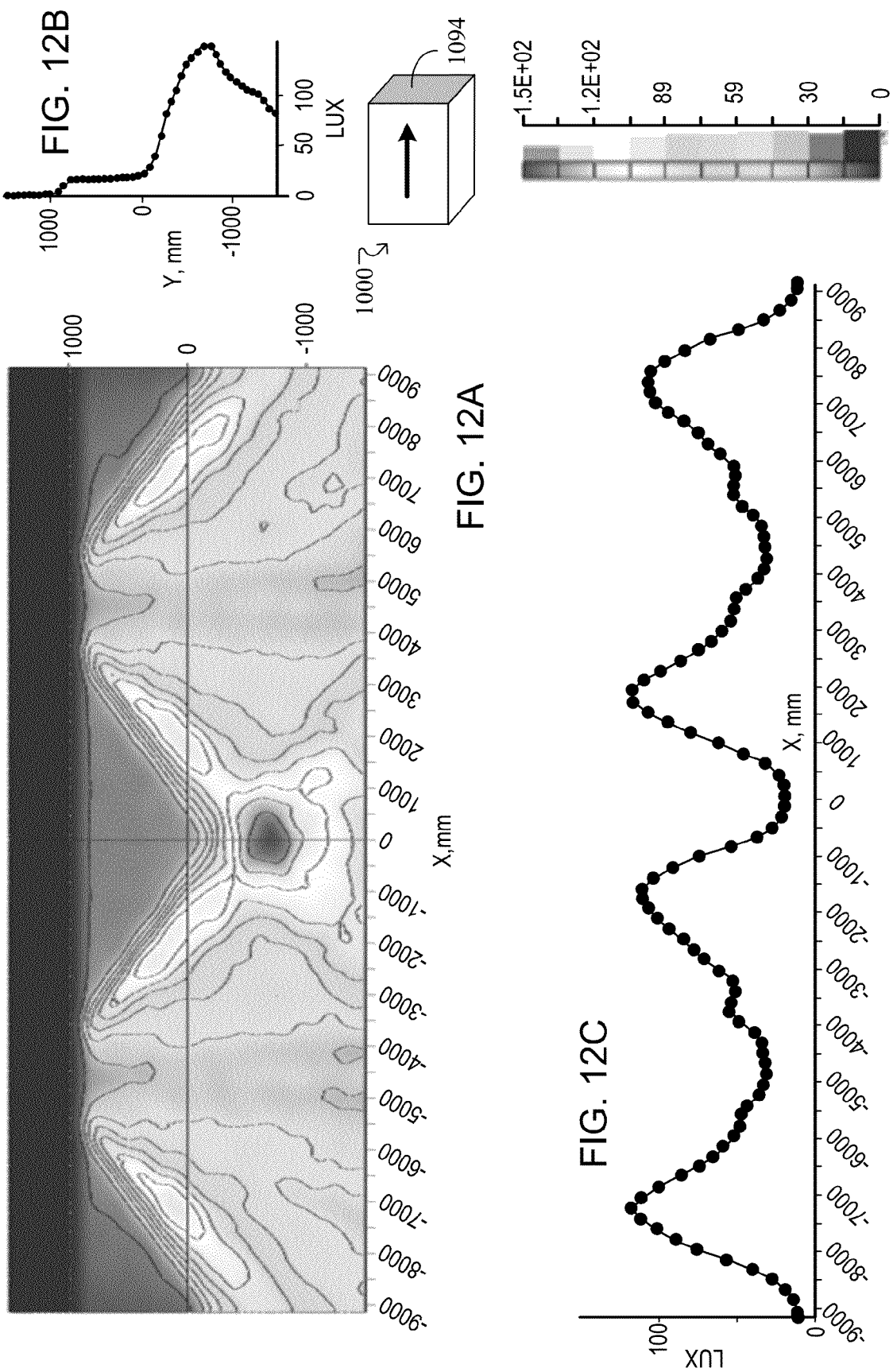

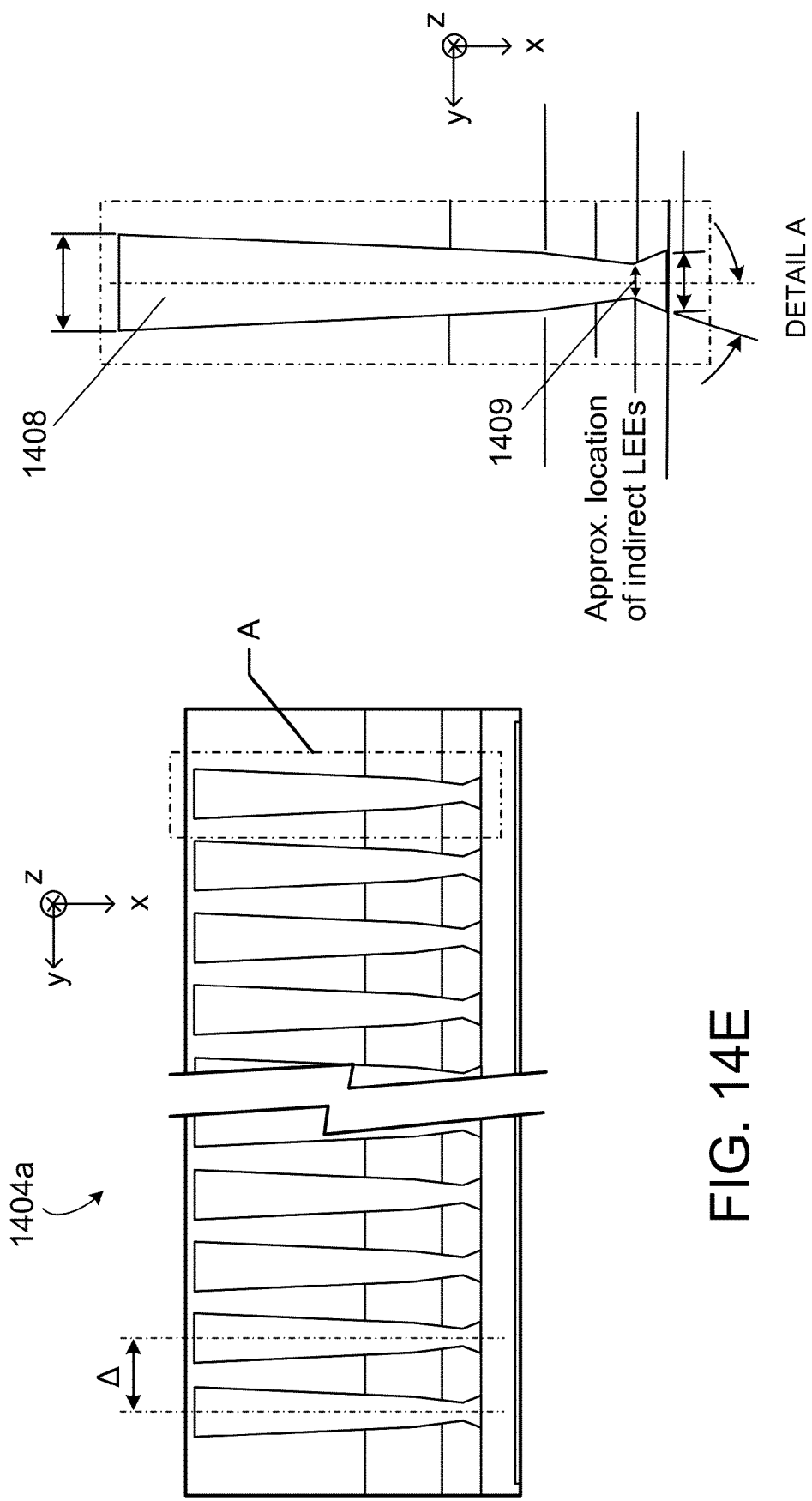

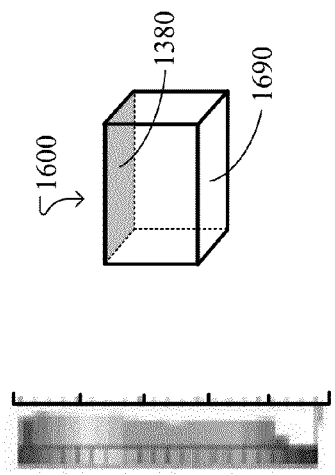
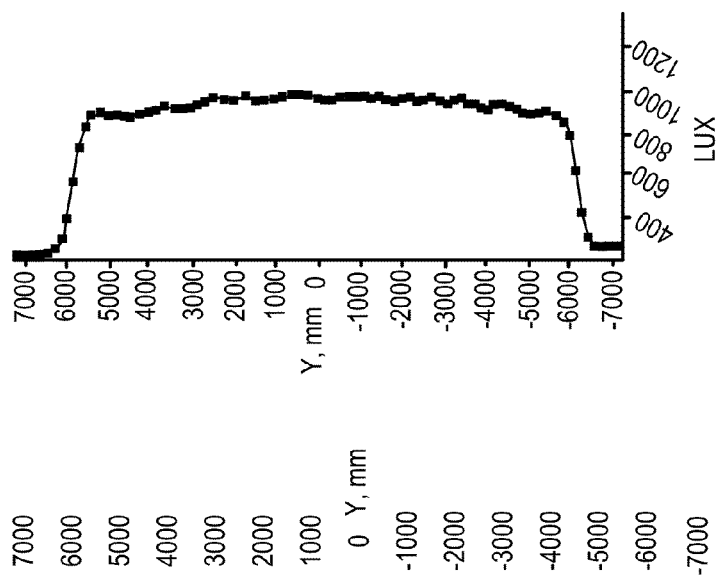
FIG. 16B
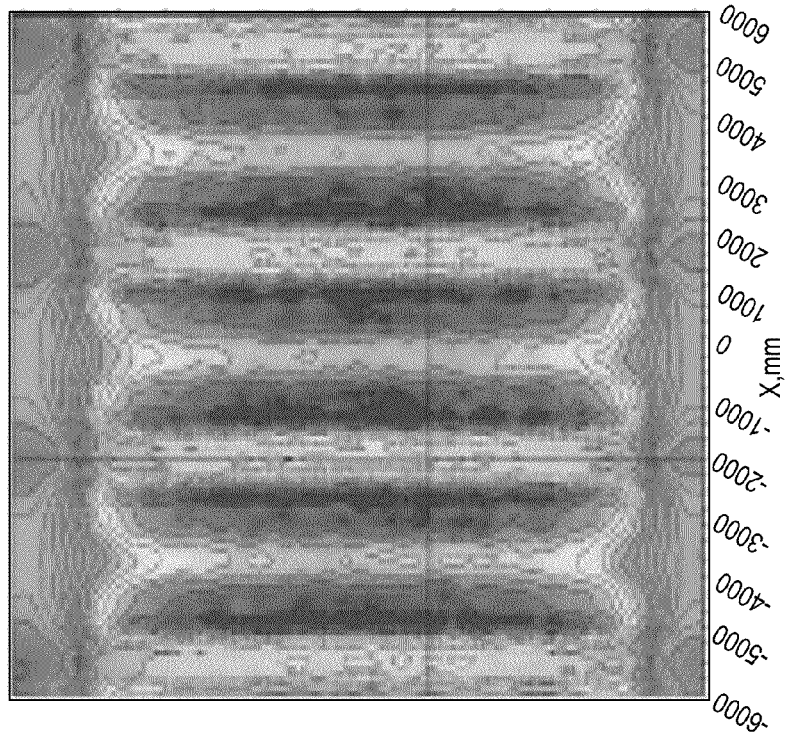
FIG. 16A
FIG. 16C

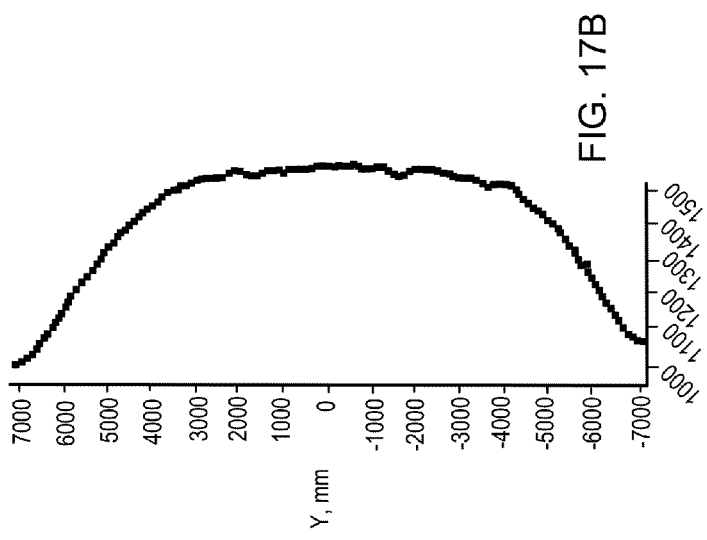
FIG. 17B
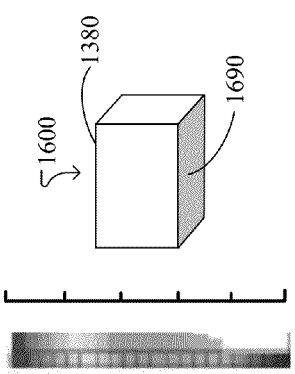
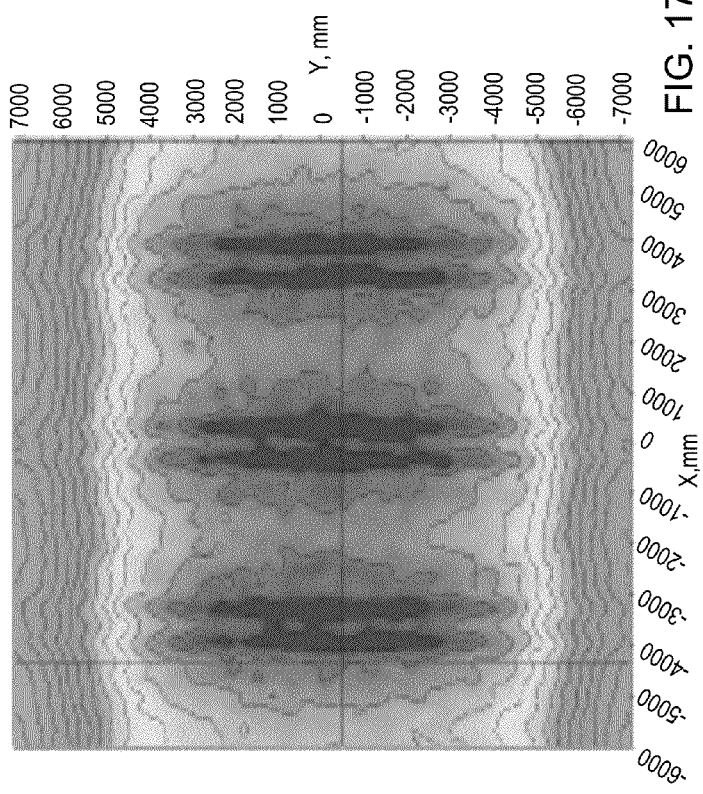
FIG. 17A
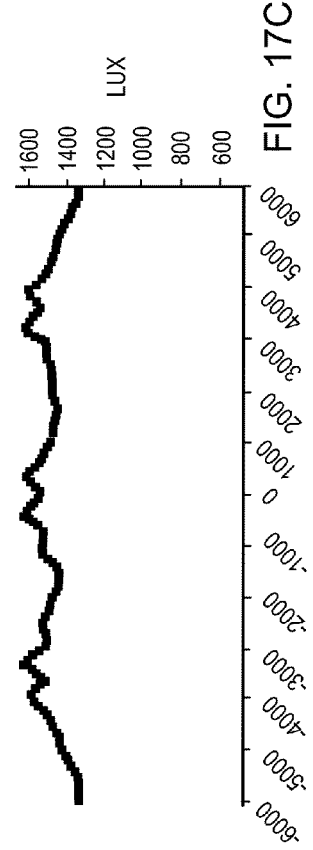
FIG. 17C

ILLUMINATION DEVICE PROVIDING DIRECT AND INDIRECT ILLUMINATION

CROSS-REFERENCE TO RELATED APPLICATIONS

This application is a U.S. National Stage of International Application No. PCT/US2014/015346, filed Feb. 7, 2014, which claims benefit under 35 U.S.C. §119(e)(1) of U.S. Provisional Application No. 61/762,507, filed on Feb. 8, 2013, which are incorporated by reference herein.

TECHNICAL FIELD

The present disclosure relates to illumination devices providing direct illumination onto work surfaces and an indirect illumination towards background regions.

BACKGROUND

Light sources are used in a variety of applications, such as providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and solid state light sources, such as light-emitting diodes (LEDs).

SUMMARY

The present disclosure relates to illumination devices configured and arranged to output a direct intensity distribution onto work surfaces and an indirect intensity distribution towards background regions.

In general, innovative aspects of the technologies described herein can be implemented in an illumination device that includes one or more of the following aspects:

In general aspect 1, an illumination device comprises: a mount having a first surface, the first surface being elongated and having a longitudinal dimension and a transverse dimension shorter than the longitudinal dimension; a direct illumination portion of the illumination device supported by the mount; and an indirect illumination portion of the illumination device supported by the mount, wherein the direct portion of the illumination device comprises multiple direct light-emitting elements (LEEs) operatively disposed along the first surface of the mount and distributed along the longitudinal dimension, such that the direct LEEs emit, during operation, light in a first direct angular range with respect to a normal to the first surface of the mount, and direct optics arranged in an elongated configuration along the longitudinal dimension of the first surface and optically coupled with the direct LEEs, the direct optics configured to redirect light received from the direct LEEs in the first direct angular range, and to output the redirected light in a second direct angular range, wherein (i) a divergence of the second direct angular range is smaller than a divergence of the first direct angular range at least in a plane perpendicular to the longitudinal dimension of the first surface of the mount, (ii) a prevalent direction of propagation of light in the second direct angular range has a non-zero component parallel with the normal to the first surface of the mount, wherein the indirect portion of the illumination device comprises multiple indirect LEEs operatively disposed along another surface of the mount different from the first surface and distributed along the longitudinal dimension, such that the indirect LEEs emit, during operation, light in a first indirect angular range with respect to a normal to the first surface of the mount, and indirect optics arranged in an elongated configuration along the longitudinal dimension of the first surface and optically coupled with the indirect LEEs, the indirect optics configured to redirect light received from the indirect LEEs in the first indirect angular range, and to output the redirected light in a second indirect angular range, wherein (i) a divergence of the second indirect angular range is smaller than a divergence of the first indirect angular range at least in a plane perpendicular to the longitudinal dimension of the first surface of the mount, and (ii) a prevalent direction of propagation of light in the second indirect angular range has a non-zero component antiparallel with the normal to the first surface of the mount, and wherein the multiple indirect LEEs are powered independently from the direct LEEs.

The illumination device of general aspect 1 may provide direct illumination to a target surface and indirect illumination to background surfaces. Light scattered from the background surfaces may further illuminate the target surface as indirect or ambient light. The described illumination device can be configured to allow interdependent as well as independent control of the direct and indirect illumination by a user. For example, the illumination device may be powered to provide only direct illumination, only indirect illumination, or both direct and indirect illumination together (e.g. simultaneously). Furthermore, lobes of the intensity distribution output by the described direct and indirect portions of the illumination device may be interdependently or independently controllable. For interdependent control, the intensity of multiple lobes, for example, may be varied together. For independent control, the intensity of one lobe may be varied without changing the intensity of other lobes, for example.

Moreover, intensity profiles of light output by the described illumination device of general aspect 1 can be configured to reduce or avoid glare. For example, the direct illumination, indirect illumination, or both, can be directed into angular ranges outside of those ranges generally considered to correspond to glare (e.g., for direct illumination, angles greater than about 40° with respect to an axis perpendicular to the ceiling). Alternatively, or additionally, components of the described illumination device can be configured to mix light emitted from multiple point-like sources, such that direct and/or indirect illumination output thereby have specifiable luminance and/or color uniformities. Some of these advantages may be further enhanced or augmented by additional advantages by one or more of the following aspects.

Aspect 2 according to aspect 1, wherein the direct optics comprise a light guide, a redirecting surface and one or more direct secondary reflectors, such that the light guide guides light emitted by the direct LEEs from an input end to an output end of the light guide, the light guided by the light guide is reflected by the redirecting surface to the one or more direct secondary reflectors, a direction of propagation of the light reflected by the redirecting surface has a non-zero component antiparallel with the normal to the first surface of the mount, and the light reflected by the redirecting surface is reflected by the one or more direct secondary reflectors at least in the second direct angular range as direct illumination provided by the illumination device.

Aspect 3 according to aspect 2, wherein the one or more direct secondary reflectors comprise two direct secondary reflectors, the light reflected by the redirecting surface is reflected by the two direct secondary reflectors in the second direct angular range and in a third direct angular range as direct illumination provided by the illumination device, and prevalent directions of propagation of light in both the second and third direct angular ranges have non-zero components parallel with the normal to the first surface of the mount and have non-zero components perpendicular to the normal to the first surface of the mount that are antiparallel with each other.

Aspect 4 according to any one of aspects 1 to 3, wherein the multiple indirect LEEs comprise a first set of multiple indirect LEEs that emit light in the first indirect angular range, such that prevalent direction of propagation of light in the first indirect angular range is oblique relative to the normal to the first surface of the mount, and the indirect optics comprise a first indirect reflector that reflects the light emitted by the first set of multiple indirect LEEs in the first indirect angular range in the second indirect angular range, such that a prevalent direction of propagation of light output as indirect illumination provided by the illumination device in the second indirect angular range has a non-zero component antiparallel with the normal to the first surface of the mount.

Aspect 5 according to aspect 4, wherein the multiple indirect LEEs further comprise a second set of multiple indirect LEEs that emit light in a third indirect angular range, such that prevalent directions of propagation of light in the first and third indirect angular ranges are oblique relative to the normal to the first surface of the mount, and have non-zero components perpendicular to the normal to the first surface of the mount that are antiparallel with each other, and the indirect optics further comprise a second indirect reflector that reflects the light emitted by the second set of multiple indirect LEEs in the third indirect angular range in a fourth indirect angular range, such that prevalent directions of propagation of light output as indirect illumination provided by the illumination device in both the second and fourth indirect angular ranges have non-zero components antiparallel with the normal to the first surface of the mount and have non-zero components perpendicular to the normal to the first surface of the mount that are antiparallel with each other.

Aspect 6 according to any one of aspects 4 to 5, wherein the indirect optics further comprise a third indirect reflector, such that the first and third indirect reflectors reflect the light emitted by the first set of multiple indirect LEEs in the first indirect angular range in the second indirect angular range.

Aspect 7 according to any one of aspects 5 to 6, wherein the indirect optics further comprise a third indirect reflector and a fourth indirect reflector, such that the first and third indirect reflectors reflect the light emitted by the first set of multiple indirect LEEs in the first indirect angular range in the second indirect angular range, and the second and fourth indirect reflectors reflect the light emitted by the second set of multiple indirect LEEs in the third indirect angular range in the fourth indirect angular range.

Aspect 8 according to any one of aspects 6 to 7, wherein the third indirect reflector has apertures that allow light reflected by the first indirect reflector in a fifth angular range to pass through the apertures of the third indirect reflector, such that a prevalent direction of propagation of light output as indirect illumination provided by the illumination device in the fifth indirect angular range has a non-zero component antiparallel with the normal to the first surface of the mount.

Aspect 9 according to any one of aspects 7 to 8, wherein the third indirect reflector has apertures that allow light reflected by the first indirect reflector in a fifth angular range to pass through the apertures of the third indirect reflector, and the fourth indirect reflector has apertures that allow light reflected by the second indirect reflector in a sixth angular range to pass through the apertures of the fourth indirect reflector, such that prevalent directions of propagation of light output as indirect illumination provided by the illumination device in both the fifth and sixth indirect angular ranges have non-zero components antiparallel with the normal to the first surface of the mount and have non-zero components perpendicular to the normal to the first surface of the mount that are antiparallel with each other.

Aspect 10 according to any one of aspects 1 to 9, wherein the multiple indirect LEEs comprise a first set of multiple indirect LEEs that emit light in the first indirect angular range, such that a prevalent direction of propagation of light in the first indirect angular range is antiparallel with the normal to the first surface of the mount, and the indirect optics comprise a first indirect reflector that reflects the light emitted by the first set of multiple indirect LEEs in the first indirect angular range in the second indirect angular range, such that prevalent directions of propagation of light output as indirect illumination provided by the illumination device in the second indirect angular range has a non-zero component antiparallel with the normal to the first surface of the mount.

Aspect 11 according to aspect 10, wherein the multiple indirect LEEs further comprise a second set of multiple indirect LEEs that emit light in a third indirect angular range, such that a prevalent direction of propagation of light in the third indirect angular range is antiparallel with the normal to the first surface of the mount, and the indirect optics comprise a second indirect reflector that reflects the light emitted by the second set of multiple indirect LEEs in the third indirect angular range in a fourth indirect angular range, such that prevalent directions of propagation of light output as indirect illumination provided by the illumination device in both the second and fourth indirect angular ranges have non-zero components antiparallel with the normal to the first surface of the mount and have non-zero components perpendicular to the normal to the first surface of the mount that are antiparallel with each other.

In aspect 12 according to any one of aspects 5 to 11, wherein the first set of multiple indirect LEEs are powered independently from the second set of multiple indirect LEEs.

Aspect 13 according to any one of aspects 1 to 12, wherein the prevalent direction of propagation of light in the second indirect angular range is antiparallel with the normal to the first surface of the mount, and the indirect optics comprise an indirect optical coupler, an indirect redirecting surface and a first indirect reflector, such that the indirect optical coupler is spaced apart from the indirect redirecting surface such that light emitted by the indirect LEEs in the first angular range that is redirected by the indirect optical coupler impinges on the indirect redirecting surface, the indirect redirecting surface redirects a first portion of the impinging light to the first indirect reflector and a second portion of the impinging light to the first indirect reflector, and the first indirect reflector reflects the first portion of the impinging light redirected by the redirecting surface in the second indirect angular range, such that a prevalent direction of propagation of light output as indirect illumination by the illumination device in the second indirect angular range has a non-zero component antiparallel with the normal to the first surface of the mount.

Aspect 14 according to aspect 13, wherein the indirect optics further comprise a second indirect reflector that reflects the second portion of the impinging light redirected by the redirecting surface in a third indirect angular range, such that prevalent directions of propagation of light output as indirect illumination by the illumination device in both the second and third indirect angular ranges have non-zero components antiparallel with the normal to the first surface of the mount and have non-zero components perpendicular to the normal to the first surface of the mount that are antiparallel with each other.

Aspect 15 according to any one of aspects 1 to 14, wherein the prevalent direction of propagation of light in the second indirect angular range is antiparallel with the normal to the first surface of the mount, and the indirect optics comprise a solid indirect optic, such that a first portion of the light emitted by the indirect LEEs in the first indirect angular range is redirected by a redirecting surface of the solid indirect optic into the second indirect angular range, such that a prevalent direction of propagation of light output as indirect illumination by the illumination device in the second indirect angular range has a non-zero component antiparallel with the normal to the first surface of the mount.

Aspect 16 according to aspect 15, wherein a second portion of the light emitted by the indirect LEEs in the first indirect angular range is redirected by the redirecting surface into a third indirect angular range, and such that prevalent directions of propagation of light output as indirect illumination by the illumination device in both the second and third indirect angular ranges have non-zero components antiparallel with the normal to the first surface of the mount and have non-zero components perpendicular to the normal to the first surface of the mount that are antiparallel with each other.

In general aspect 17, an illumination device comprises: one or more direct light-emitting elements operatively disposed on a first surface of a mount, the one or more direct LEEs configured to emit light in a first angular range with respect to a normal to the first surface; at least one primary optic optically coupled with the one or more direct LEEs and configured to direct light received from the one or more direct LEEs in the first angular range at an input end of the primary optic, and provide directed light in a second angular range at an output end of the primary optic, a divergence of the directed light in the second angular range being smaller than a divergence of the light in the first angular range; a light guide optically coupled at an input end of the light guide with the output end of the primary optic, the light guide shaped to guide light received from the primary optic in the second angular range to an output end of the light guide; an optical extractor optically coupled with the output end of the light guide at an input end of the optical extractor to receive guided light from the light guide, the optical extractor having a first redirecting surface spaced from the input end of the optical extractor and an output surface, the first redirecting surface having a first apex facing the input end of the optical extractor and configured to reflect light received at the input end of the optical extractor and provide the reflected light in a third angular range with respect to the normal to the first surface of the mount towards the output surface, the output surface shaped to refract the light provided by the first redirecting surface in the third angular range as refracted light and to output the refracted light in a fourth angular range with respect to the normal to the first surface of the mount outside the optical extractor; direct secondary reflectors external to the optical extractor and facing a portion of the output surface of the optical extractor, the direct secondary reflectors being shaped to reflect at least some of the light output by the output surface in the fourth angular range as first reflected light, and to provide the first reflected light in a fifth angular range with respect to the normal to the first surface of the mount, wherein the fifth angular range is different than the fourth angular range, and a prevalent direction of propagation of light in the fifth angular range has a non-zero component parallel with the normal to the first surface of the mount; one or more indirect LEEs operatively attached to a second surface of the mount that is different from the first surface, the one or more indirect LEEs configured to emit light in a first indirect angular range with respect to the normal to the first surface, wherein the first indirect angular range is different than the first angular range; and at least one indirect optic, wherein the indirect optic is configured to direct a portion of the light, which is emitted by the one or more indirect LEEs in the first indirect angular range, in a second indirect angular range with respect to the normal to the first surface, and a prevalent direction of propagation of light in the second indirect angular range has a non-zero component antiparallel with the normal to the first surface of the mount.

The illumination device of general aspect 17 may provide direct illumination to a target surface and indirect illumination to background surfaces. Light scattered from the background surfaces may further illuminate the target surface as indirect or ambient light. The described illumination device can be configured to allow interdependent as well as independent control of the direct and indirect illumination by a user. For example, the illumination device may be powered to provide only direct illumination, only indirect illumination, or both direct and indirect illumination together (e.g. simultaneously). Furthermore, lobes of the intensity distribution output by the described direct and indirect portions of the illumination device may be interdependently or independently controllable.

Moreover, intensity profiles of light output by the described illumination device of general aspect 17 can be configured to reduce or avoid glare. For example, the direct illumination, indirect illumination, or both, can be directed into angular ranges outside of those ranges generally considered to correspond to glare (e.g., for direct illumination, angles greater than about 40° with respect to an axis perpendicular to the ceiling). Alternatively, or additionally, components of the described illumination device can be configured to mix light emitted from multiple point-like sources, such that direct and/or indirect illumination output thereby have specifiable luminance and/or color uniformities. Some of these advantages may be further enhanced or augmented by additional advantages by one or more of the following aspects.

Aspect 18 according to aspect 17, wherein at least some of the at least one indirect optic comprise two light reflecting surfaces configured to direct the portion of the light emitted by the one or more indirect LEEs in between the two light reflecting surfaces.

Aspect 19 according to any one of aspects 17 to 18, wherein the indirect optic is configured to direct, when the device is suspended from a ceiling of a room and the first surface of the mount is horizontal, the portion of the light emitted by the one or more indirect LEEs in a spatial gap between the direct secondary reflectors and the ceiling.

Aspect 20 according to aspect 19, wherein (i) a prevalent direction of propagation of light in the first indirect angular range is perpendicular to the ceiling, and (ii) the indirect optic comprises a light reflecting surface configured to direct a portion of the light emitted in the first angular range as directed light in the second indirect angular range, and (iii) a prevalent direction of propagation of light in the second indirect angular range is oblique towards the ceiling.

Aspect 21 according to any one of aspects 19 to 20, wherein the indirect optic comprises a light reflecting surface facing the ceiling and a second redirecting surface disposed within the gap and having a second apex facing the mount, and wherein the indirect optic is configured to direct the portion of the light emitted by the one or more indirect LEEs in between the light reflecting surface and the second redirecting surface.

Aspect 22 according to aspect 21, wherein the second apex is a rounded apex with a non-zero radius of curvature.

Aspect 23 according to any one of aspects 21 to 22, wherein the second redirecting surface is v-shaped or is shaped as an arc of a circle.

Aspect 24 according to any one of aspects 21 to 23, wherein the second redirecting surface comprises a first and a second portion having first and second arcuate shapes in a cross-sectional plane perpendicular to the longitudinal dimension of the illumination device, or wherein the first and the second portion of the redirecting surface is parabolic or hyperbolic.

Aspect 25 according to any one of aspects 21 to 24, wherein the second redirecting surface is carried by a frame that is connected with the ceiling by a rod and a wire.

Aspect 26 according to aspect 25, wherein the second redirecting surface and the light reflecting surface are arranged and configured to reflect the portion of the light emitted by the one or more indirect LEEs towards the direction parallel to the first surface.

Aspect 27 according to any one of aspects 25 to 26, wherein the portion of the light is directed over a distance that is equal to the largest spatial extension of one of the frame, the light reflecting surface, and the second redirecting surface.

Aspect 28 according to any one of aspects 21 to 27, wherein the first and second redirecting surfaces, the light reflecting surfaces, or the direct secondary reflectors comprises a reflective material, where the reflective material includes one or both of Ag or Al.

Aspect 29 according to any one of aspects 17 to 28, wherein the indirect optic further comprises a second optical coupler that is configured to at least partially collimate the light emitted by the one or more indirect LEEs.

Aspect 30 according to aspect 29, wherein the second optical coupler is hollow with light reflecting surfaces, or wherein the second optical coupler comprises a solid transparent optical material which is index-matched to the one or more indirect LEEs.

Aspect 31 according to any one of aspects 18 to 30, wherein the at least one light reflecting surface is a concave parabolic or a concave hyperbolic light reflector.

Aspect 32 according to any one of aspects 17 to 31, wherein the primary optic, the light guide and the optical extractor are integrally formed of a monolithic solid transparent optical material.

Aspect 33 according to any one of aspects 17 to 32, wherein the primary optic comprises a first optical coupler that is hollow with light reflecting surfaces, or the optical coupler comprises a solid transparent optical material, which is index-matched to the direct light emitting element or the light guide.

Aspect 34 according to any one of aspects 17 to 33, wherein the primary optic is configured to at least partially collimate a portion of the light received from the direct light-emitting element in the first angular range.

Aspect 35 according to any one of aspects 18 to 34, wherein a divergence of the at least partially collimated portion of the light is smaller at the output end of the primary optic than at the input end of the primary optic.

Aspect 36 according to any one of aspects 17 to 35, wherein the light guide is shaped to provide the guided light in substantially the same second angular range with respect to the first surface of the mount at the output end of the light guide.

Aspect 37 according to any one of aspects 17 to 36, wherein the direct secondary reflectors are connected to an edge of the output surface of the optical extractor, and at least a portion of the direct secondary reflectors is an involute of at least a portion of the output surface of the optical extractor with respect to at least one cross section of the illumination device through the optical axis.

Aspect 38 according to any one of aspects 17 to 37, wherein the one or more indirect LEEs or the one or more direct light emitting elements comprises at least one row of multiple light emitting elements, wherein each row extends along a length L of the illumination device, and wherein the light guide, the direct secondary reflectors, and the indirect optic extend across the entire length L.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF THE DRAWINGS

FIGS. 7A-7C show aspects of an intensity distribution at a target surface provided by an array of luminaires, each of which is similar to the luminaire of FIG. 5.

FIGS. 10A-10C, 11A-11C and 12A-12C show aspects of an intensity distribution provided by an array of illumination devices, each of which is similar to the illumination device of FIGS. 8A-8C.

FIGS. 14A-14F illustrate aspects of yet another illumination device used to provide direct and indirect intensity distributions.

FIGS. 16A-16C and 17A-17C show aspects of indirect and direct intensity distributions provided by the illumination device of FIGS. 14A-14B.

Reference numbers and designations in the various drawings indicate exemplary aspects, implementations of particular features of the present disclosure.

DETAILED DESCRIPTION

The present disclosure relates to illumination devices with a capability to provide direct and indirect illumination. Specifically, the disclosure relates to illumination devices, which can efficiently guide and distribute light towards work surfaces and/or towards background regions. The illumination devices include direct and indirect optical components configured to provide direct and indirect illumination. The illumination devices can be configured to allow interdependent as well as independent control of the direct and indirect illumination, e.g., by a user or by pre-programmed internal or external control circuitry.

(i) Illumination Device Used to Provide Direct and Indirect Illumination

FIG. 1 illustrates a block diagram of an illumination device 100 in which a Cartesian coordinate system is shown for schematic reference. The illumination device 100 includes a direct illumination portion 100-1, an indirect illumination portion 100-2 and a mount 110. Examples implementations of illumination devices 100 are described herein, for example with reference to FIGS. 13A-13B, 14A-14B, 18A, 19A and 20A. Example implementations of the direct illumination portion 100-1 are described herein, for example with reference to FIGS. 5-6, 8A-8C, and 9. Example implementations of the indirect illumination portion 100-2 are described herein, for example with reference to FIGS. 13A-13B, 14A-14B, 18A, 19A and 20A.

(i-a) Direct Illumination Portion of the Illumination Device

Figure 2A:
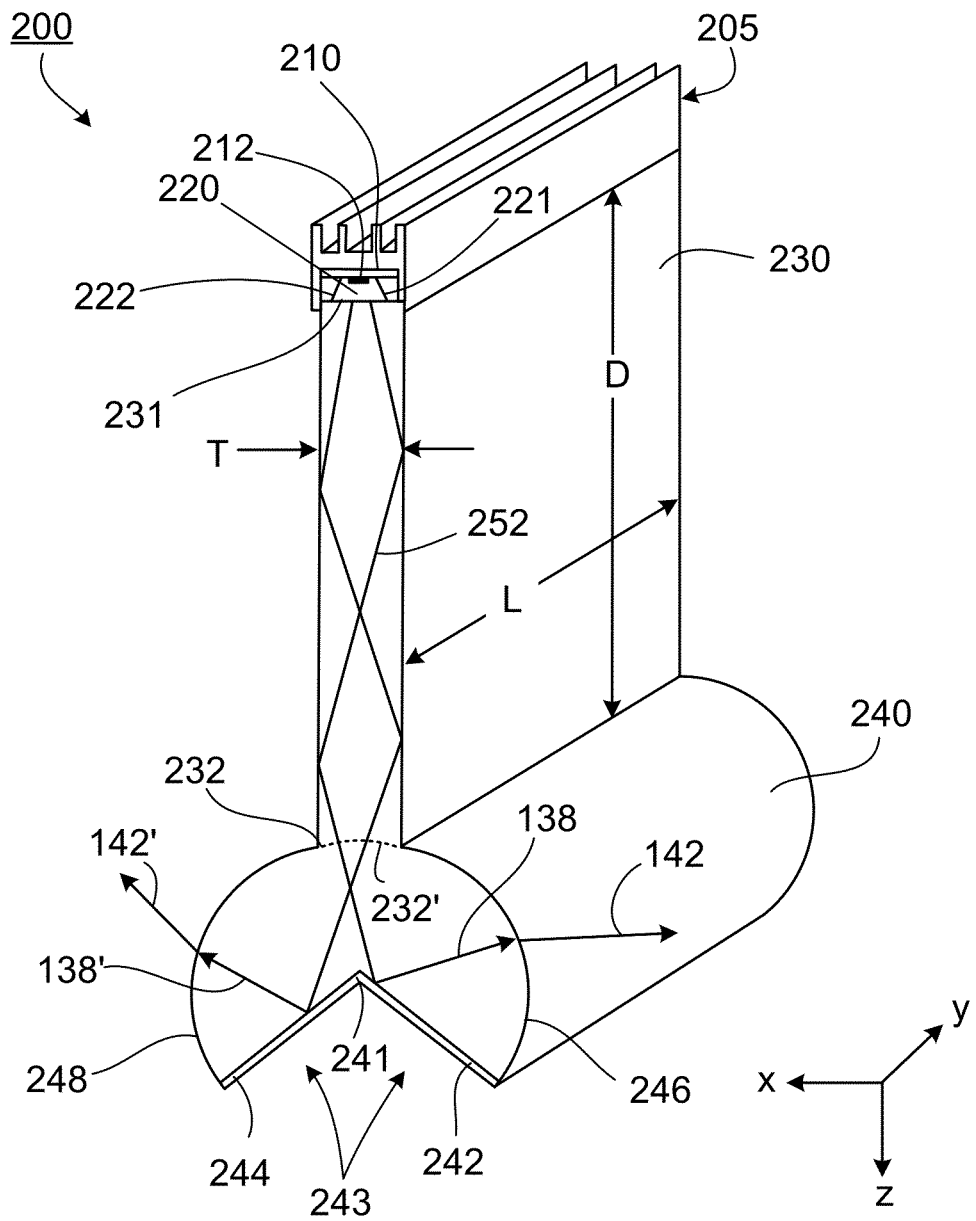
FIGS. 2A-2G show aspects of an example of a luminaire module.
Figure 8A:
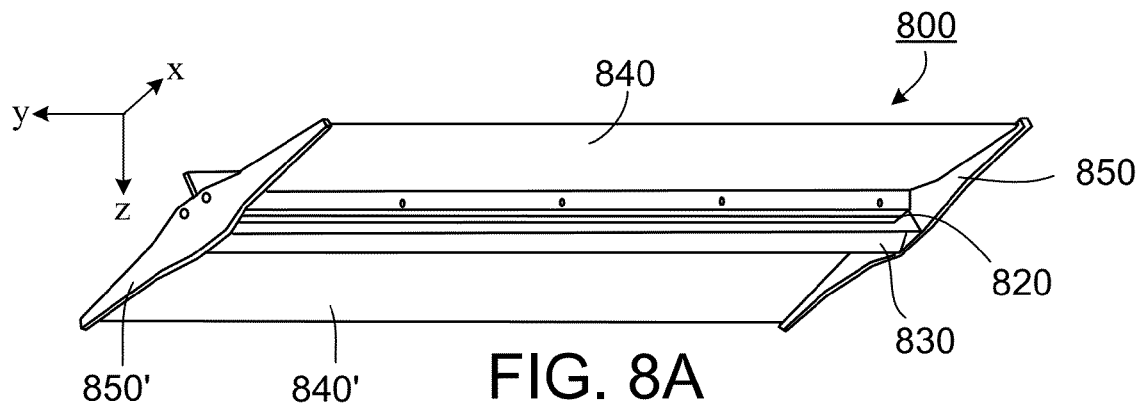
FIGS. 8A-8C are views of another illumination device used to provide direct intensity distribution.
Figure 8B:
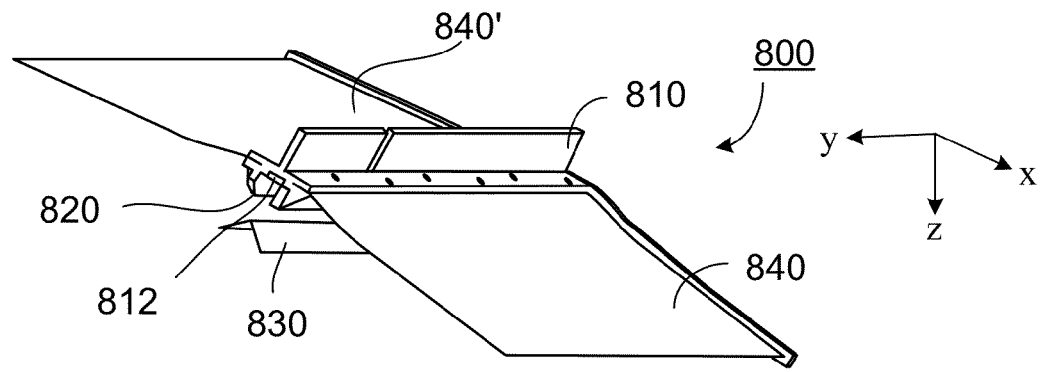
Figure 8C:
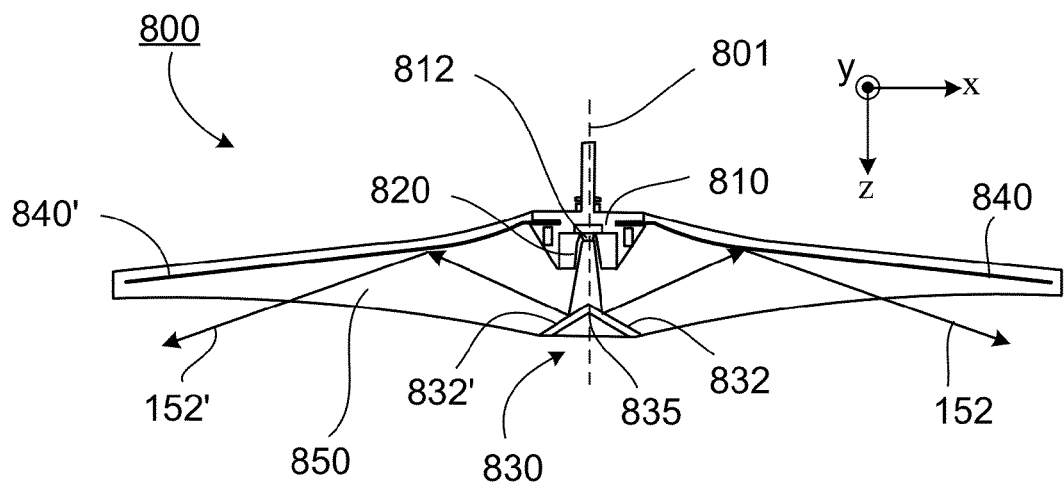

The direct illumination portion 100-1 includes one or more direct LEEs 112 disposed on a first surface of the mount 110, one or more optical couplers 120, a light guide 130, and an optical extractor 140. The LEEs 112 emit light, during operation, in a first angular range 115 with respect to their optical axes, which can coincide with a normal to a first surface of the mount 110 (e.g., the direction of the z-axis). For example, a divergence of the first angular range 115 of the light emitted by the LEEs 112 can be 150°-180° around optical axes of the LEEs 112. Optical couplers 120 receive light in the first angular range 115 from LEEs 112. Each optical coupler 120 is configured to redirect the light received in the first angular range 115 into a light with a second angular range 125 and direct it into a first end 131 of light guide 130. For example, a divergence of the second angular range 125 of the light provided by the optical couplers 120 can be 90°. In implementations when the light guide 130 is not included in the direct illumination portion 100-1, the optical couplers 120 redirect the light with the second angular range 125 towards the optical extractor 140. The light guide 130 guides the light to a distal end 132 of the light guide 130 away from LEEs 112. The light guide 130 provides the guided light at the distal end 132 in an angular range 135. In some implementations, the light guide 130 is shaped to guide the light received from the optical couplers 120 in the second angular range 125 and to provide the guided light in substantially the same second angular range (angular range 135≈angular range 125) at the output end of the solid light guide 132. For example, the prevalent direction of second angular range 125 and second angular range 135 may be within 8% of each other (e.g., within 5%, within 2%) and the divergence of second angular range 125 and second angular range 135 may be within 8% of each other (e.g., within 5%, within 2%). Optical extractor 140 receives light with angular range 135 that exits end 132 of the light guide 130 or, when the light guide 130 is not part of the direct illumination portion 100-1, the optical extractor 140 receives the light with angular range 125 provided by the optical couplers 120. Optical extractor 140 includes a reflective interface that reflects the light received by the optical extractor 140, such that the reflected light exits the optical extractor 140 with one or more output angular ranges 142, 142'. The reflective interface of the optical extractor includes two light reflecting surfaces 242, 244 (as shown in FIG. 2A), or 832, 832' (as shown in FIG. 8C). As discussed herein, the output angular ranges 142, 142' at which light exits the optical extractor 140 depend on the properties of optical extractor 140 (e.g., geometry of the optical interfaces and optical properties of the materials forming the extractor).

Further, the direct illumination portion 100-1 includes one or more direct secondary reflectors 150, 150' positioned to receive at least some of light output by the optical extractor 140 in angular ranges 142, 142'. Direct secondary reflectors 150, 150' redirect light received from the optical extractor 140 in angular ranges 142, 142', and provide the redirected light into desired angular ranges 152, 152' outside of the direct illumination portion 100-1 to illuminate the target surface. Light provided by the illumination portion 100-1 to the target surface within the angular ranges 152, 152' is referred to as the direct intensity distribution of the direct illumination portion 100-1. In some implementations, the direct secondary reflectors 150, 150' are arranged and configured such that a prevalent direction of propagation of light in each of the angular ranges 152, 152' has a non-zero component parallel with a normal to the first surface of the mount 110. In this case, the direct illumination portion 100-1 of the illumination device 100 outputs light in the forward direction. As shorthand, the positive z-direction is referred to herein as the "forward" direction and the negative z-direction is the "backward" direction.

These and other properties of the direct illumination portion 100-1 can be tailored to provide extraction profiles desirable for specific lighting applications. For instance, in some implementations, the reflective interface of the optical extractor 140 of the direct illumination portion 100-1 is arranged and shaped to redirect the light received in angular range 135 into a single output angular range 142. Here, the direct illumination portion 100-1 further includes a single direct secondary reflector 150 arranged and shaped to output light redirected in the angular range 142 into a single direct angular range 152 as direct illumination in the forward direction.

In general, the components of direct illumination portion 100-1 are arranged to redirect light emitted from LEEs 112 away from the LEEs before the light is emitted into the ambient environment. The spatial separation of the place of generation of the light, also referred to as the physical (light) source, from the place of extraction of the light, also referred to as the virtual light source or virtual filament, can facilitate design of the illumination device. For example, in some implementations, the virtual light source/filament can be configured to provide substantially non-isotropic light emission with respect to planes parallel to an optical axis of the illumination device (for example the z-axis.) In contrast, a typical incandescent filament generally emits substantially isotropically distributed amounts of light. The virtual light source may be viewed as one or more portions of space from which substantial amounts of light appear to emanate. Furthermore, separating the LEEs, with their predetermined optical, thermal, electrical and mechanical constraints, from the place of light extraction, may facilitate a greater degree of design freedom of the optical system of the illumination device and allows for an extended optical path, which can permit a predetermined level of light mixing before light is output from the illumination device.

(i-b) Indirect Illumination Portion of the Illumination Device

Figure 13A:
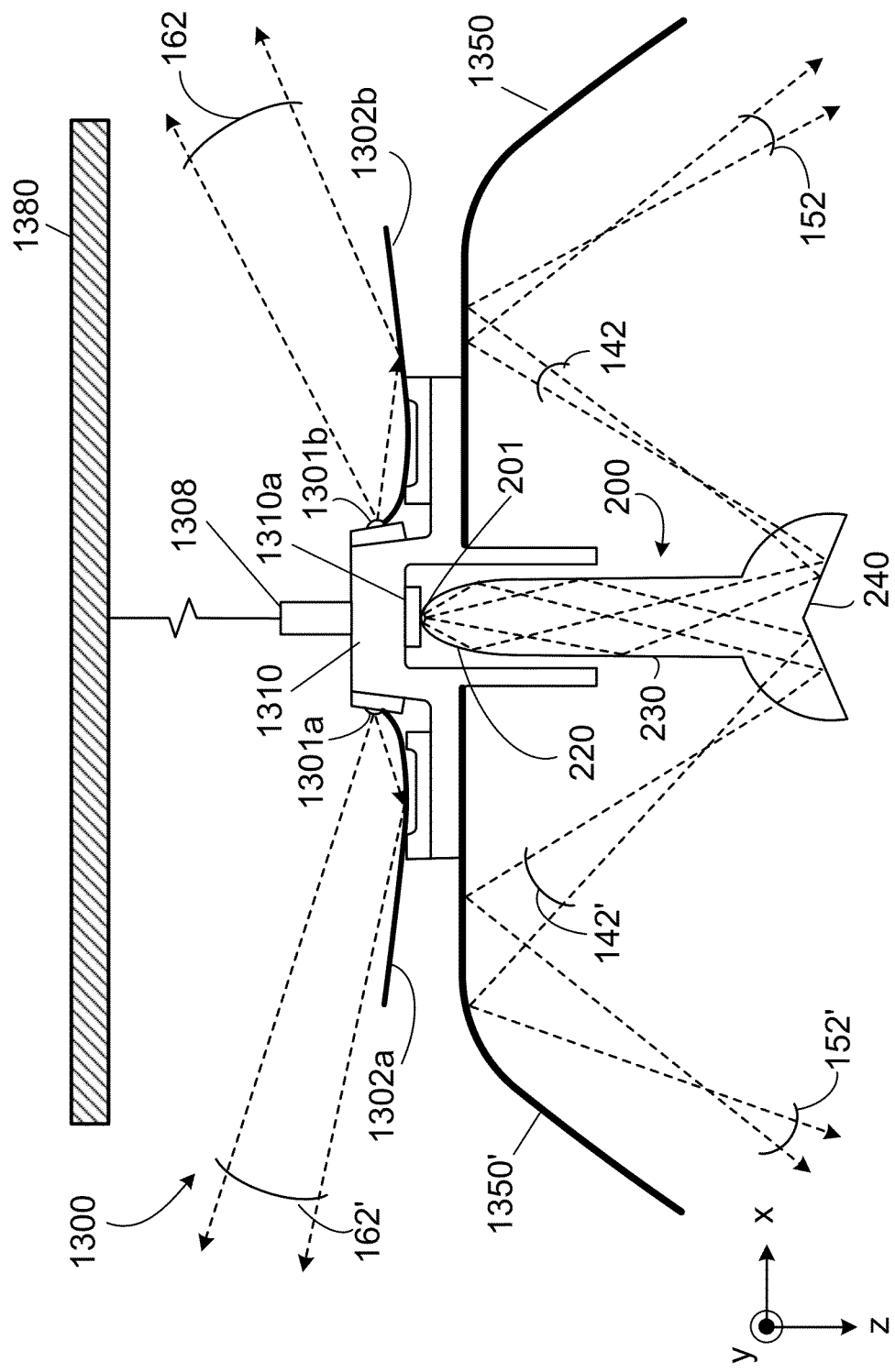
FIGS. 13A-13C show aspects of another illumination device used to provide direct and indirect intensity distributions.

The indirect illumination portion 100-2 includes indirect optics 160 and one or more indirect LEEs 112'. The one or more indirect LEEs 112' can be arranged on one or more surfaces of the mount 110 typically different from the first surface of the mount 110 where the direct LEEs 112 are disposed. FIGS. 13A-13B, 14A-14B, 18A, 19A and 20A illustrate various examples of the indirect illumination portion 110-2 in which the indirect LEEs 112' are distributed along the length L (e.g., parallel to the y-axis) of the illumination devices 1300, 1400, 1800, 1900 and 2000. In FIG. 13A and FIG. 14A to 14B, for example, two rows of indirect LEEs 1301a/b are arranged parallel to the y-axis on respective side surfaces of a mount 1310. In this case, these side surfaces are oriented obliquely to a ceiling 1380 when the illumination device 1300 or 1400 is suspended from the ceiling 1380. As another example, in FIG. 18A two rows of indirect LEEs 1301a/b are arranged along the y-axis direction on respective surfaces of a mount 1810 that are substantially parallel to the first surface of the mount and are located on an opposite side of the mount with respect to the first surface. In this case, these surfaces are oriented substantially parallel to a ceiling 1380 (e.g., deviating by 2% or less from parallel) when the illumination device 1800 is suspended from the ceiling. As yet another example, in each of FIGS. 19A and 20A one row of indirect LEEs 1301 is arranged on a surface of a mount 1910, 2010 that is substantially parallel to the first surface of the mount and is located on an opposite side of the mount with respect to the first surface. In these cases, this surface is oriented substantially parallel to a ceiling 1380 when the illumination devices 1900 or 2000 are suspended from the ceiling.

Returning to FIG. 1, the indirect optics 160 are optically coupled to the indirect LEEs 112' and enable the illumination device 100 to provide indirect light distribution. The indirect optics 160 include at least one of light reflecting surface or light refracting solid transparent optical material(s), e.g., the indirect optics 160 may be at least one hollow or solid optical component that is arranged and configured to redirect light emitted by the indirect LEEs 112' in the angular range 115' as indirect redirected light in angular range 162 or 162' or both. In some implementations, the indirect optics 160 are arranged and configured such that a prevalent direction of propagation of light in each of the angular ranges 162, 162' has a non-zero component antiparallel with the normal to the first surface of the mount 110.

In the example systems illustrated in FIGS. 13A, 14A-14B, 18A, 19A and 20A, the indirect optics 160 are elongated along a length L (e.g., parallel to the y-axis) of the illumination devices 1300, 1400, 1800, 1900 and 2000. Depending on the implementation, such elongate example systems may be straight or curved, or include curved or straight segments or have other shapes. Furthermore systems can form loops, have rotational symmetry about a forward direction or have other shapes.

For example, in FIG. 13A the illumination device 1300 includes two indirect optics 1302a/b, each of the indirect optics including single reflector supported on a corresponding surface of mount 1310 that is substantially parallel to the first surface of the mount and is located on an opposite side of the mount with respect to the first surface. In this case, the surfaces of the mount 1310 that support the indirect optics 1302a/b are oriented substantially parallel to a ceiling 1380 when the illumination device 1300 is suspended from the ceiling.

As another example, in FIGS. 14A-14B the illumination device 1400 includes two indirect optics 1402a/b. Each of the indirect optics 1402a/b includes a first reflector 1406 supported on a corresponding surface of mount 1310 that is substantially parallel to the first surface of the mount and is located on an opposite side of the mount with respect to the first surface, and a second reflector 1404 attached to a corresponding second surface of the mount 1310 that is substantially parallel to the first surface of the mount and also is located on the opposite side of the mount with respect to the first surface. In this case, the surfaces of the mount 1310 that support the first 1406 and second 1404 reflectors of the indirect optics 1402a/b are oriented substantially parallel to a ceiling 1380 when the illumination device 1400 is suspended from the ceiling. In this manner, the first 1406 and second 1404 reflectors of each of the indirect optics 1402a/b can be arranged to face each other and to form a respective optical coupler.

Figure 18A:
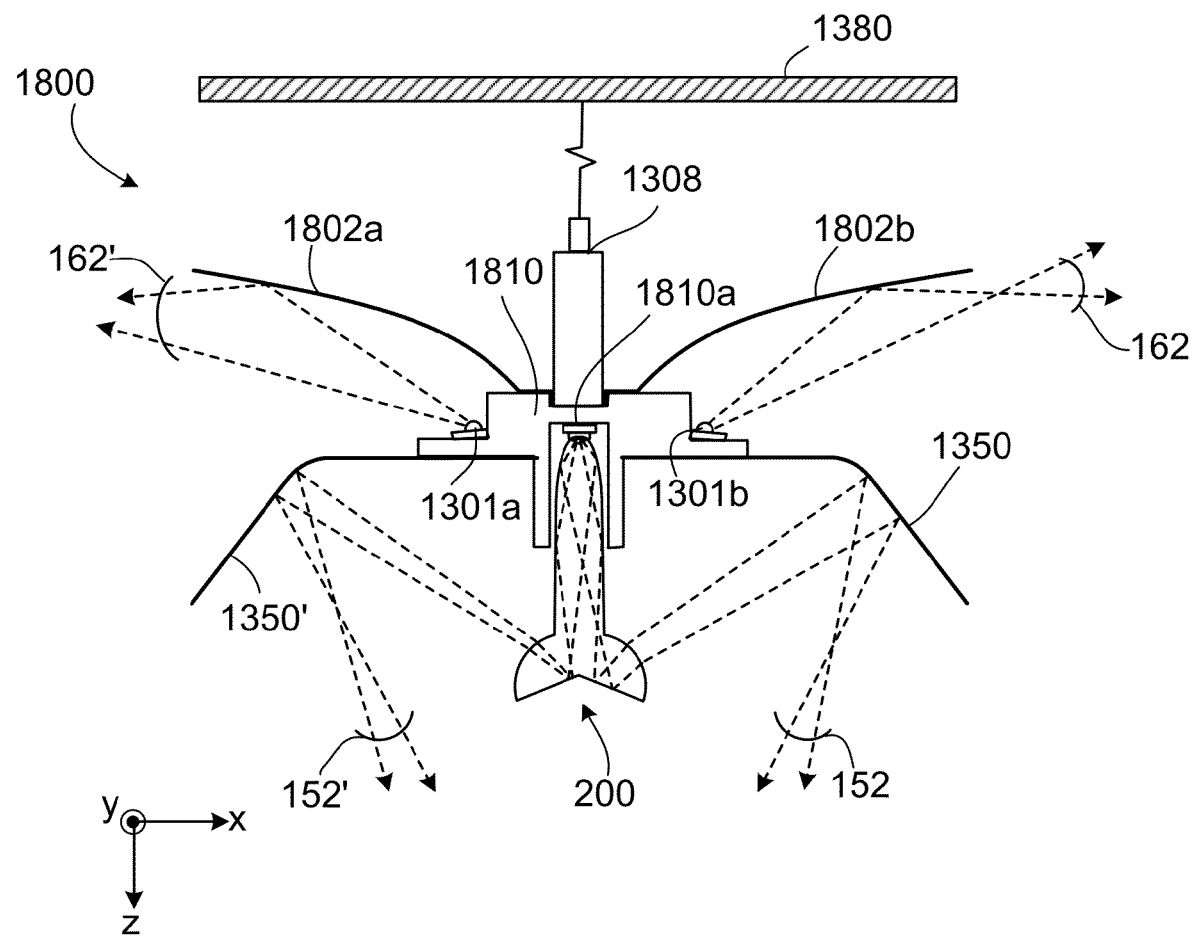
FIGS. 18A-18B show aspects of yet another illumination device used to provide direct and indirect intensity distributions.

As yet another example, in FIG. 18A the illumination device 1800 includes two indirect optics 1802a/b. Each of the indirect optics 1802a/b includes a single reflector attached to a corresponding surface of a mount 1810 that is substantially parallel to the first surface of the mount and is located on an opposite side of the mount with respect to the first surface. In this case, the surfaces of the mount 1810, to which the indirect optics 1802a/b are attached, are oriented substantially parallel to a ceiling 1380 when the illumination device 1800 is suspended from the ceiling.

Figure 19A:
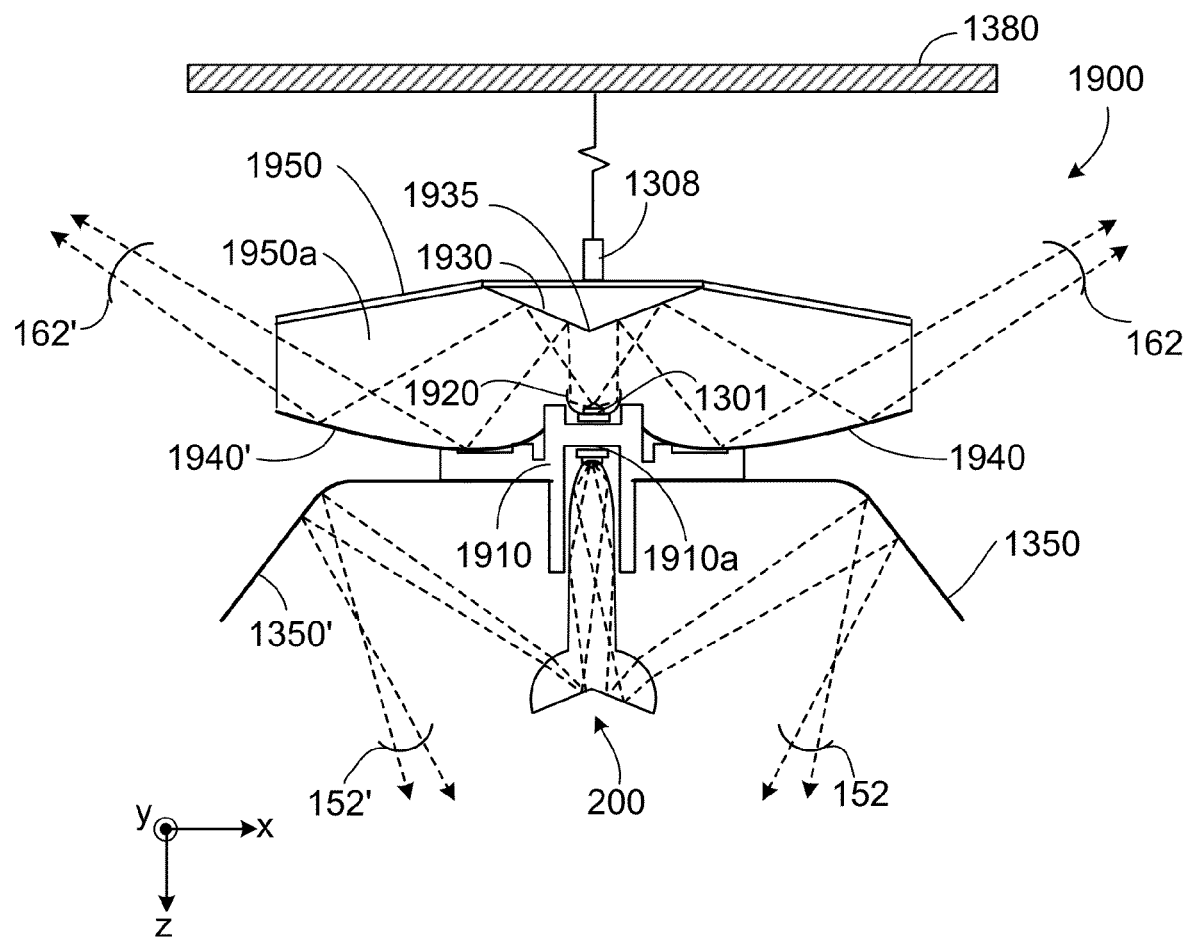
FIGS. 19A-19B show aspects of yet another illumination device used to provide direct and indirect intensity distributions.

As yet another example, in FIG. 19A the illumination device 1900 includes an indirect optics system. The indirect optics system of illumination device 1900 includes two reflectors 1940, 1940', where each of the two reflectors is supported on a corresponding surface of mount 1910 that is substantially parallel to the first surface of the mount and is located on an opposite side of the mount with respect to the first surface. In this case, the surfaces of the mount 1910 that support the two reflectors 1940, 1940' are oriented substantially parallel to a ceiling 1380 when the illumination device 1900 is suspended from the ceiling. The indirect optics system of illumination device 1900 also includes a redirecting optic 1930 attached to a frame 1950 of the mount 1910. In this manner, the two reflectors 1940, 1940' can be arranged to face the redirecting optic 1930 to affect the angular ranges 162, 162' of the indirect intensity distribution.

Figure 20A:
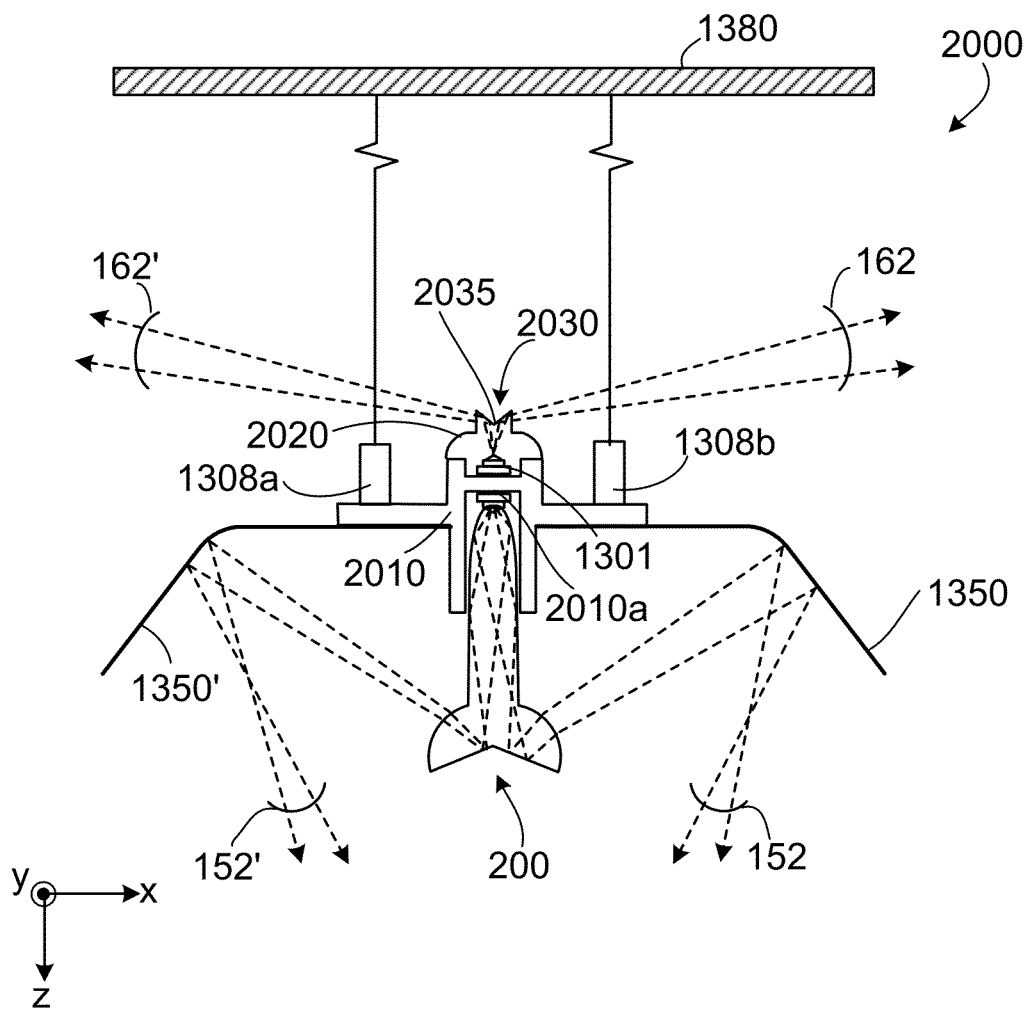
FIGS. 20A-20B show aspects of yet another illumination device used to provide direct and indirect intensity distributions.

As yet another example, in FIG. 20A the illumination device 2000 includes solid indirect optics 2020. The indirect optics 2020 include a redirecting surface 2030. The solid indirect optics 2020 are supported on a corresponding surface of a mount 2010 that is substantially parallel to the first surface of the mount and is located on an opposite side of the mount with respect to the first surface. In this case, the surface of the mount 2010 that supports the solid indirect optics 2020 is oriented substantially parallel to a ceiling 1380 when the illumination device 2000 is suspended from the ceiling. In this manner, the redirecting surface 2030 of the indirect optics 2020 can be configured to affect the angular ranges 162, 162' of the indirect intensity distribution.

Returning to FIG. 1, these and other properties of the indirect illumination portion 100-2 can be tailored to provide extraction profiles desirable for specific lighting applications. For instance, in some implementations, the indirect optics 160 of the indirect illumination portion 100-2 are arranged and shaped to output the light received in angular range 115' from the indirect LEEs 112' into a single indirect angular range 162 as indirect illumination in the backward direction.

Depending on the implementation, the direct LEEs 112 and/or the indirect LEEs 112' can have multiple correlated color temperatures (CCT) or chromaticities/colors. As such, direct LEEs 112 and/or the indirect LEEs 112' with multiple CCT may be grouped by color/CCT and can be controlled (e.g., certain direct LEEs 112 and/or indirect LEEs 112' may be selectively powered on/off, dimmed, etc., during operation) to interpolate between the CCTs and intensity levels of light in one or more of the indirect angular ranges 162, or 162', or the combination of direct angular ranges 152 and 152'. In this manner, the CCT corresponding to the lobes or combinations of lobes can be modified from a bluish to a reddish CCT throughout the day to accomplish certain bioluminous effects, for instance. (i-c) Direct and Indirect Intensity Distributions Provided by the Illumination Device 100

In general, light output by the illumination device 100 in angular ranges 152/152' represents a direct intensity distribution, which may be customized (e.g., based on a user specification), at least, by choice of direct secondary reflectors 150,150', optical extractor 140, and optical couplers 120. Light output by the illumination device 100 in angular ranges 162,162' represents an indirect intensity distribution, which may be customized (e.g., based on a user specification), at least, by choice of indirect optics 160, and a spatial position of the indirect LEEs 112' with respect to the indirect optics 160. Moreover, the illumination device 100 can be configured to enable separate power control of the direct LEEs 112 and the indirect LEEs 112'. In this manner, the illumination device 100 can provide separately controllable direct and indirect intensity distributions.

Figure 1A:
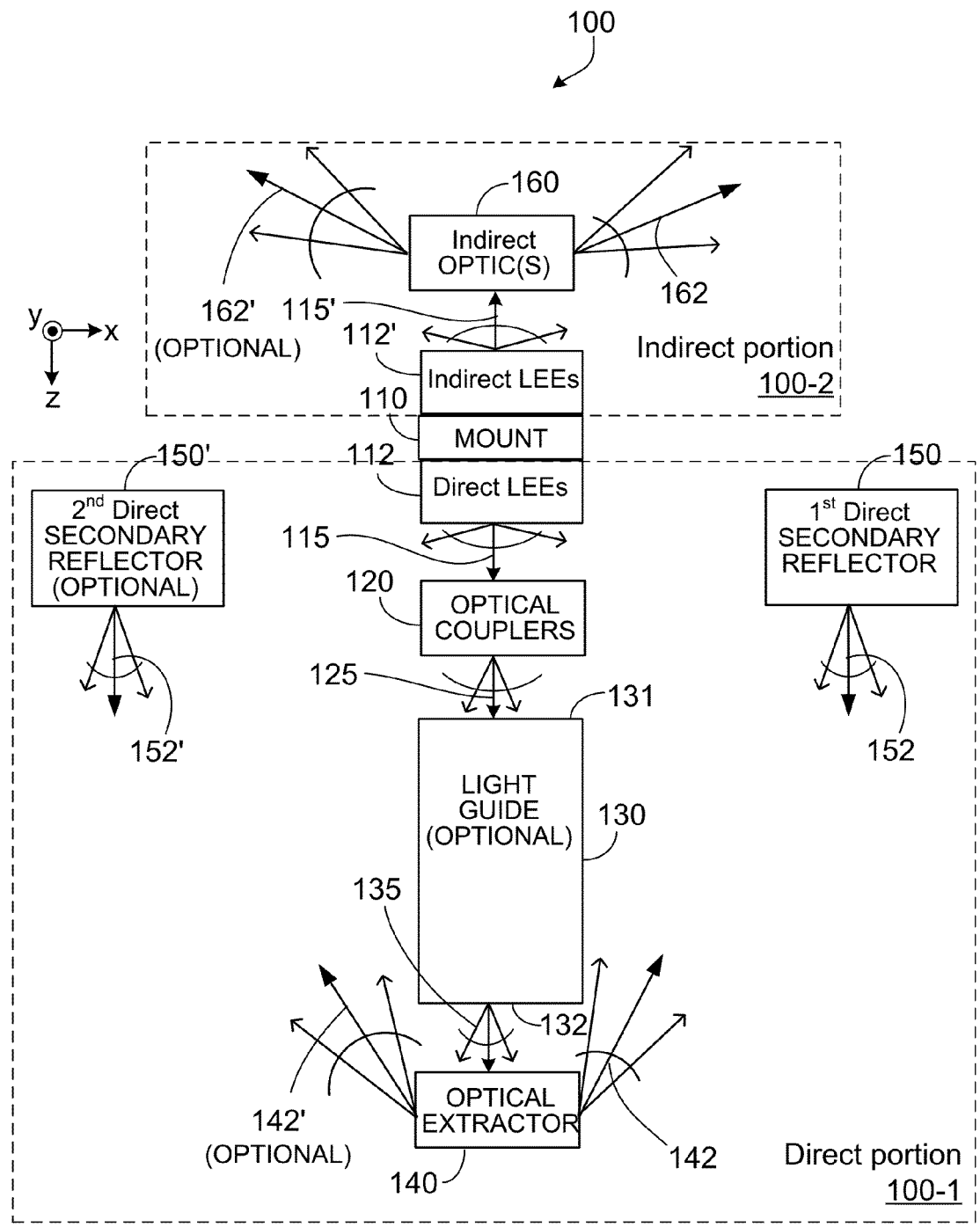
FIGS. 1A-1E show aspects of an illumination device used to provide direct and indirect intensity distributions.
Figure 1B:
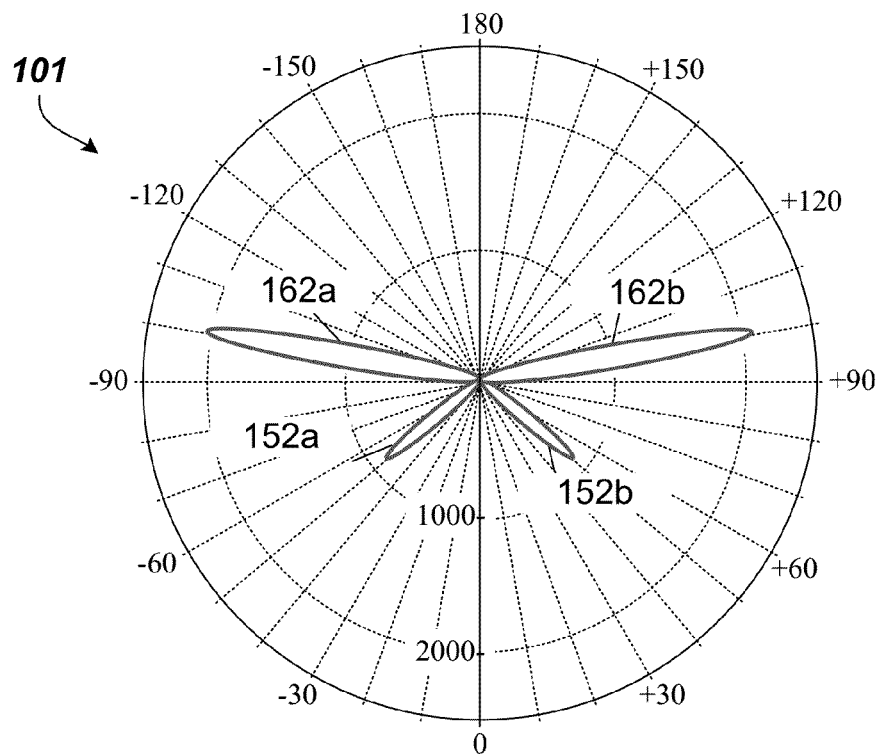

FIG. 1B shows an x-z cross-section of light intensity profile 101 of a first implementation of the illumination device 100 that is elongated along the y-axis (perpendicular to the sectional plane of FIG. 1A). Direct lobes 152a and 152b of the light intensity profile 101 represent direct light output by the illumination device 100 and correspond to respective direct angular ranges 152' and 152. Indirect lobes 162a and 162b of the light intensity profile 101 represent indirect light output by the illumination device 100 and correspond to respective indirect angular ranges 162' and 162. As described in detail below, composition and geometry of components of the illumination device 100 can affect the light intensity profile 101.

The light intensity profile 101 illustrated in FIG. 1B is generated by an illumination device 100 with a direct illumination portion 100-1 that includes an optical extractor 140 configured to redirect light received in angular range 135 into both angular ranges 142, 142', and further includes (i) first secondary reflector 150 arranged and configured to output the light redirected in angular range 142 into direct angular range 152 corresponding to direct lobe 152b, and (ii) second secondary reflector 150' arranged and configured to output the light redirected in angular range 142' into direct angular range 152' corresponding to direct lobe 152a. Additionally, in this case, a first portion of the indirect optics 160 of the indirect illumination portion 100-2 of the illumination device 100 is configured to output light emitted by a first set of the indirect LEEs 112' in angular range 115' into indirect angular range 162 corresponding to indirect lobe 162b, and a second portion of the indirect optics 160 is configured to output light emitted by a second set of the indirect LEEs 112' in angular range 115' into indirect angular range 162' corresponding to lobe 162a.

In some implementations, the direct LEEs 112 and/or the indirect LEEs 112' can have multiple correlated color temperatures (CCT) or other chromaticities. The direct LEEs 112 and/or the indirect LEEs 112' with multiple CCT can be controlled (e.g., certain direct LEEs 112 and/or indirect LEEs 112' may be selectively powered on/off, dimmed, etc., during operation) to interpolate between the CCTs and intensity levels in either of indirect lobes 162a, or 162b, or the combination of direct lobes 152a and 152b. In this manner, the CCT corresponding to the lobes or combinations of lobes can be modified from a bluish to a reddish CCT throughout the day to accomplish certain bioluminous effects, for instance.

Moreover, as the first set of indirect LEEs 112' can be powered independently from the second set of indirect LEEs 112' of the indirect illumination portion 100-2 of the illumination device 100 and from the direct LEEs 112 of the direct illumination portion 100-1 of the illumination device 100, multiple configurations of the light intensity profile 101 shown in FIG. 1B are possible for the illumination device 100, as indicated in Table 1 below. For instance, the direct LEEs 112 are powered (or are ON) if a first switch of a power source is closed, and the direct LEEs 112 are not powered (or are OFF) if the first switch is open. Further, the first set of indirect LEEs 112' are powered (or are ON) if a second switch of the power source is closed, and the first set of indirect LEEs 112' are not powered (or are OFF) if the second switch is open. Furthermore, the second set of indirect LEEs 112' are powered (or are ON) if a third switch of the power source is closed, and the second set of indirect LEEs 112' are not powered (or are OFF) if the third switch is open.

TABLE 1

| | Direct illumination | | Indirect illumination | |
|---|---|---|---|---|
| LEE power combinations | Lobe 152a | Lobe 152b | Lobe 162a | Lobe 162b |
| Direct LEEs 112 ON; 1st set of indirect LEEs 112' ON; 2nd set of indirect LEEs 112' ON | ON | ON | ON | ON |
| Direct LEEs 112 ON; 1st set of indirect LEEs 112' OFF; 2nd set of indirect LEEs 112' ON | ON | ON | OFF | ON |
| Direct LEEs 112 ON; 1st set of indirect LEEs 112' ON; 2nd set of indirect LEEs 112' OFF | ON | ON | ON | OFF |
| Direct LEEs 112 ON; 1st set of indirect LEEs 112' OFF; 2nd set of indirect LEEs 112' OFF | ON | ON | OFF | OFF |
| Direct LEEs 112 OFF; 1st set of indirect LEEs 112' ON; 2nd set of indirect LEEs 112' ON | OFF | OFF | ON | ON |
| Direct LEEs 112 OFF; 1st set of indirect LEEs 112' OFF; 2nd set of indirect LEEs 112' ON | OFF | OFF | OFF | ON |
| Direct LEEs 112 OFF; 1st set of indirect LEEs 112' ON; 2nd set of indirect LEEs 112' OFF | OFF | OFF | ON | OFF |
| Direct LEEs 112 OFF; 1st set of indirect LEEs 112' OFF; 2nd set of indirect LEEs 112' OFF | OFF | OFF | OFF | OFF |

In accordance with the various manners of powering the direct and indirect LEEs shown in Table 1, the following interdependent or independent ways of controlling the intensity distribution associated with the illumination device 100 are possible: (i) direct lobes 152a, 152b of the illumination pattern 101 in the x-z cross-section are interdependently controlled with respect to each other; (ii) direct lobes 152a, 152b of the illumination pattern 101 in the x-z cross-section are independently controlled with respect to each of indirect lobes 162a, 162b of the illumination pattern 101 in the x-z cross-section; and (iii) indirect lobes 162a, 162b of the illumination pattern 101 in the x-z cross-section are independently controlled with respect to each other.

Figure 1C:
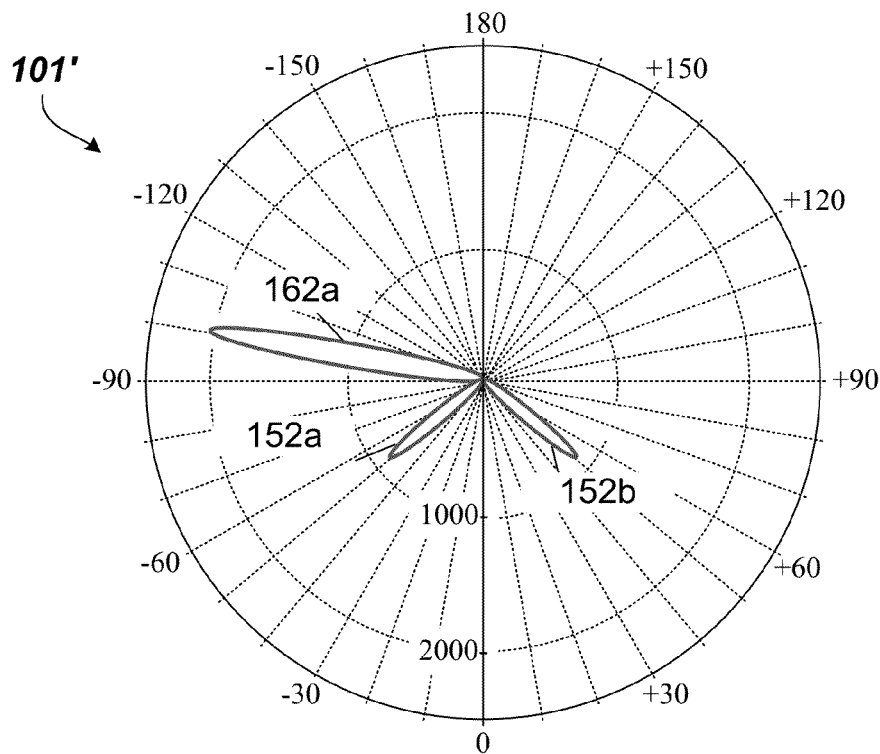

FIG. 1C shows an x-z cross-section of light intensity profile 101' of a second implementation the illumination device 100 that is elongated along the y-axis (perpendicular to the sectional plane of FIG. 1A). In this implementation, the illumination device will be denoted 100'. Direct lobes 152a and 152b of the light intensity profile 101' represent direct light output by the illumination device 100' and correspond to respective direct angular ranges 152' and 152. Indirect lobe 162a of the light intensity profile 101' represents indirect light output by the illumination device 100 and corresponds to indirect angular range 162'. As described in detail below, composition and geometry of components of the illumination device 100' can affect the light intensity profile 101'.

The light intensity profile 101' illustrated in FIG. 1C is generated by an illumination device 100' with a direct illumination portion 100-1 that includes an optical extractor 140 configured to redirect light received in angular range 135 into both angular ranges 142, 142', and further includes (i) first secondary reflector 150 arranged and configured to output the light redirected in angular range 142 into direct angular range 152 corresponding to direct lobe 152b, and (ii) second secondary reflector 150' arranged and configured to output the light redirected in angular range 142' into direct angular range 152' corresponding to direct lobe 152a. Additionally, in this case, the indirect optics 160 of the indirect illumination portion 100-2' of the illumination device 100' are configured to output light emitted by the indirect LEEs 112' in angular range 115' into indirect angular range 162' corresponding to lobe 162a.

In some implementations, the direct LEEs 112 and/or the indirect LEEs 112' can have multiple correlated color temperatures (CCT) or other chromaticities. The direct LEEs 112 and/or the indirect LEEs 112' with multiple CCT can be controlled (e.g., certain direct LEEs 112 and/or indirect LEEs 112' may be selectively powered on/off, dimmed, etc., during operation) to interpolate between the CCTs and intensity levels in indirect lobe 162a or the combination of lobes 152a and 152b. In this manner, the CCT corresponding to the lobes or combinations of lobes can be modified from a bluish to a reddish CCT throughout the day to accomplish certain bioluminous effects, for instance.

Moreover, as the indirect LEEs 112' of the indirect illumination portion 100-2' of the illumination device 100' can be powered independently from the direct LEEs 112 of the direct illumination portion 100-1 of the illumination device 100', multiple configurations of the light intensity profile 101' shown in FIG. 1C are possible for the illumination device 100', as indicated in Table 2 below. For instance, the direct LEEs 112 are powered (or are ON) if a first switch of a power source is closed, and the direct LEEs 112 are not powered (or are OFF) if the first switch is open. Further, the indirect LEEs 112' are powered (or are ON) if a second switch of the power source is closed, and the indirect LEEs 112' are not powered (or are OFF) if the second switch is open.

TABLE 2

| LEE power combinations | Direct illumination | | Indirect illumination |
| --- | --- | --- | --- |
| | Lobe 152a | Lobe 152b | Lobe 162a |
| Direct LEEs 112 ON; Indirect LEEs 112' ON | ON | ON | ON |
| Direct LEEs 112 ON; Indirect LEEs 112' OFF | ON | ON | OFF |
| Direct LEEs 112 OFF; Indirect LEEs 112' ON | OFF | OFF | ON |
| Direct LEEs 112 OFF; Indirect LEEs 112' OFF | OFF | OFF | OFF |

In accordance with the various manners of powering the direct and indirect LEEs shown in Table 2, the following interdependent or independent ways of controlling the intensity distribution associated with the illumination device 100' are possible: (i) direct lobes 152a, 152b of the illumination pattern 101' in the x-z cross-section are interdependently controlled with respect to each other; and (ii) direct lobes 152a, 152b of the illumination pattern 101' in the x-z cross-section are independently controlled with respect to indirect lobe 162a of the illumination pattern 101' in the x-z cross-section.

Figure 1D:
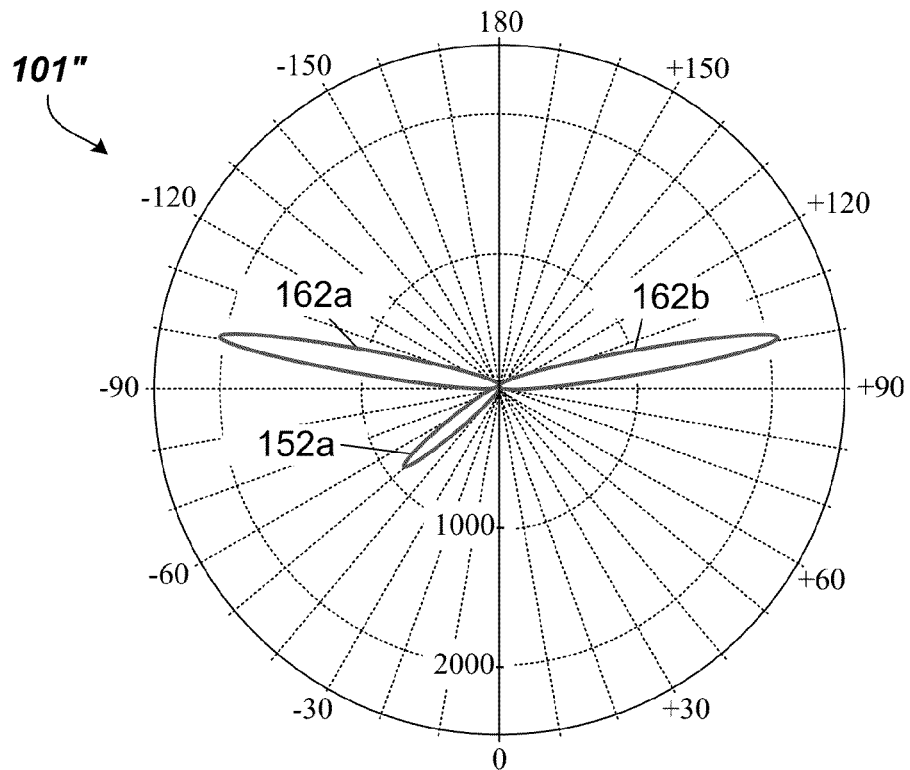

FIG. 1D shows an x-z cross-section of light intensity profile 101" of a third implementation of the illumination device 100 that is elongated along the y-axis (perpendicular to the sectional plane of FIG. 1A). In this implementation, the illumination device will be denoted 100". Direct lobe 152a of the light intensity profile 101" represents direct light output by the illumination device 100" and corresponds to direct angular range 152'. Indirect lobes 162a and 162b of the light intensity profile 101" represent indirect light output by the illumination device 100" and correspond to respective indirect angular ranges 162' and 162. As described in detail below, composition and geometry of components of the illumination device 100" can affect the light intensity profile 101".

The light intensity profile 101" illustrated in FIG. 1D is generated by an illumination device 100" with a direct illumination portion 100-1" that includes an optical extractor 140" configured to redirect light received in angular range 135 into a single angular range 142', and further includes a single secondary reflector 150' arranged and configured to output the light redirected in angular range 142' into direct angular range 152' corresponding to direct lobe 152a. Additionally, in this case, a first portion of the indirect optics 160 of the indirect illumination portion 100-2 of the illumination device 100" is configured to output light emitted by a first set of the indirect LEEs 112' in angular range 115' into indirect angular range 162 corresponding to indirect lobe 162b, and a second portion of the indirect optics 160 is configured to output light emitted by a second set of the indirect LEEs 112' in angular range 115' into indirect angular range 162' corresponding to lobe 162a.

In some implementations, the direct LEEs 112 and/or the indirect LEEs 112' can have multiple correlated color temperatures (CCT) or other chromaticities. The direct LEEs 112 and/or the indirect LEEs 112' with multiple CCT can be controlled (e.g., certain direct LEEs 112 and/or indirect LEEs 112' may be selectively powered on/off, dimmed, etc., during operation) to interpolate between the CCTs and intensity levels in either of indirect lobes 162a, or 162b, or direct lobe 152a. In this manner, the CCT corresponding to the lobes or combinations of lobes can be modified from a bluish to a reddish CCT throughout the day to accomplish certain bioluminous effects, for instance.

Moreover, as the first set of indirect LEEs 112' can be powered independently from the second set of indirect LEEs 112' of the indirect illumination portion 100-2 of the illumination device 100" and from the direct LEEs 112 of the direct illumination portion 100-1" of the illumination device 100", multiple configurations of the light intensity profile 101" shown in FIG. 1D are possible for the illumination device 100", as indicated in Table 3 below.

TABLE 3

| LEE power combinations | Direct illumination Lobe 152a | Indirect illumination Lobe 162a | Indirect illumination Lobe 162b |
|---|---|---|---|
| Direct LEEs 112 ON; 1st set of indirect LEEs 112' ON; 2nd set of indirect LEEs 112' ON | ON | ON | ON |
| Direct LEEs 112 ON; 1st set of indirect LEEs 112' OFF; 2nd set of indirect LEEs 112' ON | ON | OFF | ON |
| Direct LEEs 112 ON; 1st set of indirect LEEs 112' ON; 2nd set of indirect LEEs 112' OFF | ON | ON | OFF |
| Direct LEEs 112 ON; 1st set of indirect LEEs 112' OFF; 2nd set of indirect LEEs 112' OFF | ON | OFF | OFF |
| Direct LEEs 112 OFF; 1st set of indirect LEEs 112' ON; 2nd set of indirect LEEs 112' ON | OFF | ON | ON |
| Direct LEEs 112 OFF; 1st set of indirect LEEs 112' OFF; 2nd set of indirect LEEs 112' ON | OFF | OFF | ON |
| Direct LEEs 112 OFF; 1st set of indirect LEEs 112' ON; 2nd set of indirect LEEs 112' OFF | OFF | ON | OFF |
| Direct LEEs 112 OFF; 1st set of indirect LEEs 112' OFF; 2nd set of indirect LEEs 112' OFF | OFF | OFF | OFF |

In accordance with the various manners of powering the direct and indirect LEEs shown in Table 3, the following interdependent or independent ways of controlling the intensity distribution associated with the illumination device 100" are possible: (i) direct lobe 152a of the illumination pattern 101" in the x-z cross-section is independently controlled with respect to each of indirect lobes 162a, 162b of the illumination pattern 101" in the x-z cross-section; and (ii) indirect lobes 162a, 162b of the illumination pattern 101" in the x-z cross-section are independently controlled with respect to each other.

Figure 1E:
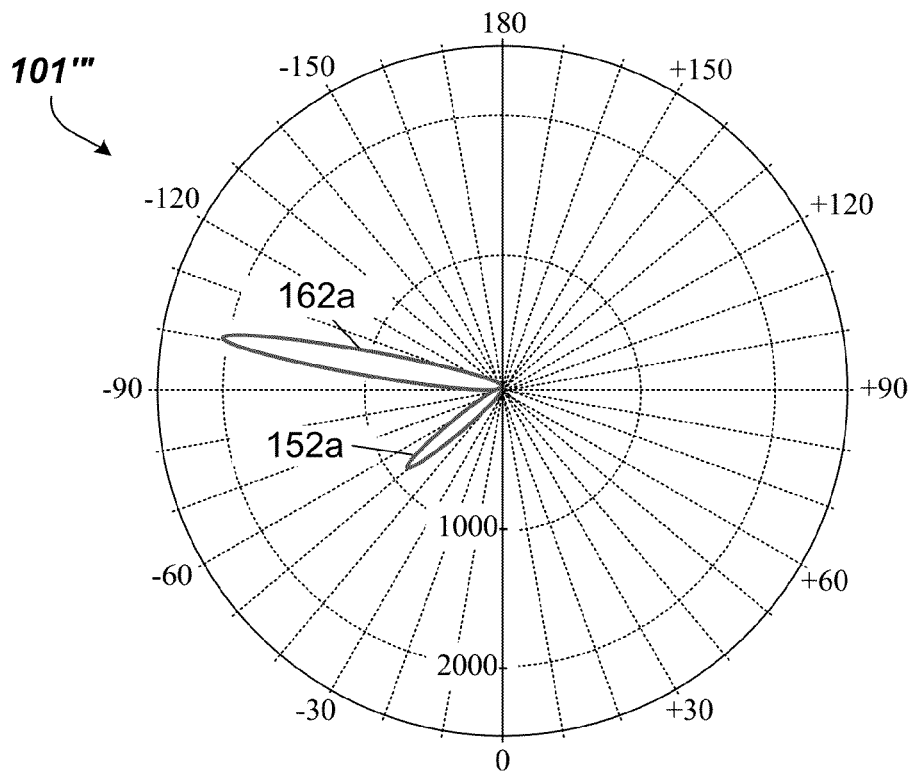

FIG. 1E shows an x-z cross-section of light intensity profile 101'" of a fourth implementation of the illumination device 100 that is elongated along the y-axis (perpendicular to the sectional plane of FIG. 1A). In this implementation, the illumination device will be denoted 100'". Direct lobe 152a of the light intensity profile 101'" represents direct light output by the illumination device 100'" and corresponds to direct angular range 152'. Indirect lobe 162a of the light intensity profile 101'" represents indirect light output by the illumination device 100'" and corresponds to indirect angular range 162'. As described in detail below, composition and geometry of components of the illumination device 100'" can affect the light intensity profile 101'".

The light intensity profile 101'" illustrated in FIG. 1E is generated by an illumination device 100' with a direct illumination portion 100-1" that includes an optical extractor 140" configured to redirect light received in angular range 135 into a single angular range 142', and further includes a single secondary reflector 150' arranged and configured to output the light redirected in angular range 142' into direct angular range 152' corresponding to direct lobe 152a. Additionally, in this case, the indirect optics 160 of the indirect illumination portion 100-2' of the illumination device 100'" is configured to output light emitted by the indirect LEEs 112' in angular range 115' into indirect angular range 162' corresponding to lobe 162a.

In some implementations, the direct LEEs 112 and/or the indirect LEEs 112' can have multiple correlated color temperatures (CCT) or other chromaticities. The direct LEEs 112 and/or the indirect LEEs 112' with multiple CCT can be controlled (e.g., certain direct LEEs 112 and/or indirect LEEs 112' may be selectively powered on/off, dimmed, etc., during operation) to interpolate between the CCTs and intensity levels in either of indirect lobe 162a or direct lobe 152a. In this manner, the CCT corresponding to the direct and indirect lobes can be modified from a bluish to a reddish CCT throughout the day to accomplish certain bioluminous effects, for instance.

Moreover, as the indirect LEEs 112' of the indirect illumination portion 100-2' of the illumination device 100' can be powered independently from the direct LEEs 112 of the direct illumination portion 100-1" of the illumination device 100', multiple configurations of the light intensity profile 101'" shown in FIG. 1E are possible for the illumination device 100'", as indicated in Table 4 below.

TABLE 4

| LEE power combinations | Direct illumination Lobe 152a | Indirect illumination Lobe 162a |
|---|---|---|
| Direct LEEs 112 ON; Indirect LEEs 112' ON | ON | ON |
| Direct LEEs 112 ON; Indirect LEEs 112' OFF | ON | OFF |
| Direct LEEs 112 OFF; Indirect LEEs 112' ON | OFF | ON |
| Direct LEEs 112 OFF; Indirect LEEs 112' OFF | OFF | OFF |

In accordance with the various manners of powering the direct and indirect LEEs shown in Table 4, the direct lobe 152a of the illumination pattern 101'" in the x-z cross-section is independently controlled with respect to the indirect lobe 162a of the illumination pattern 101'" in the x-z cross-section.

(i-d) Components of the Direct and Indirect Illumination Portions of the Illumination Device In general, each of direct 100-1 and indirect 100-2 illumination portions is configured to emit direct light originating from direct light emitting elements 112 and/or indirect light from indirect light emitting elements 112'. The direct and indirect LEEs may be organic or inorganic light-emitting diodes or a combination thereof.

In general, the illumination device 100 is configured to generate light of a desired chromaticity. In many applications, illumination device 100 is configured to provide broadband light. Broadband light can be generated using nominally white or off-white LEEs or colored LEEs whose emissions are mixed to provide white light. Alternatively, or additionally, white light can be generated using LEEs configured to emit pump light (e.g., blue, violet or ultra-violet light) in conjunction with a wavelength conversion material. For example, in certain implementations, LEEs 112 include GaN-based pump LEDs with an overlying phosphor layer (e.g., YAG) that creates yellow, red and/or green components to produce white light.

In some implementations, the illumination device 100 may be configured to provide colored light (e.g., yellow, red, green, blue light). Different LEEs in the illumination device 100 can be configured to emit nominally different light under operating conditions, for example yellow, red, green, blue, white or other color light.

In general, relatively energy efficient LEEs 112, 112' can be used. For example, LEEs 112, 112' can have an output efficiency of about 50 lm/W or more (e.g., about 75 lm/W or more, about 100 lm/W, about 125 lm/W or more, about 150 lm/W or more). In certain implementations, LEEs 112, 112' conduct current greater than about 350 mA (e.g., 400 mA or more, 450 mA or more, 500 mA or more). LEEs may be surface mount devices.

The number of LEEs 112, 112' in an illumination device can vary. In some implementations, the illumination device 100 can include relatively few LEEs (e.g., 10 or fewer). In some implementations, the illumination device 100 can include a large number of LEEs (e.g., 100 or more). In many applications, however, the illumination device 100 includes between 4 and 100 LEEs.

Each of the optical couplers 120 and indirect optic(s) 160 is configured to receive light from one or more of the direct LEEs 112 through an entrance aperture of the optical coupler/indirect optic(s). In implementations that feature multiple optical couplers/indirect optic(s), they may be integrally formed. Each optical coupler/indirect optic(s) can be configured to provide a predetermined amount of light at an exit aperture of the optical coupler/indirect optic(s). For this purpose, each optical coupler/indirect optic(s) is optically coupled with the corresponding LEEs and the light guide (when applicable). Adjacent optical couplers/indirect optics may be optically isolated or optically coupled to control cross talk and/or collimation of light or other functions in one or more planes parallel to the optical axes of the optical couplers/indirect optics or in other directions.

The optical couplers/indirect optics are configured to allow coupling of a predetermined amount of light from one or more of the LEEs 112, 112' into the optical couplers/indirect optics and a predetermined amount of that light is provided at the exit apertures of the optical couplers/indirect optics. Each optical coupler/indirect optics is configured to transform light as it interacts with the optical coupler/indirect optic between the entrance aperture and the exit aperture. Such transformations, also referred to as conditioning, may be regarded as transformations of the phase space of light including collimation of light (e.g. causing a reduction of the divergence of the coupled light) or other transformations, and/or preservation of etendue, light flux and/or other parameters, for example. In some implementations, the optical couplers/indirect optics are configured to provide light with predetermined properties to control light losses in other components of the illumination device, including one or more of the light guide 130, extractor 140, direct secondary reflector 150, 150' or other components of the illumination device. For example, the optical couplers may be configured so that substantially all light provided thereby (e.g., 95% or more of the provided by the optical couplers) can propagate through the light guide 130 to the optical extractor 140, has less than a predetermined divergence, is injected into the light guide at suitable angles relative to the optical interfaces of the light guide 130 or has other properties.

Optical couplers/indirect optics can include one or more optical elements including non-imaging transparent TIR concentrators, such as CPC (compound parabolic concentrators), CECs (compound elliptical concentrators), CHC (compound hyperbolic concentrators), tapered or untapered portions, light pipes, segmented concentrators, other geometry concentrators, one or more lenses or other optical elements, for example. In some implementations, optical couplers/indirect optics and LEEs 112, 112' are integrally formed as a single component.

The illumination device 100 may include a number of optical couplers/indirect optics with the same or different configuration. Optical couplers/indirect optics may have equal or different profiles or cross sections in different directions. In some implementations, optical couplers/indirect optics may have varying configurations depending on their location within a cluster or group of optical couplers/indirect optics. For example, optical couplers/indirect optics proximate the ends of an elongate illumination device 100 may be configured with properties different from those of optical couplers/indirect optics near the center of the illumination device 100. Like considerations may apply in implementations in which the optical couplers/indirect optics are disposed in clusters proximate an optical axis. For example, optical couplers/indirect optics proximate the periphery of a cluster may be configured with properties different from those proximate the optical axis. An optical coupler/indirect optic may have rotationally symmetric and/or asymmetric cross sections, for example it may have parabolic, elliptical, circular, hyperbolic, triangular, square, rectangular, hexagonal or other regular or irregular polygonal or other cross sections.

A portion or all of the optical coupler 120/indirect optic 160 may be made of a solid transparent body configured to propagate light internally and solely, partially or not at all, depending on whether a specular reflective coating is employed on the outside of the solid transparent body, rely on TIR, or may be configured to provide a through hole that is partially or fully reflectively coated on one or more optical surfaces. Like consideration may apply to the light guide 130, the optical extractors 140 or other components of the illumination device 100, for example. Depending on the implementation, one or more optical couplers 120/indirect optics 160 may be configured as hollow, reflectively coated non-imaging optical couplers/indirect optics. One or more of the optical couplers 120/indirect optics 160 may include a transparent collimating optic configured to provide a predetermined collimation angle. The collimation angle may be determined by the length and/or shape of respective surfaces of the optical coupler 120/indirect optics 160, for example. An optical coupler 120/indirect optic 160 may be configured to provide substantially equal collimation (e.g., no more than 5% different) about an optical axis in rotationally symmetrical configurations or may provide different collimation in different directions with respect to an optical plane of the optical coupler 120/indirect optics 160 and/or other component of the illumination device, for example.

In general, light guide 130 can have a generally regular or irregular prismatic, cylindrical, cuboid or other shape and include one or more light guide elements. Light-guide elements may be arranged in a line or a cluster that may or may not allow light to transmit between light-guide elements. Light-guide elements may be arranged in parallel with one light-guide element for each coupler. Such configurations may be integrally formed. Multiple light-guide elements may be arranged in a cluster, the light-guide elements of the cluster coupling light into one or more extractors 140. Multiple light-guide elements may be disposed abutting one another or placed apart at predetermined distances. The light guide 130 and/or one or more light-guide elements may be integrally formed, modularly configured, arranged and/or durably disposed via a suitably configured interconnect system during manufacture, installation, servicing or other event.

The light guide 130 and/or one or more light-guide elements may be configured to have one or more reflective surfaces defining one or more mantles that extend from a first end 131 to a second end 132 of the light guide 130 for enclosing and enabling optical confinement proximate an optical axis or optical plane along which the light guide 130 can guide light with below predetermined light losses. One or more surfaces of the mantle may be parallel, tapered or otherwise arranged. Such surfaces may be flat or curved. Generally, the light guide 130 can have elongate or non-elongate cross section with respect to an axes or planes of the illumination device. Non-elongate light-guides may be rotationally or otherwise symmetric about an optical axis.

The light guide 130 is configured to guide light from the one or more optical couplers 120 via its optical surfaces, by total internal reflection (TIR) and/or specular reflection. Mixing of the light in the light-guide elements may be achieved in part by the shape of the optical surfaces. The light guide may be configured to intermix light from different direct LEEs 112. In some implementations, the light guide 130 is configured to mix light and to provide light with a predetermined uniformity in color and/or illuminance to the optical extractor 140.

In some implementations, the light guide 130 has a hollow configuration having reflective optical surfaces on its inside that transmit light along the length of the hollow with predetermined light-loss properties. The reflectivity of the reflective optical surfaces may originate from or be enhanced by reflective coatings, films, layers or other reflective aids. The composition of and manner in which such reflective coatings may be disposed and/or manufactured would be readily known by a person skilled in the art.

Optical extractor 140 is disposed at an end of the light guide 132 opposite the optical coupler 120 and includes one or more reflective interfaces that are configured to redirect light from the light guide 130 outward away from the optical axis of the light guide 130 towards and through one or more light-exit surfaces of the optical extractor 140 into the ambient. Depending on the implementation, the directions of propagation of the emitted light may be parallel, antiparallel and/or oblique, that is backward and/or forward, with respect to the optical axis of the light guide 130.

The optical extractor 140 may be configured to emit one or more beams of light with predetermined intensity distributions (i.e., into specific ranges of solid angles). For example, different intensity distributions may be provided via different light-exit surfaces, for example on either side of an elongate optical extractor 140. The optical extractor 140 and/or one or more portions thereof from which light appears to emanate under operating conditions may be referred to as a virtual light source. Depending on the implementations, the virtual light source can have an elongate or non-elongate configuration. The one or more beams may be symmetric or asymmetric with respect to the illumination device 100. A non-elongate configuration may have rotational symmetry about an optical axis. The intensity distributions or one or more portions thereof may be configured to limit glare by limiting direct downward lighting to predetermined levels, for example.

In some implementations, the intensity distribution of the optical extractor 140, at least in part, may be determined by the configuration and disposition of the reflective interfaces relative to the light-exit surfaces of the optical extractor 140. The optical extractor 140 may include one or more reflective interfaces having one or more flat or curved shapes including parabolic, hyperbolic, circular, elliptical or other shapes. In certain implementations, the optical extractor 140 includes one or more reflective coatings to redirect light and provide a desired emission pattern. The reflective interface may have a linear, convex, concave, hyperbolic, linear segmented or other cross section shaped as a plurality of potentially disjoint, piecewise differentiable curves, in order to achieve a predetermined emission pattern. In general, the optical extractor 140 may provide symmetrical or asymmetrical beam distributions with respect to an optical axis or optical plane thereof. In elongate implementations the cross sections of reflective interfaces and/or light-exit surfaces may change along an elongate extension thereof. Such variations may be stepwise or continuous. For instance, the reflective interface of the optical extractor 140 may have a first cross section shaped as a plurality of potentially disjoint, piecewise differentiable first curves, and a second cross section at a different location along the elongate extension of the reflective interface, such that the second cross section is shaped as a different plurality of potentially disjoint, piecewise differentiable second curves.

In certain implementations, the reflective optical interfaces may have a symmetrical or asymmetrical v-shaped or other cross section. A v-shaped cross section may also be referred to as a v-groove in elongate implementations or a conical cavity in non-elongate implementations. As used herein, the term "v-groove" refers to the v-shaped cross-section through the reflective optical interfaces, but does not require that the optical extractor include an actual groove. For example, in some implementations, the optical extractor includes two portions of solid material that meet at a v-shaped interface. Such an interface is also referred to as a v-groove. Depending on the implementation, a v-groove may have substantially equal cross section along a length of the optical extractor (e.g., deviating by 2% or less from equal cross section) or it may vary depending on the position along the elongate extension. The first apex formed by such v-shaped reflective interfaces may be generally directed towards the light guide. In addition, the sides forming the v-groove may have linear cross-sections, or may be non-linear (e.g., curved or faceted). Moreover, the first apex of the reflective optical interfaces can be a rounded apex (or vertex) with a non-zero radius of curvature.

Generally, the optical extractor 140 can be integrally or modularly formed with the light guide 130. The optical extractor may be formed of one or more materials equal, similar or dissimilar to that of the light guide and include one or more different materials. Depending on the implementation, the optical extractor 140 may be configured to redirect light via TIR, specular and/or diffuse reflection, for example, via a dielectric or metallic mirror surface, refraction and/or otherwise. The optical extractor 140 may include one or more coatings including one or more films of suitable dielectric, metallic, wavelength conversion material or other material. Depending on the implementation, a modularly formed optical extractor and light guide may include or be interconnected with suitable connectors for durable interconnection and optional registration during manufacture, assembly, service or other event. Different modular optical extractors may have different configurations to provide different lighting properties. To improve optical and/or mechanical performance, a coupling between the optical extractor 140 and the light guide 130 may be established by employing one or more suitably transparent compounds with predetermined refractive indices. Such compounds may include at least initially fluid substances such as silicone or other curable or non-curable substances. Such substances may provide an adhesive function.

Each of the light-exit surfaces and/or the reflective interfaces of the optical extractor 140 may include one or more segments, each having a predetermined shape including convex, concave, planar or other shape. Shapes of the light-exit surface and/or the reflective interfaces can be determined to provide predetermined levels of light extraction via the optical extractor and to limit light losses due to back reflection and/or absorption of light within the optical extractor.

In general, direct secondary reflectors 150, 150' may be configured to redirect light via specular and/or diffuse reflection, or in other ways (e.g., diffraction). The direct secondary reflector 150 can have an elongate or non-elongate configuration. The direct secondary reflector 150 can be considered as a modular component of the illumination device 100 that can be used to facilitate selection of a variety of intensity distributions and therefore generation of lighting conditions, for example, during installation of the illumination device 100.

In some implementations, the direct secondary reflector 150 may be disposed and configured to substantially extend the full length, L, of the light guide 130 (along a y-axis perpendicular to the x-z plane), e.g., over 95% or more of the full length, and surround at least portions of the width, which is along the optical path, of the light guide 130. Depending on the implementation, the direct secondary reflector 150 can include one or more specular or diffusely reflecting surfaces provided by a sheet of metal, such as aluminum or other metal, or reflective plastic, paint or other coating, for example.

The direct secondary reflector 150 can include partially or wholly transparent portions, as a whole be partially transparent in addition to being reflective, or include openings that are suitably shaped to enable light to pass and achieve a predetermined lighting effect, for example. Depending on the implementation, the direct secondary reflector 150 and/or openings in the direct secondary reflector 150 may be configured to provide an illumination effect, support heat dissipation or achieve both illumination and heat dissipation effects. Openings may be configured to facilitate airflow and thereby support convective cooling of the illumination device.

The shape of the direct secondary reflector 150, such as the angle with respect to the target surface, its curvature, and the width of the reflector, can be adapted to generate a predetermined emission pattern for general illumination or particular illumination applications. The direct secondary reflector 150 can include multiple reflective surfaces.

The illumination device 100 may be configured such that the direct secondary reflector 150 can be angularly and/or vertically adjustable to allow calibration and assist in achieving a desired intensity distribution. For this purpose, the illumination device 100 may include one or more hinge or locking mechanisms and/or interconnectors. Such an illumination device can provide predetermined functionality and/or modularity to adjustably accommodate different lighting requirements of different sized rooms including hallway, closed and open plan offices, or other spaces, for example.

The direct secondary reflector 150 may include an areal light source, for example a light-emitting sheet based on a plurality of discrete light sources or organic light emitting diode material. The areal light source may be arranged to emit light on one side and reflect light on an opposite side. The reflective side may be arranged to manipulate light as described herein and the light-emitting side may be configured to provide auxiliary illumination. Depending on the implementation, the illumination device 100 may be configured to provide independent control of the areal light source and the LEEs 112 that are optically coupled with the optical couplers 120.

(ii) Luminaire Module

Part of the direct illumination portion 100-1 of the illumination device 100 that excludes the one or more direct secondary reflectors 150, 150' can be implemented as a luminaire module. Referring to FIG. 2A, in which a Cartesian coordinate system is shown for reference, an implementation of a luminaire module 200 includes a mount 210 having a plurality of direct or indirect LEEs 212 distributed along a first surface of the mount 210. The mount with the LEEs 212 is disposed at a first (e.g., upper) edge 231 of a light guide 230.

Once again, the positive z-direction is referred to as the "forward" direction and the negative z-direction is the "backward" direction. Sections through the luminaire module 200 parallel to the x-z plane are referred to as the "cross-section" or "cross-sectional plane" of the luminaire module. Also, luminaire module 200 extends along the y-direction, so this direction is referred to as the "longitudinal" direction of the luminaire module. Implementations of luminaire modules can have a plane of symmetry parallel to the y-z plane. This is referred to as the "symmetry plane" of the luminaire module.

Multiple LEEs 212 are disposed on the first surface of the mount 210, although only one of the multiple LEEs 212 is shown in FIG. 2A. For example, the plurality of LEEs 212 can include multiple white LEDs. The LEEs 212 are optically coupled with one or more optical couplers 220 (only one of which is shown in FIG. 2A). An optical extractor 240 is disposed at second (e.g., lower) edge 232 of light guide 230.

Mount 210, light guide 230, and optical extractor 240 extend a length L along the y-direction, so that the luminaire module is an elongated luminaire module with an elongation of L that may be about parallel to a wall of a room (e.g., a ceiling of the room). Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, or, 150 cm or more).

The number of LEEs 212 on the mount 210 will generally depend, inter alia, on the length L, where more LEEs are used for longer luminaire modules. In some implementations, the plurality of LEEs 212 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and illuminance desired from the luminaire module. For example, a relatively high density of LEEs can be used in applications where high illuminance is desired or where low power LEEs are used. In some implementations, the luminaire module 200 has LEE density along its length of 0.1 LEE per centimeter or more (e.g., 0.2 per centimeter or more, 0.5 per centimeter or more, 1 per centimeter or more, 2 per centimeter or more). In implementations, LEEs can be evenly spaced along the length, L, of the luminaire module. In some implementations, a heat-sink 205 can be attached to the mount 210 to extract heat emitted by the plurality of LEEs 212. The heat-sink 205 can be disposed on a surface of the mount 210 opposing the side of the mount 210 on which the LEEs 212 are disposed.

Optical coupler 220 includes one or more solid pieces of transparent optical material (e.g., a glass material or a transparent organic plastic, such as polycarbonate or acrylic) having surfaces 221 and 222 positioned to reflect light from the LEEs 212 towards the light guide 230. In general, surfaces 221 and 222 are shaped to collect and at least partially collimate light emitted from the LEEs. In the x-z cross-sectional plane, surfaces 221 and 222 can be straight or curved. Examples of curved surfaces include surfaces having a constant radius of curvature, parabolic or hyperbolic shapes. In some implementations, surfaces 221 and 222 are coated with a highly reflective material (e.g., a reflective metal, such as aluminum or silver), to provide a highly reflective optical interface. The cross-sectional profile of optical coupler 220 can be uniform along the length L of luminaire module 200. Alternatively, the cross-sectional profile can vary. For example, surfaces 221 and/or 222 can be curved out of the x-z plane.

The surface of optical coupler 220 adjacent upper edge of light guide 231 is optically coupled to edge 231 to facilitate efficient coupling of light from the optical coupler 220 into light guide 230. In other words, the surfaces of the interface are attached using a material that substantially matches the refractive index of the material forming the optical coupler 220 or light guide 230 or both (e.g., refractive indices across the interface are different by 2% or less.) For example, optical coupler 220 can be affixed to light guide 230 using an index matching fluid, grease, or adhesive. In some implementations, optical coupler 220 is fused to light guide 230 or they are integrally formed from a single piece of material (e.g., coupler and light guide may be monolithic and may be made of a solid transparent optical material).

Light guide 230 is formed from a piece of transparent material (e.g., glass material such as BK7, fused silica or quartz glass, or a transparent organic plastic, such as polycarbonate or acrylic) that can be the same or different from the material forming optical couplers 220. Light guide 230 extends length L in the y-direction, has a uniform thickness T in the x-direction, and a uniform depth D in the z-direction. The dimensions D and T are generally selected based on the desired optical properties of the light guide (e.g., which spatial modes are supported) and/or the direct/indirect intensity distribution. During operation, light coupled into the light guide 230 from optical coupler 220 (depicted by rays 252) reflects off the planar surfaces of the light guide by TIR and spatially mixes within the light guide. The mixing can help achieve illuminance and/or color uniformity at the distal portion of the light guide 232 at optical extractor 240. The depth, D, of light guide 230 can be selected to achieve adequate uniformity at the exit aperture (i.e., at end 232) of the light guide. In some implementations, D is in a range from about 1 cm to about 20 cm (e.g., 2 cm or more, 4 cm or more, 6 cm or more, 8 cm or more, 10 cm or more, 12 cm or more).

In general, optical couplers 220 are designed to restrict the angular range of light entering the light guide 230 (e.g., to within +/−40 degrees) so that at least a substantial amount of the light (e.g., 95% or more of the light) is optically coupled into spatial modes in the light guide 230 that undergoes TIR at the planar surfaces. Light guide 230 has a uniform thickness T, which is the distance separating two planar opposing surfaces of the light guide. Generally, T is sufficiently large so the light guide has an aperture at first (e.g., upper) surface 231 sufficiently large to approximately match (or exceed) the aperture of optical coupler 220. In some implementations, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the implementation, the narrower the light guide the better it may spatially mix light. A narrow light guide also provides a narrow exit aperture. As such light emitted from the light guide can be considered to resemble the light emitted from a one-dimensional linear light source, also referred to as an elongate virtual filament.

While optical coupler 220 and light guide 230 are formed from solid pieces of transparent optical material, hollow structures are also possible. For example, the optical coupler 220 or the light guide 230 or both may be hollow with reflective inner surfaces rather than being solid. As such material cost can be reduced and absorption in the light guide avoided. A number of specular reflective materials may be suitable for this purpose including materials such as 3M Vikuiti™ or Miro IV™ sheet from Alanod Corporation where greater than 90% of the incident light would be efficiently guided to the optical extractor. Optical extractor 240 is also composed of a solid piece of transparent optical material (e.g., a glass material or a transparent organic plastic, such as polycarbonate or acrylic) that can be the same as or different from the material forming light guide 230. In the example implementation shown in FIG. 2A, the piece of transparent material includes redirecting (e.g., flat) surfaces 242 and 244 and curved surfaces 246 and 248. The flat surfaces 242 and 244 represent first and second portions of a redirecting surface 243, while the curved surfaces 246 and 248 represent first and second output surfaces of the luminaire module 200.

Flat surfaces 242 and 244 are coated with a highly reflective material (e.g., a highly reflective metal, such as aluminum or silver) over which a protective coating may be disposed. For example, the material forming such a coating may reflect about 95% or more of light incident thereon at appropriate (e.g., visible) wavelengths. Thus, surfaces 242 and 244 provide a highly reflective optical interface for light entering an input end of the optical extractor 232' from light guide 230. In the x-z cross-sectional plane, the lines corresponding to surfaces 242 and 244 have the same length and form an apex or vertex 241, e.g. a v-shape that meets at the apex 241. In general, an included angle (e.g., the smallest included angle between the surfaces 244 and 242) of the redirecting surfaces 242, 244 can vary as desired. For example, in some implementations, the included angle can be relatively small (e.g., from 30° to 60°). In certain implementations, the included angle is in a range from 60° to 120° (e.g., about 90°). The included angle can also be relatively large (e.g., in a range from 120° to 150° or more). In the example implementation shown in FIG. 2A, the output surfaces 246, 248 of the optical extractor 240 are curved with a constant radius of curvature that is the same for both. In an aspect, the output surfaces 246, 248 may have optical power (e.g., may focus or defocus light.) Accordingly, luminaire module 200 has a plane of symmetry intersecting apex 241 parallel to the y-z plane.

The surface of optical extractor 240 adjacent to the lower edge 232 of light guide 230 is optically coupled to edge 232. For example, optical extractor 240 can be affixed to light guide 230 using an index matching fluid, grease, or adhesive. In some implementations, optical extractor 240 is fused to light guide 230 or they are integrally formed from a single piece of material.

The emission spectrum of the luminaire module 200 corresponds to the emission spectrum of the LEEs 212. However, in some implementations, a wavelength-conversion material may be positioned in the luminaire module, for example remote from the LEEs, so that the wavelength spectrum of the luminaire module is dependent both on the emission spectrum of the LEEs and the composition of the wavelength-conversion material. In general, a wavelength-conversion material can be placed in a variety of different locations in luminaire module 200. For example, a wavelength-conversion material may be disposed proximate the LEEs 212, adjacent surfaces 242 and 244 of optical extractor 240, on the exit surfaces 246 and 248 of optical extractor 240, placed at a distance from the exit surfaces 246 and 248 and/or at other locations.

The layer of wavelength-conversion material (e.g., phosphor) may be attached to light guide 230 held in place via a suitable support structure (not illustrated), disposed within the extractor (also not illustrated) or otherwise arranged, for example. Wavelength-conversion material that is disposed within the extractor may be configured as a shell or other object and disposed within a notional area that is circumscribed by R/n or even smaller $R*(1+n^2)^{(-1/2)}$, where R is the radius of curvature of the light-exit surfaces (246 and 248 in FIG. 2) of the extractor and n is the index of refraction of the portion of the extractor that is opposite of the wavelength-conversion material as viewed from the reflective surfaces (242 and 244 in FIG. 2A). The support structure may be transparent self-supporting structure. The wavelength-conversion material diffuses light as it converts the wavelengths, provides mixing of the light and can help uniformly illuminate secondary reflectors 150, 150'.

During operation, light exiting light guide 230 through end 232 impinges on the reflective interfaces at portions of the redirecting surface 242 and 244 and is reflected outwardly towards output surfaces 246 and 248, respectively, away from the symmetry plane of the luminaire module. The first portion of the redirecting surface 242 provides light having an angular distribution 138 towards the output surface 246, the second portion of the redirecting surface 244 provides light having an angular distribution 138' towards the output surface 246. The light exits optical extractor through output surfaces 246 and 248. In general, the output surfaces 246 and 248 have optical power, to redirect the light exiting the optical extractor 240 in angular ranges 142 and 142', respectively. For example, optical extractor 240 may be configured to emit light upwards (i.e., towards the plane intersecting the LEEs and parallel to the x-y plane), downwards (i.e., away from that plane) or both upwards and downwards. In general, the direction of light exiting the luminaire module through surfaces 246 and 248 depends on the divergence of the light exiting light guide 230 and the orientation of surfaces 242 and 244.

Surfaces 242 and 244 may be oriented so that little or no light from light guide 230 is output by optical extractor 240 in certain directions. In implementations where the luminaire module 200 is attached to a ceiling of a room (e.g., the forward direction is towards the floor) such configurations can help avoid glare and an appearance of non-uniform illuminance.

Figure 3:
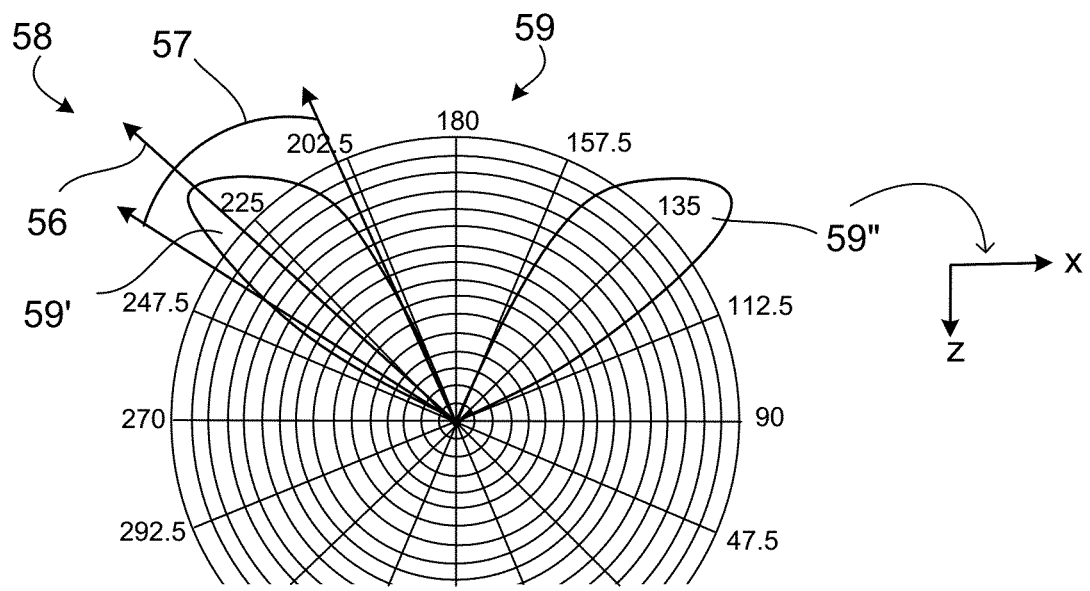
FIG. 3 is an intensity profile of an implementation of a luminaire module.

In general, the light intensity distribution provided by luminaire module 200 reflects the symmetry of the luminaire module's structure about the y-z plane. For example, referring to FIG. 3, an exemplary intensity distribution 59 includes symmetric lobes 59' and 59" with peak intensity at approximately 135° and 225°, respectively, corresponding to the light provided by the luminaire module 200. FIG. 3 shows a plot where 0° corresponds to the forward z-direction of the Cartesian coordinate system shown in FIG. 2A, 180° corresponds to the negative z-direction, and 90° and 270° correspond to the positive and negative x-directions, respectively. The intensity distribution output by luminaire module 200 in lux is given by the radius of the plot in a particular direction. In addition, FIG. 3 depicts an angular range 58 that corresponds to the angular range 142' of the light output by the luminaire module 200 through the output surface 248. The light having angular range 58 propagates along a prevalent direction 56 (given by the maximum intensity of the lobe 59' of the intensity distribution 59 associated with the light provided by the luminaire module 200.) Also, the light with angular range 58 has a divergence 57 (given by the width of the lobe 59' of the intensity distribution 59 associated with the light provided by the luminaire module 200.)

In the example shown in FIG. 3, luminaire module 200 provides no illumination in the range from 90° to 270°. All the illumination is directed into a first lobe 59" between 112.5° and 157.5° and a second lobe 59' between 202.5° and 247.5°.

In general, the intensity profile of luminaire module 200 will depend on the configuration of the optical coupler 220, the light guide 230 and the optical extractor 240. For instance, the interplay between the shape of the optical coupler 220, the shape of the redirecting surface 243 of the optical extractor 240 and the shapes of the output surfaces 246, 248 of the optical extractor 240 can be used to control the angular width and prevalent direction (orientation) of the lobes in the intensity profile 59.

In some implementations, the orientation of the lobes 59', 59" can be adjusted based on the included angle of the v-shaped groove 241 formed by the portions of the redirecting surface 242 and 244. For example, a first included angle results in an intensity distribution 59 with lobes 59', 59" located at relatively smaller angles compared to lobes 59', 59" of the intensity distribution 59 that results for a second included angle larger than the first angle. In this manner, light can be extracted from the luminaire module 200 in a more forward direction for the smaller of two included angles formed by the portions of the redirecting surface 242, 244.

Furthermore, while surfaces 242 and 244 are depicted as planar surfaces, other shapes are also possible. For example, these surfaces can be curved or faceted. Curved redirecting surfaces 242 and 244 can be used to narrow or widen the beam. Depending of the divergence of the angular range of the light that is received at the input end of the optical extractor 232', concave reflective surfaces 242, 244 can narrow the lobes 59', 59" output by the optical extractor 240 (and illustrated in FIG. 3), while convex reflective surfaces 242, 244 can widen the lobes 59', 59" output by the optical extractor 240. As such, suitably configured redirecting surfaces 242, 244 may introduce convergence or divergence into the light. Such surfaces can have a constant radius of curvature, can be parabolic, hyperbolic, or have some other curvature.

Luminaire module 200 as described in context of FIG. 2A may be used in the illumination devices described below in connection with FIGS. 5, 13A-B, 14A-B, 18A, 19A and 20A.

Figure 2B:
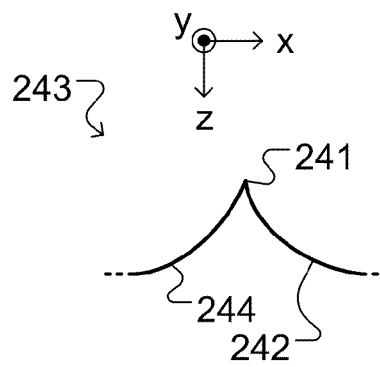
Figure 2C:
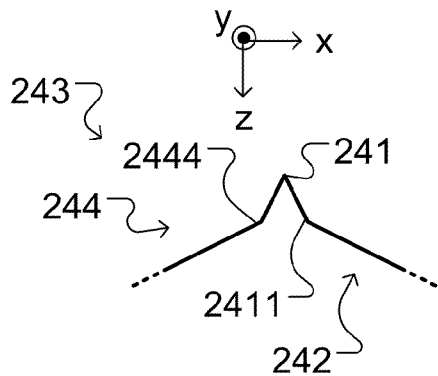
Figure 2D:
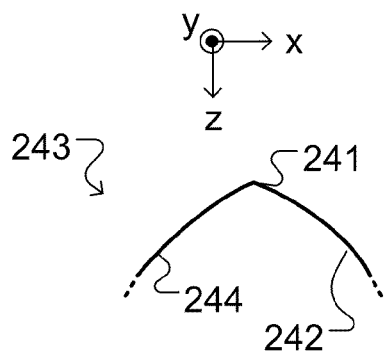

FIGS. 2B and 2D show that for a cross-sectional plane substantially perpendicular to the longitudinal dimension of the luminaire module 200 (e.g., oriented at an angle of 88-92° relative to the longitudinal direction), the redirecting surface 243 (see FIG. 2A) can have an apex 241 that separates the first and second portions of the redirecting surface 242, 244. The apex 241 of the redirecting surface can be a rounded apex with a non-zero radius of curvature. In the example implementations shown in FIGS. 2B and 2D, the first and second portions of the redirecting surface 242, 244 can have first and second arcuate shapes in the cross-sectional plane substantially perpendicular to the longitudinal dimension of the luminaire module 200. For example, the first and second portions of the redirecting surface 242, 244 can be parabolic, hyperbolic, or can have curvatures that are the same as or different from each other. Moreover, curvatures of the first and second portions of the redirecting surface 242, 244 can be both negative (e.g., convex with respect to a direction of propagation of light from the input end of the extractor 232' to the redirecting surface 243), can be both positive (e.g., concave with respect to the propagation direction), or one can be positive (convex) and the other one can be negative (concave).

Figure 2E:
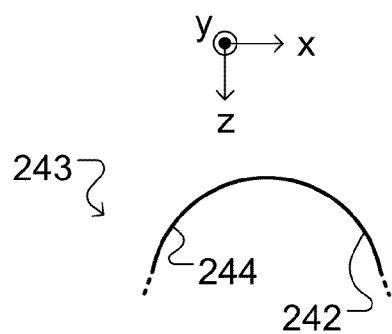

FIG. 2E shows that, for a cross-sectional plane substantially perpendicular to the longitudinal dimension of the luminaire module 200, the redirecting surface 243 can be shaped as an arc of a circle, ellipse, parabola or other curve. In this case, the first and second portions of the redirecting surface 242, 244 represent first and second portions of the arc of the circle. In the example implementation illustrated in FIG. 2E, a curvature of the redirecting surface 243 is negative (e.g., convex with respect to a direction of propagation of light from the input end of the extractor 232' to the redirecting surface 243).

FIG. 2C shows that, for a cross-sectional plane substantially perpendicular to the longitudinal dimension of the luminaire module 200, either of the first and second portions of the redirecting surface 242, 244 can have one or more apexes, in addition to the apex 241 that separates the redirecting surface 242, 244. For example, the first portion of the redirecting surface 242 can have an apex 241 that separates the first portion of the redirecting surface 242 in at least two regions thereof. The regions of the first portion of the redirecting surface 242 separated by the apex 241 can have linear or arcuate shapes. The two regions of the first portion of the redirecting surface 242 can reflect the light received from the input end of the extractor 232' in two different angular subranges. In this manner, light provided by the first portion of the redirecting surface 242 is output at the output surface 246 as two intensity lobes that can be manipulated separately, e.g., to illuminate different targets. Such application is described in this specification in connection with FIGS. 2A, 5, 8A-C, 13A-B, 14A-B, 18-20. As another example, the second portion of the redirecting surface 244 can have an apex 2444 that separates the second portion of the redirecting surface 244 in at least two regions thereof.

Figure 2F:
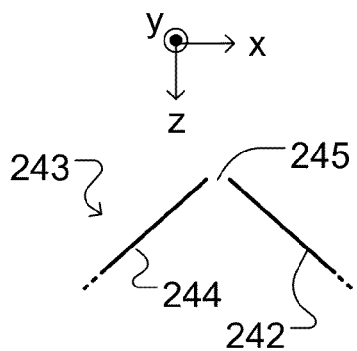
Figure 2G:
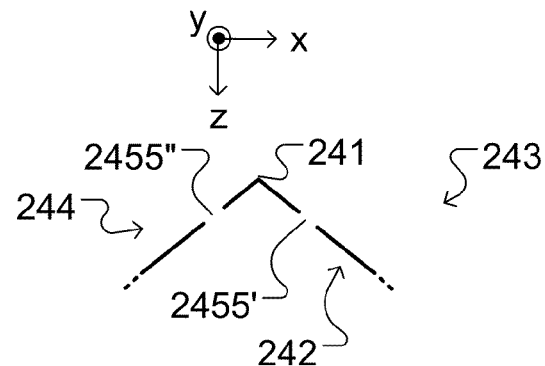

FIG. 2F shows that, in some implementations, the first and second portions of the redirecting surface 242, 244 can be separated, at least in part, by a slot 245, in general a suitably formed aperture. FIG. 2G shows that either the first and second portions of the redirecting surface 242, 244 can include one or more slots 2455', 2455". Each of the slots 245, 2455', 2455" may but does not need to extend along the entire longitudinal extension of the luminaire module 200. Such a slot can, e.g., be an opening in a reflecting layer of the redirecting surface 243 and allows a portion of light received from the input end of the extractor to be transmitted through the slot 245 of the redirecting surface 243. FIG. 2F shows that, for a cross-sectional plane substantially perpendicular to the longitudinal dimension of the luminaire module 200 which intersects the slot 245, first and second curves corresponding to the first and second portions of the redirecting surface 242, 244 are separated by a discontinuity. Moreover, FIG. 2G shows that, for a cross-sectional plane substantially perpendicular to the longitudinal dimension the luminaire module 200 which intersects the slots 2455', 2455", first and second curves corresponding to the first and second portions of the redirecting surface 242, 244 include one or more discontinuities associated with the slots 2455', 2455".

In addition, the curves corresponding to each of the cross-sectional planes illustrated in FIGS. 2B-2G can have different shapes and different discontinuities in other cross-sectional planes along the longitudinal dimension of the luminaire module 200. In general, different cross-sections of a redirecting surface 243 can have different combinations of disjoint or joined piecewise differentiable curves.

Moreover, the shape of output surfaces of the optical extractor 246 and 248 can vary too, and thus, the surfaces 246 and 248 can steer and shape the beam of light. For example, the radius of curvature of these surfaces can be selected so that the surfaces introduce a desired amount of convergence into the light. Aspheric surfaces can also be used. Similar properties noted above in connection with FIGS. 2B-2G regarding contours of the redirecting surface of the extractor 243 in cross-sectional planes substantially perpendicular to the longitudinal dimension of the luminaire module 200 apply to contours of the output surfaces of the extractor 246, 248 in such cross-sectional planes.

In general, applications of the apexes described in FIGS. 2B-G may be the apexes (vertexes) 241, 835, 1935, 2035 employed in the examples illustrated in FIGS. 2A, 5, 8A-C, 13A-B, 14A-B, 19A, 20A, so that the choices of apexes described in FIGS. 2B-G may provide an additional degree of freedom for modifying the (direct or indirect or both) intensity distribution (e.g., illumination pattern) of the light output by the illumination devices 100, 500, 800, 1300, 1400, 1800, 1900, 2000. In general, two or more of the luminaire module 200, the direct secondary reflectors, the indirect optics, the arrangement of indirect and direct LEEs with respect to a mount of an illumination device, and the first and second apexes may be iteratively modified in their spatial position and/or optical properties (spatial shape of reflective surfaces, index of refraction of solid material, spectrum of emitted or guided light etc.) to provide a predetermined direct and/or indirect illumination distribution.

In general, the geometry of the elements can be established using a variety of methods. For example, the geometry can be established empirically. Alternatively, or additionally, the geometry can be established using optical simulation software, such as Lighttools™, Tracepro™, FRED™ or Zemax™, for example.

In general, luminaire module 200 can be designed to emit light into different angular ranges from those shown in FIG. 3. In some implementations, illumination devices can emit light into lobes that have a different divergence or angular width than those shown in FIG. 3. For example, in general, the lobes can have a width of up to 90° (e.g., 80° or less, 70° or less, 60° or less, 50° or less, 40° or less, 30° or less, 20° or less). In general, the direction in which the lobes are oriented can also differ from the directions shown in FIG. 3. The "direction" refers to the direction at which a lobe is brightest. In FIG. 3, for example, the lobes are oriented at approx. 130° and approximately 230°. In general, lobes can be directed more towards the horizontal (e.g., at an angle in the ranges from 90° to 135°, such as at approx. 90°, approx. 100°, approx. 110°, approx. 120°, approx. 130°, and from 225° to 270°, such as at approx. 230°, approx. 240°, approx. 250°, approx. 260°, approx. 270°).

The luminaire modules can include other features useful for tailoring the intensity profile. For example, in some implementations, luminaire modules can include an optically diffuse material that scatters light, thereby homogenizing the luminaire module's intensity profile. For example, surfaces 242 and 244 can be roughened or a diffusely reflecting material, rather than a specular reflective material, can be coated on these surfaces. Accordingly, the optical interfaces at surfaces 242 and 244 can diffusely reflect light, scattering light into broader lobes that would be provided by similar structures utilizing specular reflection at these interfaces. In some implementations these surfaces can include structure that facilitates various intensity distributions. For example, surfaces 242 and 244 can each have multiple planar facets at differing orientations. Accordingly, each facet will reflect light into different directions. In some implementations, surfaces 242 and 244 can have structure thereon (e.g., structural features that scatter or diffract light).

Surfaces 246 and 248 need not be surfaces having a constant radius of curvature. For example, surfaces 246 and 248 can include portions having differing curvature and/or can have structure thereon (e.g., structural features that scatter or diffract light). In certain implementations, a light scattering material can be disposed on surfaces 246 and 248 of optical extractor 240.

Figure 4:
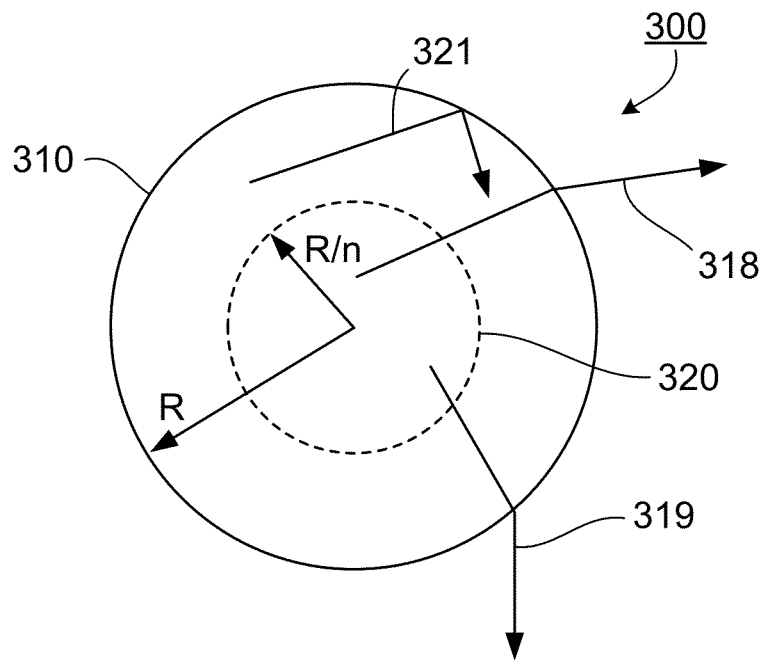
FIG. 4 is a schematic diagram showing aspects of a Weierstrass configuration.

In some implementations, optical extractor 240 is structured so that a negligible amount (e.g., less than 1%) of the light propagating within at least one plane (e.g., the x-z cross-sectional plane) that is reflected by surface 242 or 244 experiences TIR at light-exit surface 246 or 248. For certain spherical or cylindrical structures, a so-called Weierstrass condition can avoid TIR. Referring to FIG. 4, a Weierstrass condition is illustrated for a circular structure 300 (i.e., a cross section through a cylinder or sphere) having a surface 310 of radius R and a concentric notional circle 320 having a radius R/n, where n is the refractive index of the structure. Any light ray that passes through the notional circle 320 within the cross-sectional plane is incident on surface 310 of structure 300 and has an angle of incidence less than the critical angle and will exit structure 300 without experiencing TIR. This is illustrated in FIG. 4 by light rays 318 and 319. Light rays, such as ray 321, propagating within structure 300 in the plane but not emanating from within notional surface 320 can impinge on surface 310 at the critical angle or greater angles of incidence. Accordingly, such light may be subject to TIR and won't exit structure 300. Furthermore, rays of p-polarized light that pass through a notional space circumscribed by an area with a radius of curvature that is smaller than $R/(1+n^2)^{(-1/2)}$, which is smaller than R/n, will not be subject to Fresnel reflection at surface 310 when exiting structure 300. This condition may be referred to as Brewster geometry. Implementations may be configured accordingly.

Referring again to FIG. 2A, in some implementations, all or part of surfaces 242 and 244 may be located within a notional Weierstrass surface defined by surfaces 246 and 248. For example, the portions of surfaces 242 and 244 that receive light exiting light guide 230 through end 232 can reside within this surface so that light within the x-z plane reflected from surfaces 244 and 246 exits through surfaces 246 and 248, respectively, without experiencing TIR.

In the example implementations described above in connection with FIGS. 2A-2G, the luminaire module 200 is configured to output light into output angular ranges 142 and 142'. In other implementations, the light guide-based luminaire module 200 is modified to output light into a single output angular range 142. Such light guide-based luminaire module configured to output light on a single side of the light guide is referred to as a single-sided luminaire module and is denoted 200'. The single-sided luminaire module 200' is elongated along the y-axis like the luminaire module 200 shown in FIG. 2A. Also like the luminaire module 200, the single-sided luminaire module 200' includes a mount 210 and LEEs 212 disposed on a surface of the mount 210 along the y-axis to emit light in a first angular range. The single-sided luminaire module 200' further includes an optical coupler 220 arranged and configured to redirect the light emitted by the LEEs 212 in the first angular range into a second angular range 252 that has a divergence smaller than the divergence of the first angular range at least in the x-z cross-section. Also, the single-sided luminaire module 200' includes a light guide 230 to guide the light redirected by the optical coupler 220 in the second angular range 252 from a first end 231 of the light guide to a second end 232 of the light guide. Additionally, the single-sided luminaire module 200' includes a single-sided extractor (denoted 240') to receive the light guided by the light guide 230. The single-sided extractor 240' includes a redirecting surface 242 to redirect the light received from the light guide 230 into a third angular range 138, and an output surface 246 to output the light redirected by the redirecting surface 242 in the third angular range 138 into a fourth angular range 142. Examples of shapes of the redirecting surface 242 are illustrated in FIGS. 2B-2G.

A light intensity profile of the single-sided luminaire module 200' is represented in FIG. 3 as a single lobe 59". The single lobe 59" corresponds to light output by the single-sided luminaire module 200' in the fourth angular range 142.

(iii) Illumination Device Used in an Embodiment of a Direct Illumination Portion 100-1 of the Illumination Device 100

Figure 5:
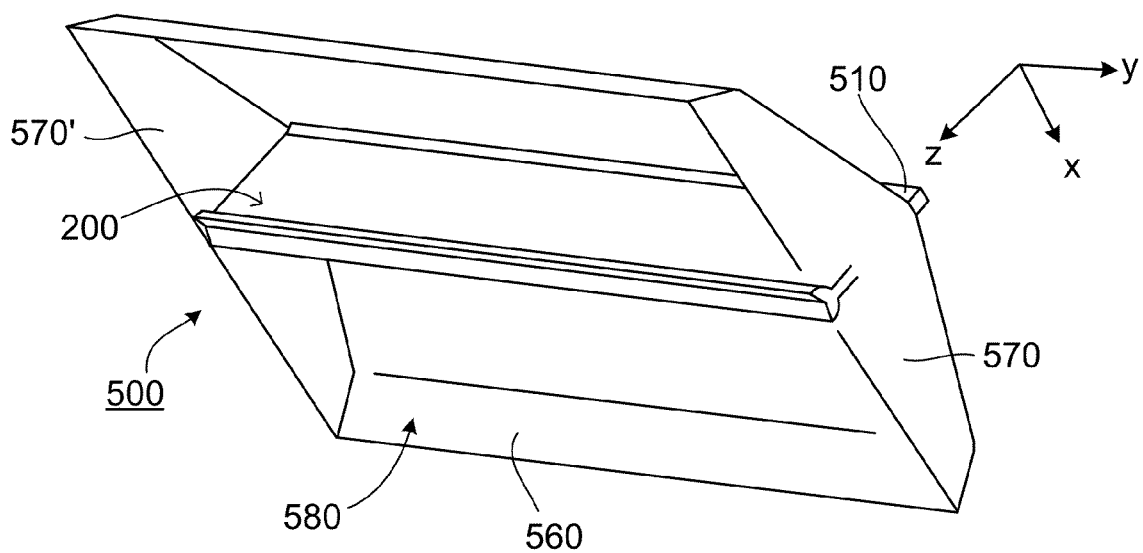
FIG. 5 shows an example of a luminaire including a lightguide, the luminaire used to provide direct intensity distribution.

Luminaire module 200 can be integrated in the direct illumination portion 100-1 of the illumination device 100. For example, with reference to FIG. 5, in some implementations, luminaire module 200 can be integrated into an illumination device 500. When not used as the direct illumination portion 100-1 of the illumination device 100, the illumination device 500 can be installed in or suspended from a ceiling with ceiling panels. For example, illumination device 500 can have a 2'×2' or 2'×4' footprint (e.g., in the x-y plane), corresponding to the size of conventional fixtures that support fluorescent luminaries. Illumination device 500 includes mount 510, luminaire module 200 as shown in FIG. 2A, and direct secondary reflectors 560. Mount 510 can be formed of extruded aluminum and the luminaire module 200 and the secondary reflectors 560 can be attached to the mount 510. Secondary reflectors 560 are closed off at two ends by walls 570 and are configured to reflect all incident light. In other words, illumination device 500 is designed for direct illumination only, e.g. direct illumination towards a work surface. In FIG. 5, one of walls 570 is illustrated in cut away to better show a portion of light guide and optical extractor of the luminaire module 200. Illumination device 500 can be used alone or in multiples to form a suitably sized troffer, for example. In some implementations, illumination device 500 includes a diffusor plate positioned, for example, to cover the opening 580 of the illumination device 500 and protect the luminaire 200 and the secondary reflectors 560 from dust or other environmental effects.

Figure 6:
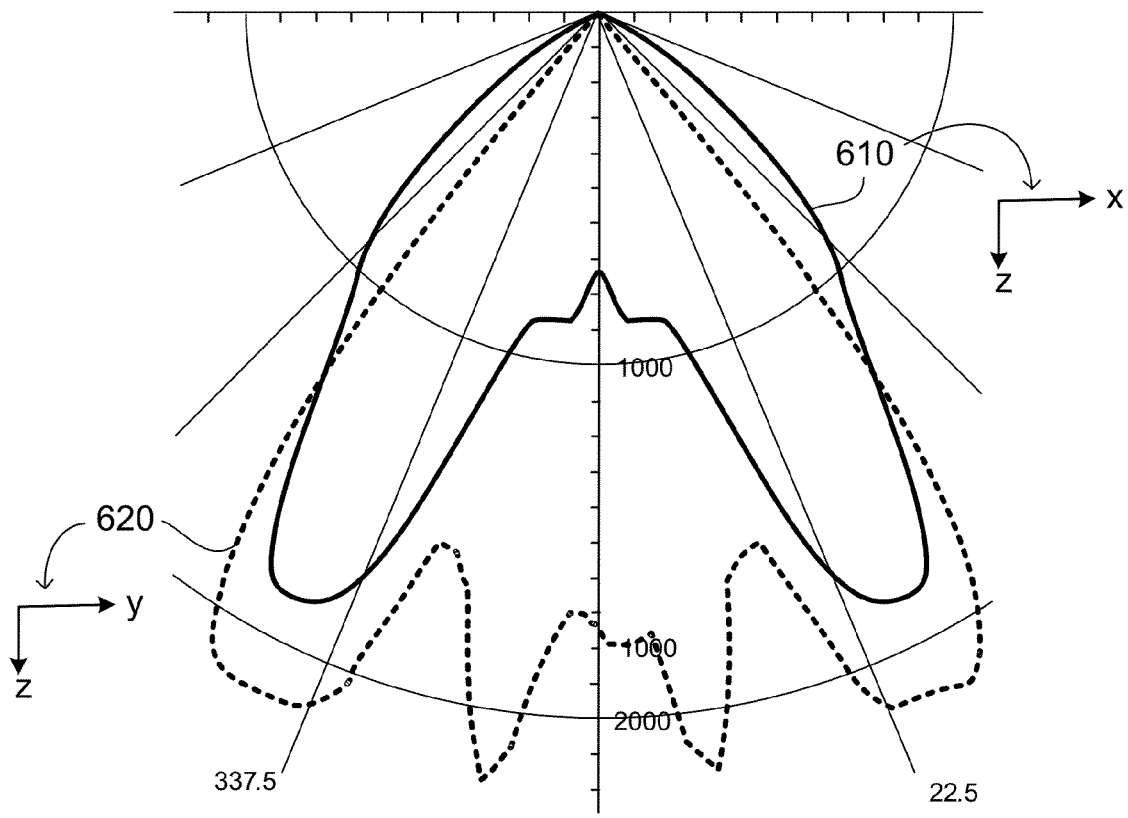
FIG. 6 is an intensity profile provided by the luminaire of FIG. 5.

Composition and geometry of components of the illumination device 500 can affect the intensity distribution provided by the illumination device 500. For example, referring to FIG. 6, in some implementations, illumination device 500 can be configured to direct substantially all of the light into a range of angles between 315° and 45° in a cross-sectional plane of the illumination device 500, where 0° corresponds to the forward direction. The forward direction corresponds to a normal to the mount 510 and parallel to the light guide of the luminaire module 200, and can be toward the floor for an illumination device 500 mounted on a ceiling. The simulated intensity profiles shown in this specification (e.g., in FIGS. 6, 7A-C, 9, 10A-C, 11A-C, 12A-C) were generated using Lighttools. In FIG. 6, the intensity profile in the cross-sectional plane (x,z) is given by trace 610 and the intensity profile in the symmetry plane (y,z) is given by trace 620. The intensity profile in the cross-sectional plane (x,z) has maximum illuminance at about 330° and 30°. The intensity profile in the symmetry plane (y,z) also includes lobes having maxima at about 330° and 30°, and also includes maxima at about 350° and 10°. Illumination device 500 may be configured to direct little or no illumination into certain angular ranges close to the plane of the ceiling to avoid glare. For example, in the present example, the illumination device directs almost no illumination in ranges from 55° to 90° and 180° to 215° relative to the forward direction. This may be advantageous because illumination propagating from an illumination device at such directions can be perceived as glare in certain applications (e.g., in office lighting), which is undesirable. When the illumination device 500 is used as the direct illumination portion 100-1 of the illumination device 100, the traces 610, 620 represent the direct illumination distribution within angular ranges 152, 152' associated with the illumination device 100.

Multiple direct-illumination illumination devices 500 can be installed in a space to provide desired illumination for a target surface. In general, the number, density, and orientation of the multiple direct-illumination illumination devices 500 in the space can vary as desired to provide an overall intensity profile suitable of the target surface. In some implementations, arrays of similarly oriented direct-illumination illumination devices 500 can be arranged in a ceiling. For example, referring to FIGS. 7A-C, twenty five 2'×2' modules are arranged in a 5×5 array in a 40'×50' space 700 (8'×10' spacing) with 9' ceiling height to illuminate a target surface 790 raised 2.5' off the floor. Here, the target surface 790 is depicted as the highlighted surface of the space 700. Each of the illumination devices 500 has the intensity distribution shown in FIG. 6. FIG. 7A shows a contour plot of a simulated intensity distribution on the target surface 790. FIG. 7B shows a simulated intensity profile through the long dimension of the target surface 790 at x=0 mm. The illuminance varies between about 400 lux and about 500 lux across this section. FIG. 7C shows a simulated intensity profile through the short dimension of the target surface 790 at y=0 mm. The illumination drops below 450 lux within about 500 mm from the edges of the target surface 790 in this section, but stays within a range from about 450 lux to about 550 lux across the majority of the section. The intensity profile illustrated in FIGS. 7A-C may be suitable for office space, for example.

In the example implementations described above in connection with FIG. 5, the illumination device 500 is configured to output light into direct angular ranges 152 and 152'. In other implementations, the illumination device 500 is modified to output light into a single direct angular range 152. Such illumination device configured to output light on a single side of a y-z plane is referred to as a single-sided illumination device and is denoted 500'. The single-sided illumination device 500' is elongated along the y-axis like the illumination device 500 shown in FIG. 5. Unlike the illumination device 500, the single-sided illumination device 500' includes single-sided luminaire module 200'—described above—and a single direct secondary reflector 560. A mount 510 of the single-sided illumination device 500' can support both the single-sided luminaire module 200' and the single direct secondary reflector 560 such that light provided by the single-sided luminaire module 200' in the fourth angular range 142 is reflected by the single direct secondary reflector 560 into a single direct angular range 152. A light intensity profile in the x-z cross-section of the single illumination device 500' is represented in FIG. 6 as one of the lobes (e.g., the right lobe) of curve 610. In this manner, a single lobe of curve 610 corresponds to light output by the single-sided illumination device 500' in the direct angular range 152.

(iv) Another Illumination Device Used in Another Embodiment of a Direct Illumination Portion 100-1 of the Illumination Device 100

While the illumination device 500 featuring the luminaire module 200 can be used as the direct illumination portion 100-1 of the illumination device 100, other configurations for the direct illumination portion 100-1 are also possible. For example, referring to FIGS. 8A-C, an illumination device 800 (which because it does not include the luminaire module 200 also is referred to a hollow illumination device 800) can be used as the direct illumination portion 100-1 of the illumination device 100 to provide direct intensity distribution. Illumination device 800 is elongated along the y-axis and includes a housing that includes a mount 810. The mount 810 supports a plurality of LEEs 812 and a first optical coupler 820. Note that, for illumination device 1900 configured to provide direct and indirect illumination as described below in connection with FIG. 19A, an illumination device similar to the illumination device 800 provides indirect illumination when it is implemented "up-side-down" as the indirect illumination portion of the illumination device 1900.

The LEEs 812 emit light, during operation, in a first angular range with respect to a normal to a first surface of the mount 810 (along the z-axis). Here, the mount 810 also is referred to as a strip. First optical coupler 820 includes one or more hollow primary optics (e.g., reflectors) that include curved surfaces, the primary optics extending along the mount 810. The first optical coupler 820 is shaped to redirect light received from the LEEs 812 in the first angular range, and to provide the redirected light in a second angular range, such that a divergence of the second angular range is smaller than a divergence of the first angular range at least in a plane x-z perpendicular to the longitudinal dimension of the illumination device 800.

A secondary optic including a reflector 830 is positioned in the path of light emitted from the LEEs 812 to collect all light redirected by first optical coupler 820 in the second angular range. The reflector 830 of the primary optic includes two planar reflective surfaces 832, 832' arranged in a v-shape. In cross-section, illumination device 800 has a symmetry plane z-y 801, which intersects the reflector 830 at the apex 835 of the v-shape formed by the reflective surfaces 832, 832'. The redirecting surfaces 832, 832' reflect light received from the first optical coupler 820 in the second angular range, and provide the reflected light in third and fourth angular ranges with respect to the z-axis, respectively. At least prevalent directions of the third and fourth angular ranges are different from each other and from a prevalent direction of propagation of light of the second angular range, at least perpendicular to the longitudinal dimension of the illumination device 800.

Illumination device 800 also includes tertiary optics including reflectors 840, 840' positioned to receive light reflected from redirecting surfaces 832, 832', respectively, and redirect the light to the target surface. In cross-section (x-z), the reflectors 840, 840' can be convex in shape. The first reflector 840 of the tertiary optics redirects light received from the first redirecting surface 832 in the third angular range as first reflected light in a fifth angular range 152 with respect to the z-axis, such that the fifth angular range 152 is different than the third angular range. In this manner, a direct component of an intensity distribution output by the illumination device 800 during operation includes at least some of the first reflected light. The second reflector 840' of the tertiary optics redirects light received from the second redirecting surface 832' in the fourth angular range as second reflected light in a sixth angular range 152' with respect to the z-axis, such that the sixth angular range 152' is different than the fourth angular range. In this manner, the direct component of the intensity distribution output by the illumination device 800 during operation includes at least some of the second reflected light.

Figure 9:
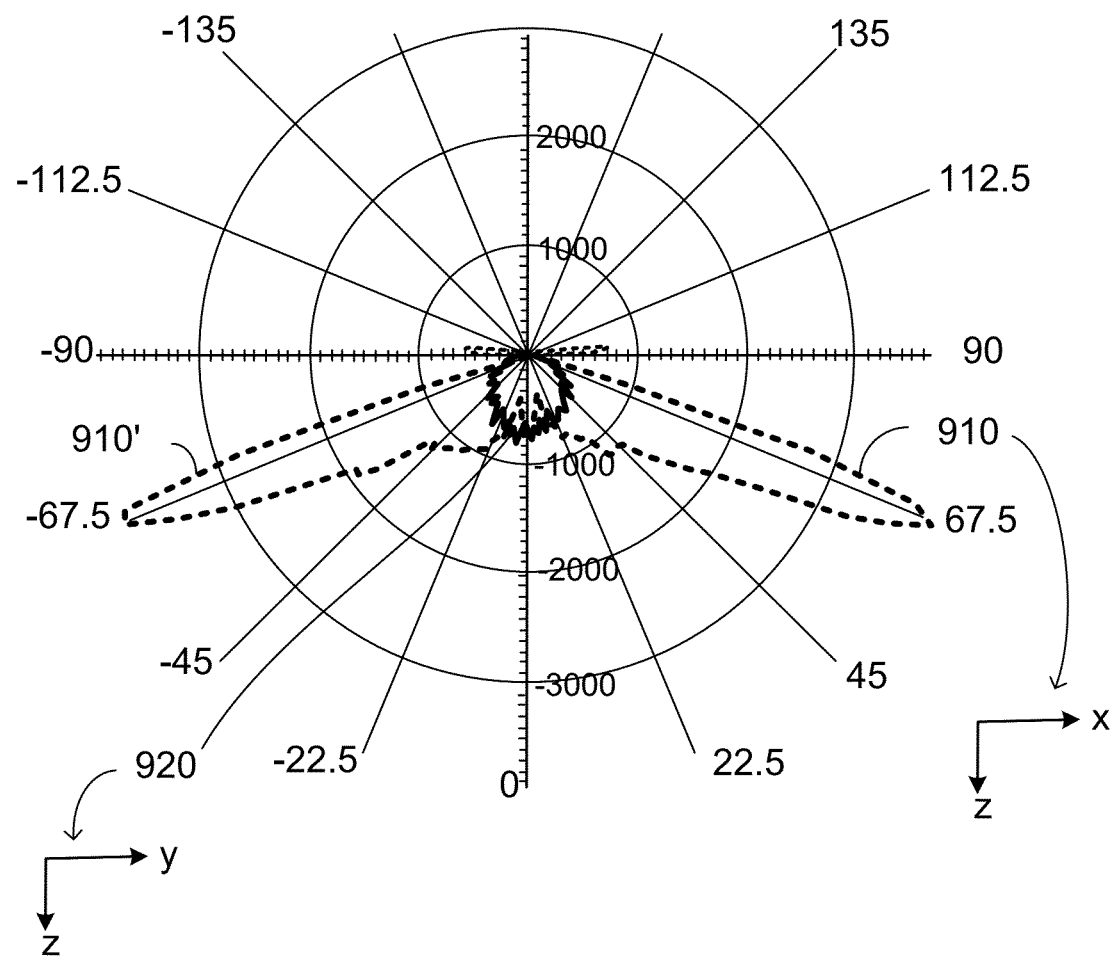
FIG. 9 is an intensity profile provided by the illumination device of FIGS. 8A-8C.

In general, the intensity distribution provided by illumination device 800 depends, inter alia, on the geometry of first optical coupler 820, the geometry of reflector 830 of the secondary optic (e.g., shape and relative orientation of the redirecting surfaces 832, 832', relative distance D between the apex 835 and the first optical coupler 820, an offset of the apex 835 from the axis 801, etc.) and tertiary reflectors 840, 840'. These parameters can be tailored to provide an intensity distribution suitable for the illumination device 800's intended purpose. For example, the angular width of lobes in the intensity distribution in cross-section depends on the degree of collimation provided by first optical couplers 820 and the amount by which reflectors 832, 832' and 840, 840' introduce divergence or convergence to the light. The directions of lobes in the intensity distribution also depend on the relative orientation of the reflective surfaces. FIG. 9 shows a simulated intensity distribution for an exemplary implementation of illumination device 800. In this plot, 0° corresponds to the positive z-direction. Traces 910, 910' correspond to the intensity profile in the x-z plane (e.g., to fifth and sixth angular ranges 152, 152', respectively), and trace 920 corresponds to the intensity profile in the y-z plane. In the y-z plane the intensity distribution is approximately lambertian, composed of a single lobe with peak flux at 0°. In the x-z plane, the distribution has two distinct narrow lobes 910, 910', with peak flux at approximately −67.5° and about 67.5°, corresponding to the fifth and sixth angular ranges, respectively. In the x-z plane, relatively little light is directed into the polar angle range from −45° to 45°, and almost no light is directed into angles greater −70° or +70°.

In some implementations, the reflector 830 of the secondary optic can be attached to the other components of the illumination device via frames 850, 850' connected at each end of the illumination device 800. The frames 850, 850' can secure and position the reflector 830 of the secondary optic and the reflectors 840, 840' of the tertiary optics at desired relative distances and orientations relative to each other and/or to the LEEs 812 and/or the first optical couplers 820. For instance, the frames 850, 850' secure the apex 835 of the reflector 830 at a predefined distance, D, from the first optical couplers 820. The optical components of illumination device 800 can be produced from a variety of materials. For example, the components can be produced from a metal, such as aluminum, or from a plastic coated with a reflective material.

FIGS. 10A-C show plots of the simulated intensity distribution from an installation composed of six illumination devices 800 arranged in a 2×3 grid in spacing of 30' in x and 20' in y direction in a 18,000 mm×18,000 mm target surface 1090 of a garage 1000, for instance. The illumination devices are suspended 300 mm from the ceiling, which is 3,000 mm high. In this example of a garage lighting application, driving traffic occurs in y direction (represented by a bold arrow) with 2 driving lanes and 4 parking rows. The x-axis shows one dimension of the target surface 1090 and the y-axis shows the other. Here, the target surface 1090 is depicted as the highlighted surface of the garage 1000. FIG. 10A shows a contour plot of the illuminance across the target surface 1090, FIG. 10B shows a plot of illuminance (in lux) vs. y position (in mm) at x=0 mm, and FIG. 10C shows a plot of illuminance (in lux) vs. x position (in mm). Illuminance varies between about 25 lux and about 75 lux in the y-direction and between about 70 lux and about 150 lux in the x-direction.

FIGS. 11A-C show plots of the simulated intensity distribution from the same installation as depicted in FIGS. 10A-C on a wall 1092 of the garage 1000 along the y direction of FIG. 11A. In FIG. 11A, the x-axis shows the horizontal dimension of the section and the y-axis shows the vertical dimension. Here, the wall 1092 is depicted as the highlighted surface of the garage 1000. FIG. 11A shows a contour plot of the illuminance across the section. Dark regions in the intensity distribution are caused by structural elements of the building. FIG. 11B shows a plot of illuminance (in lux) vs. y position (in mm) at x=0 mm, and FIG. 11C shows a plot of illuminance (in lux) vs. X position (in mm). Illuminance varies between about 50 lux and 250 lux in the vertical direction from the target surface 1090 up to the about midway through the section, where it falls off, and between about 100 lux and about 175 lux for the central 17,000 mm of the section in the horizontal direction, falling off nearer to the edges.

FIGS. 12A-C show plots of the simulated intensity distribution from the same installation as depicted in FIGS. 10A-10C on another wall 1094 of the garage 1000 along the x direction of FIG. 11A. In FIG. 12A, the x-axis shows the horizontal dimension of the section and the y-axis shows the vertical dimension. Here, the other wall 1094 is depicted as the highlighted surface of the garage 1000. FIG. 12A shows a contour plot of the illuminance across the section. A certain amount of light provided on the wall 1094 can aid in facial recognition, which may provide better comfort and security to parking garage users. FIG. 12B shows a plot of illuminance (in lux) vs. y position (in mm) at x=0 mm, and FIG. 12C shows a plot of illuminance (in lux) vs. x position (in mm). Illuminance varies between about 50 lux and 250 lux in the vertical direction from the target surface 1090 up to the about midway through the section, where it falls off, and between about 25 lux and about 125 lux for the central 17,000 mm of the section in the horizontal direction, falling off nearer to the edges.

In the example implementations described above in connection with FIGS. 8A-8C, the illumination device 800 is configured to output light into direct angular ranges 152 and 152'. In other implementations, the illumination device 800 is modified to output light into a single direct angular range 152. Such illumination device configured to output light on a single side of a y-z plane is referred to as a single-sided illumination device and is denoted 800'. The single-sided illumination device 800' is elongated along the y-axis like the illumination device 800 shown in FIGS. 8A-8C. Also like the illumination device 800, the single-sided illumination device 800' includes a mount 810 and LEEs 812 disposed on a surface of the mount 810 along the y-axis to emit light in a first angular range. The single-sided illumination device 800' further includes an optical coupler 820 arranged and configured to redirect the light emitted by the LEEs 812 in the first angular range into a second angular range that has a divergence smaller than the divergence of the first angular range at least in the x-z cross-section. Also, the single-sided illumination device 800' includes a single redirected surface 832 arranged to receive all the redirected light from the optical coupler 820 and to redirect the received light into a third angular range. Examples of shapes of the redirecting surface 832 are illustrated in FIGS. 2B-2G as redirecting surface 242. Unlike the illumination device 800, the single-sided illumination device 800' includes a single reflector 840. The mount 810 of the single-sided illumination device 800' supports the single reflector 840 such that light redirected by the single redirected surface 832 in the third angular range is reflected by the single reflector 840 into a single direct angular range 152. A light intensity profile in the x-z cross-section of the single illumination device 800' is represented in FIG. 9 as the lobe 910 of the dashed-curve. In this manner, the single lobe 910 corresponds to light output by the single-sided illumination device 800' in the direct angular range 152.

Figure 13B:
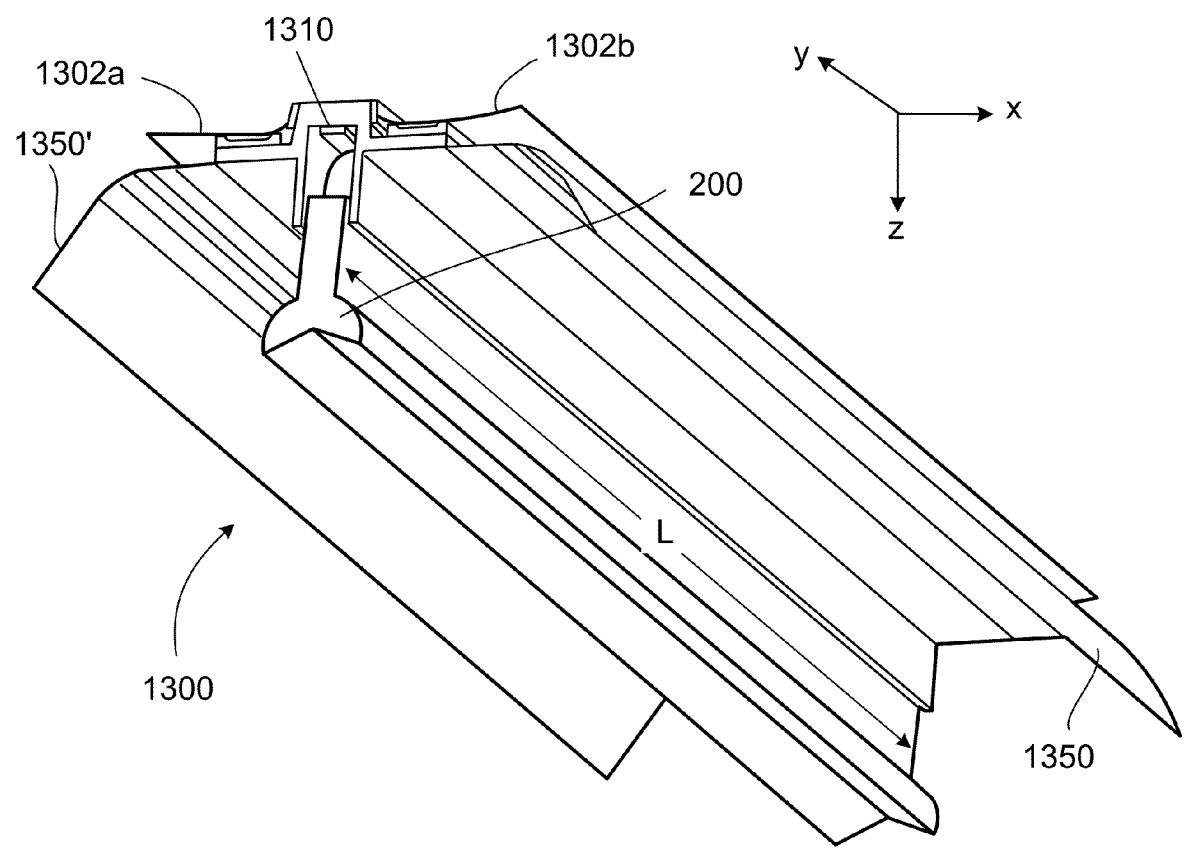
Figure 14A:
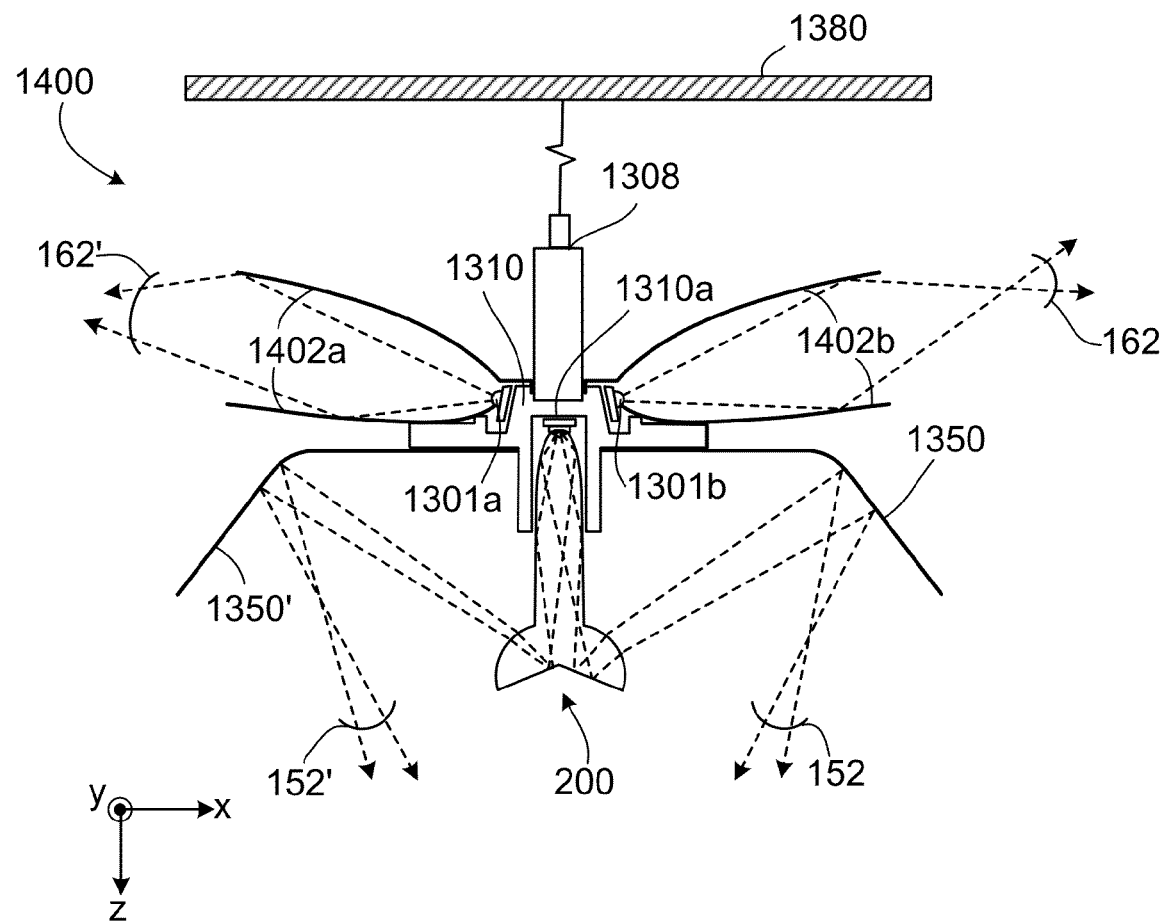
Figure 14B:
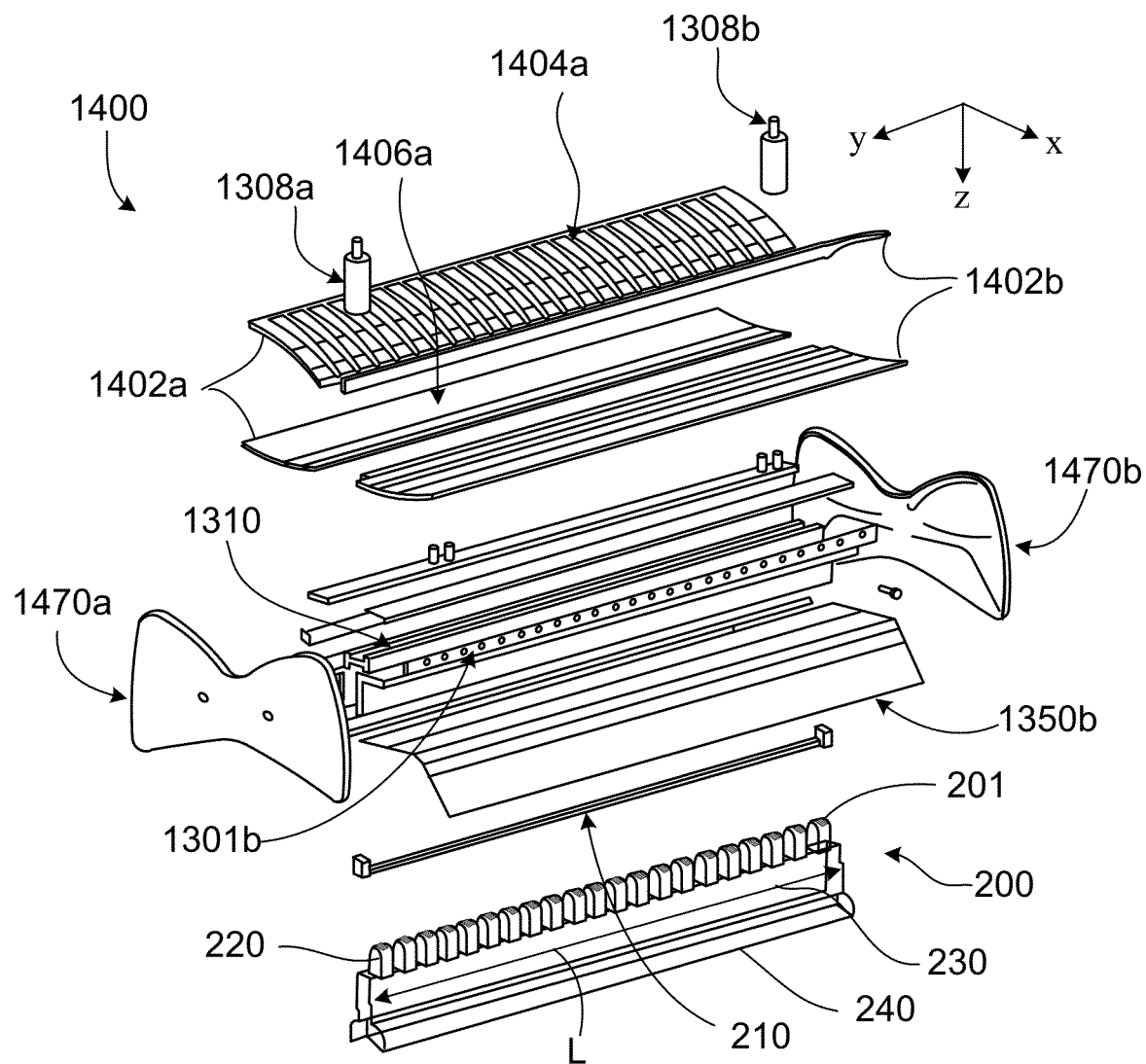
Figure 14D:
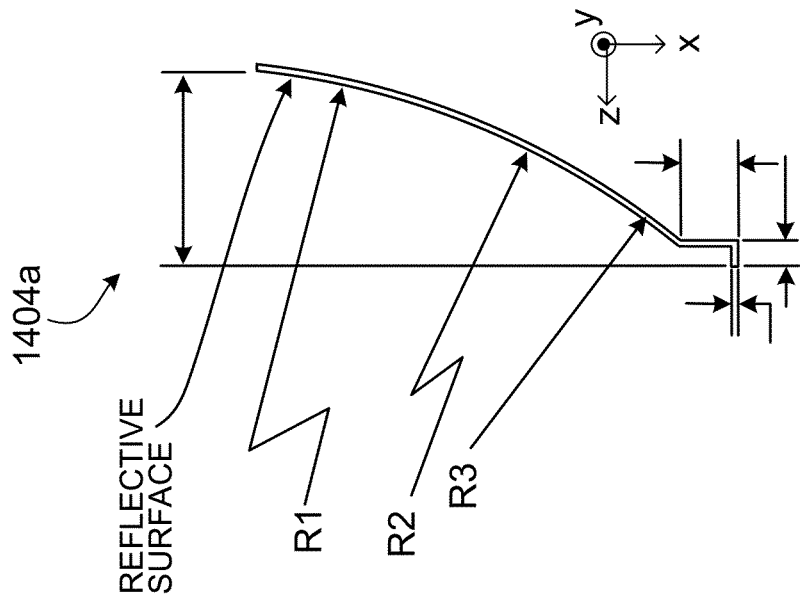

(v) First Implementation of Illumination Device Used to Provide Direct and Indirect Illumination FIGS. 13A-13B illustrate an example illumination device 1300 (as generally described with respect to FIG. 1). The illumination device 1300 includes a mount 1310 that is elongated along the y-axis and supports a direct illumination portion and an indirect illumination portion of the illumination device 1300. For example, the direct illumination portion of the illumination device 1300 can be implemented as the illumination device 500 described above in connection with FIG. 5. Here, the direct illumination portion of the illumination device 1300 includes a luminaire module 200 as described above in connection with FIG. 2A, and direct secondary reflectors 1350, 1350'. The luminaire module 200, and the direct secondary reflectors 1350, 1350' are elongated along the y-axis. In this example, the indirect illumination portion of the illumination device 1300 includes indirect LEEs 1301*a/b* and indirect optics 1302*a/b*. In some implementations, mount 1310 can be formed of extruded aluminum.

In a general aspect of the illumination device 1300, the illumination device comprises: a mount having a first surface, the first surface being elongated and having a longitudinal dimension and a transverse dimension shorter than the longitudinal dimension; a direct illumination portion of the illumination device supported by the mount; and an indirect illumination portion of the illumination device supported by the mount, wherein the direct portion of the illumination device comprises multiple direct light-emitting elements (LEEs) operatively disposed on the first surface of the mount and distributed along the longitudinal dimension, such that the direct LEEs emit, during operation, light in a first direct angular range with respect to a normal to the first surface of the mount, and direct optics arranged in an elongated configuration along the longitudinal dimension of the first surface and optically coupled with the direct LEEs, the direct optics configured to redirect light received from the direct LEEs in the first direct angular range, and to output the redirected light in a second direct angular range, wherein (i) a divergence of the second direct angular range is smaller than a divergence of the first direct angular range at least in a plane perpendicular to the longitudinal dimension of the first surface of the mount, (ii) a prevalent direction of propagation of light in the second direct angular range has a non-zero component parallel with the normal to the first surface of the mount, wherein the indirect portion of the illumination device comprises multiple indirect LEEs operatively disposed on another surface of the mount different from the first surface and distributed along the longitudinal dimension, such that the indirect LEEs emit, during operation, light in a first indirect angular range with respect to a normal to the first surface of the mount, and indirect optics arranged in an elongated configuration along the longitudinal dimension of the first surface and optically coupled with the indirect LEEs, the indirect optics configured to redirect light received from the indirect LEEs in the first indirect angular range, and to output the redirected light in a second indirect angular range, wherein (i) a divergence of the second indirect angular range is smaller than a divergence of the first indirect angular range at least in a plane perpendicular to the longitudinal dimension of the first surface of the mount, (ii) a prevalent direction of propagation of light in the second indirect angular range has a non-zero component antiparallel with the normal to the first surface of the mount, and wherein the multiple indirect LEEs are powered independently from the direct LEEs.

In another general aspect of illumination device 1300, the illumination device comprises: one or more direct light-emitting elements operatively disposed on a first surface of a mount, the one or more direct LEEs configured to emit light in a first angular range with respect to a normal to the first surface; at least one primary optic optically coupled with the one or more direct LEEs and configured to direct light received from the one or more direct LEEs in the first angular range at an input end of the primary optic, and provide directed light in a second angular range at an output end of the primary optic, a divergence of the directed light in the second angular range being smaller than a divergence of the light in the first angular range; a light guide optically coupled at an input end of the light guide with the output end of the primary optic, the light guide shaped to guide light received from the primary optic in the second angular range to an output end of the light guide; an optical extractor optically coupled with the output end of the light guide at an input end of the optical extractor to receive guided light from the light guide, the optical extractor having a first redirecting surface spaced from the input end of the optical extractor and an output surface, the first redirecting surface having a first apex facing the input end of the optical extractor and configured to reflect light received at the input end of the optical extractor and provide the reflected light in a third angular range with respect to the normal to the first surface of the mount towards the output surface, the output surface shaped to refract the light provided by the first redirecting surface in the third angular range as refracted light and to output the refracted light in a fourth angular range with respect to the normal to the first surface of the mount outside the optical extractor; direct secondary reflectors external to the optical extractor and facing a portion of the output surface of the optical extractor, the direct secondary reflectors being shaped to reflect at least some of the light output by the output surface in the fourth angular range as first reflected light, and to provide the first reflected light in a fifth angular range with respect to the normal to the first surface of the mount, wherein the fifth angular range is different than the fourth angular range, and a prevalent direction of propagation of light in the fifth angular range has a non-zero component parallel with the normal to the first surface of the mount; one or more indirect LEEs operatively attached to a second surface of the mount that is different from the first surface, the one or more indirect LEEs configured to emit light in a first indirect angular range with respect to the normal to the first surface, wherein the first indirect angular range is different than the first angular range; and at least one indirect optic, wherein the indirect optic is configured to direct a portion of the light, which is emitted by the one or more indirect LEEs in the first indirect angular range, in a second indirect angular range with respect to the normal to the first surface, and a prevalent direction of propagation of light in the second indirect angular range has a non-zero component antiparallel with the normal to the first surface of the mount.

As described above in connection with FIGS. 2A-2G, the luminaire module 200 includes multiple direct LEEs 201 which are distributed along the y-axis. Additionally, the luminaire module 200 includes a first optical coupler 220, a light guide 230 and an optical extractor 240, such that the first optical coupler, the light guide and the optical extractor are elongated along the y-axis. Here, the multiple direct LEEs 201 are positioned on a first surface 1310a of the mount 1310. The first surface 1310a can be oriented parallel to and facing away from a ceiling 1380, when the illumination device 1300 is suspended from the ceiling. The first optical coupler 220 is arranged to receive light emitted by the multiple direct light-emitting elements 201 and configured to at least partially collimate the received light. The light guide 230 includes a first end and a second end, where the first and second ends define a direction substantially orthogonal to the first surface 1310a and the light guide 230 is positioned to receive at the first end light provided by the first optical coupler 220 and guide it to the second end. The optical extractor 240 is positioned to reflect light exiting the light guide 230 into angular ranges 142, 142' towards the first surface 1310a. In an aspect when the LEEs are pump LEDs, the light exiting the luminaire module 200 can pass through a wavelength-conversion material (e.g., a layer that is positioned on top of an output surface 246, 248 of the optical extractor 240, as described in connection with FIG. 2A).

In this manner, the direct light-emitting elements 201, the first optical coupler 220, the light guide 230, and the optical extractor 240 of the luminaire module 200 are arranged and configured such that the luminaire module 200 outputs light in angular ranges 142, 142' towards the direct secondary reflectors 1350, 1350'. As described above in connection with FIG. 5, the direct secondary reflectors 1350, 1350' are arranged to extend through the range of angles 142, 142' and reflect at least some of the light reflected by the optical extractor 240 away from the first surface 1310a and in angular ranges 152, 152' corresponding to the direct intensity distribution of the illumination device 1300. In some implementations, a prevalent direction of propagation of light in each of the angular ranges 152, 152' has a non-zero component parallel with a normal to the first surface 1310*a* of the mount 1310. Here, the light output by the illumination device 1300 as direct illumination in angular ranges 152, 152' corresponds to the two lobes of the light intensity 610 pattern represented in FIG. 6.

For example, a target surface that extends through the angular ranges 152, 152' can be illuminated by the intensity distribution provided by the illumination device 1300.

In some implementations, the direct secondary reflectors 1350, 1350' of the illumination device 1300 can be curved and can be attached to respective surfaces of the mount 1310 on the same side as the first surface 1310*a*. In general, surfaces of the direct secondary reflectors 1350, 1350' can be specular reflecting surfaces or diffusely reflecting surfaces. Furthermore, the shape of the surfaces (in FIG. 13A-13B, concave) provides an additional degree of freedom for a designer to tailor the direct intensity distribution of the illumination device 1300. The direct secondary reflectors 1350, 1350' can have a constant radius of curvature, or, in general, the shape of secondary reflectors may vary as desired. In the example illustrated in FIGS. 13A-13B, surfaces of the direct secondary reflectors 1350, 1350' can include one or more segments having straight, angled, segmented, curved, involute or other shape in one or two dimensions to provide a predetermined broad or narrow emission pattern. In some implementations, the direct secondary reflectors have planar reflective surfaces. The shape of the direct secondary reflectors may be determined by tailoring algorithms to provide a desired optical function, for example.

Alternatively or additionally, when the direct LEEs 201 are pump-LEDs, direct secondary reflectors 1350, 1350' may include a layer of wavelength-conversion material. This may provide or contribute soft, diffuse illumination. For example, the direct secondary reflectors 1350, 1350' include a layer of phosphor on or below one or more suitably reflective surfaces of the direct secondary reflectors 1350, 1350'.

In other implementations, not illustrated in FIGS. 13A-13B, the direct illumination portion of the illumination device 1300 can be implemented as the illumination device 800 described above in connection with FIGS. 8A-8C. In such cases, the light output by the direct illumination portion of the illumination device 1300 as direct illumination in angular ranges 152, 152' corresponds to the lobes 910, 910' of the light intensity pattern represented in FIG. 9.

Referring again to FIGS. 13A-13B, the indirect LEEs are operatively arranged in two rows 1301*a* and 1301*b*. Each of the two rows of indirect LEEs 1301*a* and 1301*b* includes multiple indirect LEEs distributed along the y-axis direction on respective side surfaces of a mount 1310. In this case, these side surfaces are oriented obliquely to a ceiling 1380 when the illumination device 1300 is suspended from the ceiling. The two rows of multiple LEEs 1301*a* and 1301*b* can be powered to emit light independently from each other or from the direct LEEs 201. Here, indirect optics 1302*a* and 1302*b* are arranged and configured such that each of the indirect optics includes a single reflector supported on a corresponding surface of mount 1310 that is substantially parallel to the first surface 1310*a* of the mount and is located on an opposite side of the mount with respect to the first surface. In this case, the surfaces of the mount 1310 that support the indirect optics 1302*a/b* are oriented substantially parallel to a ceiling 1380 when the illumination device 1300 is suspended from the ceiling. In this manner, the indirect optics 1302*a/b* are configured to cast light emitted by the indirect LEEs 1301*a/b* in angular ranges 162, 162' corresponding to the indirect intensity distribution of the illumination device 1300. In some implementations, a prevalent direction of propagation of light in each of the angular ranges 162, 162' has a non-zero component antiparallel with a normal to the first surface 1310*a* of the mount 1310.

In general, the illumination device 1300 can be configured in a variety of form factors. For example, the illumination device 1300 can be designed to be installed in a ceiling 1380 with ceiling panels. As another example, the illumination device 1300 is configured as a suspended illumination device 1300 (e.g., pendant luminaire or troffer luminaire) using one or more rods, wires or a combination thereof (1308). In an aspect, the illumination device 1300 may have a length L (along the y-axis). For example, the illumination device 1300 can have a 2'×2' or 2'×4' footprint (e.g., in the x-y plane), corresponding to the size of conventional fixtures that support fluorescent luminaries.

In some implementations, the secondary reflectors 1350, 1350' may be closed off at two ends by walls in the x-z plane (not shown in FIGS. 13A-13B) in analogy with the end-walls 570, 570' of illumination device 500, or end-walls 850, 850' of illumination device 800. The end-walls that close off the secondary reflectors 1350, 1350' can be configured to reflect components of incident light 142, 142' along the y-axis. In some implementations, the illumination device 1300 can be used alone or in multiples to form a suitably sized troffer, for example. In some implementations, the illumination device 1300 includes a diffusor plate (not shown in FIGS. 13A-13B) positioned, for example, to cover the opening formed by the secondary reflectors 1350, 1350' and the end-walls to protect the luminaire module 200 and the secondary reflectors 1350, 1350' from dust or other environmental effects.

The indirect intensity distribution may be used to indirectly illuminate the target surface with light scattered or reflected from the ceiling 1380, for instance.

Figure 13C:
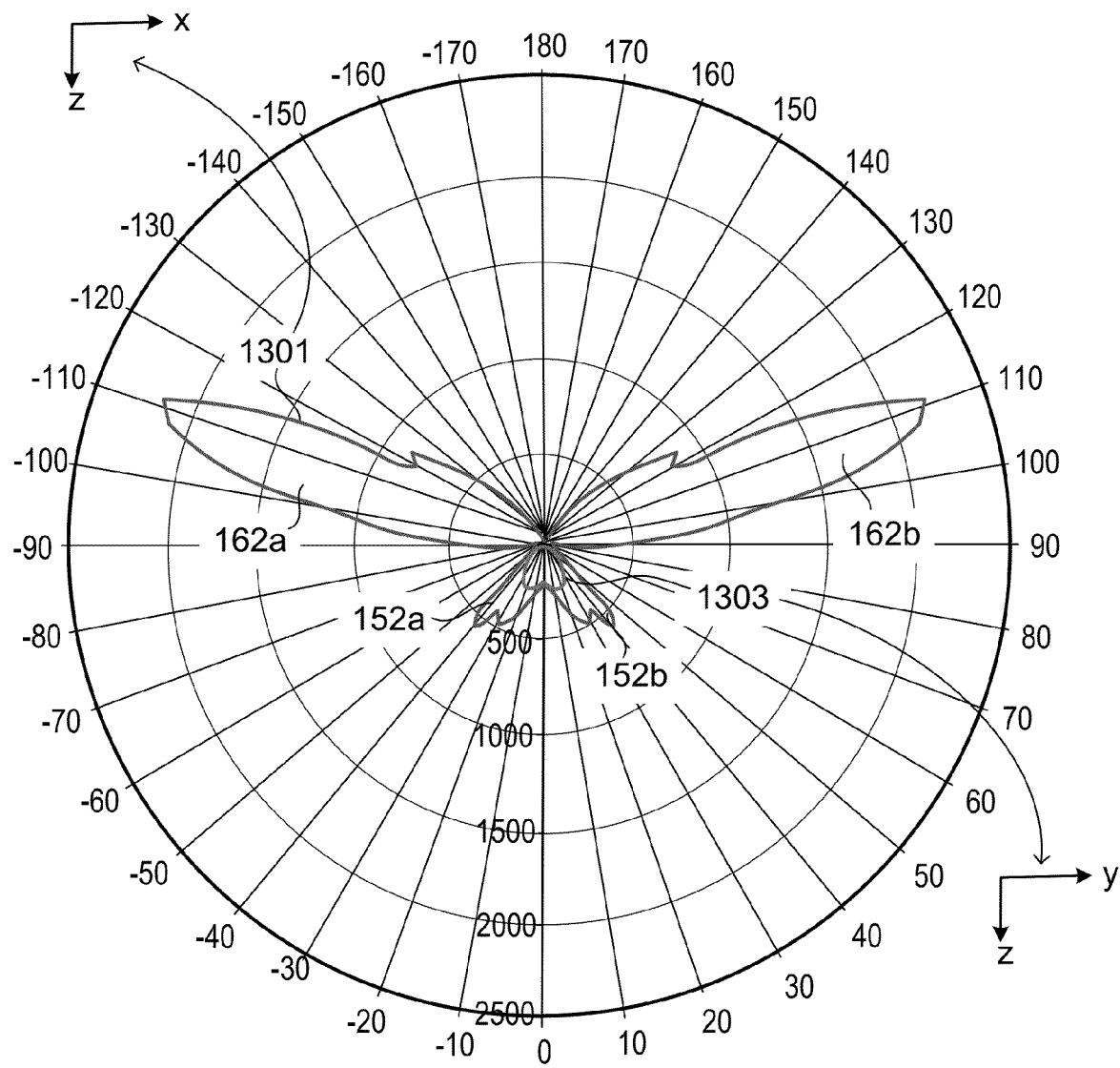

FIG. 13C shows sections of light intensity profile of suspended illumination device 1300. The curve 1301 corresponds to illumination in a cross-sectional plane (x-z) of the illumination device 1300. The curve 1303 corresponds to illumination in a symmetry plane (y-z) of the illumination device 1300. Here, the light intensity profile 1303 corresponding to direct light output by the illumination device 1300 in the y-z symmetry plane has a divergence determined only by optical power (in this plane) of the first optical coupler 220 of the luminaire module 200.

Lobes 152*a*, 152*b* of the light intensity profile 1301 correspond to direct light output by the illumination device 1300 in the x-z cross-section within the direct angular ranges 152, 152'. Here, the lobes 152*a*, 152*b* of the light intensity profile 1301 corresponding to light output by the direct illumination portion of the illumination device 1300 are similar to the two lobes of the light intensity pattern 610 represented in FIG. 6. In this example, the luminaire module 200 and the direct secondary reflectors 1350, 1350' of the direct illumination portion of the illumination device 1300 are configured to direct substantially all of the direct (e.g., forward) light 152*a* into a range of polar angles between −50° and −30° and all of the direct (e.g., forward) light 152*b* into a range of polar angles between +30° and +50° in the x-z cross-sectional plane of the illumination device 1300, where 0° corresponds to the forward direction. The forward direction is given by a normal to the first surface 1310*a* of the mount 1310 and, and hence, it is parallel to the light guide 230. For an illumination device mounted on a ceiling 1380, the forward direction is toward the floor.

Further, lobes 162*a*, 162*b* of the light intensity profile 1301 correspond to indirect light output by the illumination device 1300 in the x-z cross-section within the indirect angular ranges 162, 162'. In this example, the indirect optics 1302a, 1302b of the indirect illumination portion of the illumination device 1300 are configured to direct substantially all of the indirect (e.g., backward) light 162a into a range of polar angles between −100° and −120° and all of the indirect (e.g., backward) light 162b into a range of polar angles between +100° and +120° in the x-z cross-sectional plane of the illumination device 1300.

If the indirect LEEs 1301a can be powered independently from the indirect LEEs 1301b and from the direct LEEs 201 of the luminaire module 200, multiple configurations of the light intensity profiles shown in FIG. 13C are possible for the illumination device 1300, as indicated in Table 5 below.

TABLE 5

| LEE power combinations | Direct illumination | | | Indirect illumination | |
|---|---|---|---|---|---|
| | Lobe 152a | Lobe 152b | Pattern 1303 | Lobe 162a | Lobe 162b |
| Direct LEEs 201 ON; Indirect LEEs 1301a ON; Indirect LEEs 1301b ON | ON | ON | ON | ON | ON |
| Direct LEEs 201 ON; Indirect LEEs 1301a OFF; Indirect LEEs 1301b ON | ON | ON | ON | OFF | ON |
| Direct LEEs 201 ON; Indirect LEEs 1301a ON; Indirect LEEs 1301b OFF | ON | ON | ON | ON | OFF |
| Direct LEEs 201 ON; Indirect LEEs 1301a OFF; Indirect LEEs 1301b OFF | ON | ON | ON | OFF | OFF |
| Direct LEEs 201 OFF; Indirect LEEs 1301a ON; Indirect LEEs 1301b ON | OFF | OFF | OFF | ON | ON |
| Direct LEEs 201 OFF; Indirect LEEs 1301a OFF; Indirect LEEs 1301b ON | OFF | OFF | OFF | OFF | ON |
| Direct LEEs 201 OFF; Indirect LEEs 1301a ON; Indirect LEEs 1301b OFF | OFF | OFF | OFF | ON | OFF |
| Direct LEEs 201 OFF; Indirect LEEs 1301a OFF; Indirect LEEs 1301b OFF | OFF | OFF | OFF | OFF | OFF |

In Table 5, turning direct/indirect LEEs ON causes respective direct/indirect light emission thereof to brighten over a threshold intensity value, while turning the direct/indirect LEEs OFF causes respective direct/indirect light emission thereof to dim under the threshold intensity value. In accordance with the various manners of powering the direct and indirect LEEs shown in Table 5, the following interdependent or independent ways of controlling the intensity distribution associated with the illumination device 1300 are possible: (i) direct lobes 152a, 152b of the illumination pattern 1301 in the x-z cross-section and the direct illumination pattern 1303 in the y-z symmetry plane are interdependently controlled with respect to each other; (ii) direct lobes 152a, 152b of the illumination pattern 1301 in the x-z cross-section and the direct illumination pattern 1303 in the y-z symmetry plane are independently controlled with respect to each of indirect lobes 162a, 162b of the illumination pattern 1301 in the x-z cross-section; and (iii) indirect lobes 162a, 162b of the illumination pattern 1301 in the x-z cross-section are independently controlled with respect to each other.

In the example implementations described above in connection with FIGS. 13A-13B, the illumination device 1300 is configured to output light into both direct angular ranges 152 and 152' and into both indirect angular ranges 162, 162'.

In other implementations, the illumination device 1300 is modified to output light into both direct angular ranges 152, 152' and in a single indirect angular range 162. Such illumination device configured to output indirect light on a single side of a y-z plane is referred to as a two-sided direct illumination and single-sided indirect illumination device and is denoted 1300'. The two-sided direct illumination and single-sided indirect illumination device 1300' is elongated along the y-axis like the illumination device 1300 shown in FIGS. 13A-13B. Also, the two-sided direct illumination and single-sided indirect illumination device 1300' and the illumination device 1300 have a common direct illumination portion including the luminaire module 200 and the direct secondary reflectors 1350, 1350'. Unlike the illumination device 1300, the two-sided direct illumination and single-sided indirect illumination device 1300' has a single-sided indirect illumination portion that includes indirect LEEs 1301b and corresponding indirect optics 1302b. Here, the indirect optics 1302b redirect light emitted by the indirect LEEs 1301b in a first indirect angular range into the second indirect angular range 162. A light intensity profile in the x-z cross-section of the two-sided direct illumination and single-sided indirect illumination device 1300' is similar to the light intensity 101' illustrated in FIG. 1C. In this case, the light intensity profile in the x-z cross-section of the two-sided direct illumination and single-sided indirect illumination device 1300' is represented in FIG. 13C as the curve 1301 with both direct lobes 152a/b and a single indirect lobe 162b. Here, the direct lobes 152a/b correspond to light output by the two-sided direct illumination and single-sided indirect illumination device 1300' in the direct angular ranges 152, 152' and the single indirect lobe 162b corresponds to light output by the two-sided direct illumination and single-sided indirect illumination device 1300' in the indirect angular range 162.

In some other implementations, the illumination device 1300 is modified to output light into a single direct angular range 152 and in both indirect angular ranges 162, 162'. Such illumination device configured to output direct light on a single side of a y-z plane is referred to as a single-sided direct illumination and two-sided indirect illumination device and is denoted 1300". The single-sided direct illumination and two-sided indirect illumination device 1300" is elongated along the y-axis like the illumination device 1300 shown in FIGS. 13A-13B. Also, the single-sided direct illumination and two-sided indirect illumination device 1300" and the illumination device 1300 have a common indirect illumination portion including indirect LEEs 1301a/b and indirect optics 1302a/b. Unlike the illumination device 1300, the single-sided direct illumination and two-sided indirect illumination device 1300" has a single-sided direct illumination portion that includes a single-sided luminaire module 200'—described above in connection with FIGS. 2A-2G—and a single direct secondary reflector 1350. The mount 1310 of the single-sided direct illumination and two-sided indirect illumination device 1300" can support both the single-sided luminaire module 200' and the single direct secondary reflector 1350 such that light provided by the single-sided luminaire module 200' in the fourth angular range 152a is reflected by the single direct secondary reflector 1350 into a single direct angular range 152. This configuration of the direct illumination portion can be implemented as the single-sided illumination device 500' described above in connection with FIG. 5. A light intensity profile in the x-z cross-section of the single-sided direct illumination and two-sided indirect illumination device 1300" is similar to the light intensity 101" illustrated in FIG. 1D. In this case, the light intensity profile in the x-z cross-section of the single-sided direct illumination and two-sided indirect illumination device 1300" is represented in FIG. 13C as the curve 1301 with both indirect lobes 162a/b and a single direct lobe 152b. Here, the indirect lobes 162a/b correspond to light output by the single-sided direct illumination and two-sided indirect illumination device 1300" in the indirect angular ranges 162, 162', and the single direct lobe 152b corresponds to light output by the single-sided direct illumination and two-sided indirect illumination device 1300" in the direct angular range 152.

In yet some other implementations, the illumination device 1300 is modified to output light into a single direct angular range 152 and in a single indirect angular range 162. Such illumination device configured to output direct and indirect light on a single side of a y-z plane is referred to as a single-sided direct/indirect illumination device and is denoted 1300'''. The single-sided direct/indirect illumination device 1300''' is elongated along the y-axis like the illumination device 1300 shown in FIGS. 13A-13B. Unlike the illumination device 1300, the single-sided direct/indirect illumination device 1300''' has a single-sided direct illumination portion that includes a single-sided luminaire module 200'—described above in connection with FIGS. 2A-2G—and a single direct secondary reflector 1350. The mount 1310 of the single-sided direct/indirect illumination device 1300' can support both the single-sided luminaire module 200' and the single direct secondary reflector 1350 such that light provided by the single-sided luminaire module 200' in the fourth angular range 142 is reflected by the single direct secondary reflector 1350 into a single direct angular range 152. This configuration of the direct illumination portion can be implemented as the illumination device 500' described above in connection with FIG. 5. Also, the single-sided direct/indirect illumination device 1300' has a single-sided indirect illumination portion that includes indirect LEEs 1301b and corresponding indirect optics 1302a. Here, the indirect optics 1302b redirect light emitted by the indirect LEEs 1301b in a first indirect angular range into the second indirect angular range 162. A light intensity profile in the x-z cross-section of the single-sided direct/indirect illumination device 1300' is similar to the light intensity 101''' illustrated in FIG. 1E. In this case, the light intensity profile in the x-z cross-section of the single-sided direct/indirect illumination device 1300' is represented in FIG. 13C as the curve 1301 with a single direct lobe 152b and a single indirect lobe 162b. Here, the single direct lobe 152b corresponds to light output by the single-sided direct/indirect illumination device 1300''' in the direct angular range 152 and the single indirect lobe 162b corresponds to light output by the single-sided direct/indirect illumination device 1300''' in the indirect angular range 162.

(vi) Second Implementation of Illumination Device Used to Provide Direct and Indirect Illumination FIGS. 14A-14B illustrate another example of an illumination device 1400 (as described above in connection with FIGS. 13A-B including further features.)

The illumination device 1400 includes a mount 1310 that is elongated along the y-axis and supports a direct illumination portion and an indirect illumination portion of the illumination device 1400. For example, the direct illumination portion of the illumination device 1400 can be implemented as the illumination device 500 described above in connection with FIG. 5. Here, the direct illumination portion of the illumination device 1400 includes a luminaire module 200 and direct secondary reflectors 1350, 1350', as described above in connection with FIGS. 13A-13B. Once again, the luminaire module 200, and the direct secondary reflectors 1350, 1350' are elongated along the y-axis. Also in analogy with the illumination device 1300 described in connection with FIGS. 13A-13B, the indirect illumination portion of the illumination device 1400 includes indirect LEEs 1301a/b and indirect optics 1402a/b, both of which also are supported by the mount 1310.

As described above in connection with FIGS. 2A-2G, the luminaire module 200 includes multiple direct LEEs 201 which are distributed along the y-axis. Additionally, the luminaire module 200 includes a first optical coupler 220, a light guide 230 and an optical extractor 240, such that the first optical coupler, the light guide and the optical extractor are elongated along the y-axis. Here, the multiple direct LEEs 201 are positioned on a first surface 1310a of the mount 1310. The first surface 1310a can be oriented parallel to and facing away from a ceiling 1380, when the illumination device 1400 is suspended from the ceiling. As described above in connection with FIGS. 13A-13B, the luminaire module 200 and the direct secondary reflectors 1350, 1350' are arranged and configured such that the direct illumination portion of the illumination device 1400 provides light in angular ranges 152, 152' corresponding to the direct intensity distribution of the illumination device 1400. In some implementations, a prevalent direction of propagation of light in each of the angular ranges 152, 152' has a non-zero component parallel with a normal to the first surface 1310a of the mount 1310. Here, the light output by the illumination device 1400 as direct illumination in angular ranges 152, 152' corresponds to the two lobes of the light intensity 610 pattern represented in FIG. 6.

In other implementations, not illustrated in FIGS. 14A-14B, the direct illumination portion of the illumination device 1400 can be implemented as the illumination device 800 described above in connection with FIGS. 8A-8C. In such cases, the light output by the direct illumination portion of the illumination device 1400 as direct illumination in angular ranges 152, 152' corresponds to the lobes 910, 910' of the light intensity pattern represented in FIG. 9.

Referring again to FIGS. 14A-14B, the indirect LEEs are operatively arranged in two rows 1301a and 1301b. Each of the two rows of indirect LEEs 1301a and 1301b includes multiple indirect LEEs distributed along the y-axis direction on respective side surfaces of a mount 1310. In this case, these side surfaces are oriented obliquely to a ceiling 1380 when the illumination device 1300 is suspended from the ceiling. The two rows of multiple LEEs 1301a and 1301b can be powered to emit light independently from each other or from the direct LEEs 201.

FIGS. 14A-14B show that each of the indirect optics 1402a and 1402b includes a first reflector 1406a/b supported on a corresponding surface of mount 1310 that is substantially parallel to the first surface 1310a of the mount and is located on an opposite side of the mount 1310 with respect to the first surface, and a second reflector 1404a/b attached to a corresponding second surface of the mount 1310 that is substantially parallel to the first surface of the mount and also is located on the opposite side of the mount with respect to the first surface. Here, the indirect optic 1402a includes the first reflector 1406a and the second reflector 1404a, and the indirect optic 1402b includes the first reflector 1406b and the second reflector 1404b. In this case, the surfaces of the mount 1310 that support the first 1406a/b and second 1404a/b reflectors of the indirect optics 1402a/b are oriented substantially parallel to a ceiling 1380 when the illumination device 1400 is suspended from the ceiling. In this manner, the first 1406a and second 1404a reflectors of the indirect optic 1402a, and the first 1406b and second 1404b reflectors of the indirect optic 1402b are paired to face each other and to form a respective optical coupler. Further in this manner, the indirect optics 1402a/b are arranged and configured to cast light emitted by the indirect LEEs 1301a/b in angular ranges 162, 162' corresponding to the indirect intensity distribution of the illumination device 1400. In some implementations, a prevalent direction of propagation of light in each of the angular ranges 162, 162' has a non-zero component antiparallel with a normal to the first surface 1310a of the mount 1310.

In an aspect, the illumination device 1400 can be suspended from a ceiling 1380 using rods, wires or a combination thereof (1308a/b). In some implementations, the indirect optics 1402a and 1402b may be closed off at two ends by walls 1470a/b in the x-z plane (as shown in FIG. 14B). The end-walls 1470a/b that close off the indirect optics 1402a and 1402b can be configured to reflect components of incident light 162a, 162a' along the y-axis.

Figure 14C:
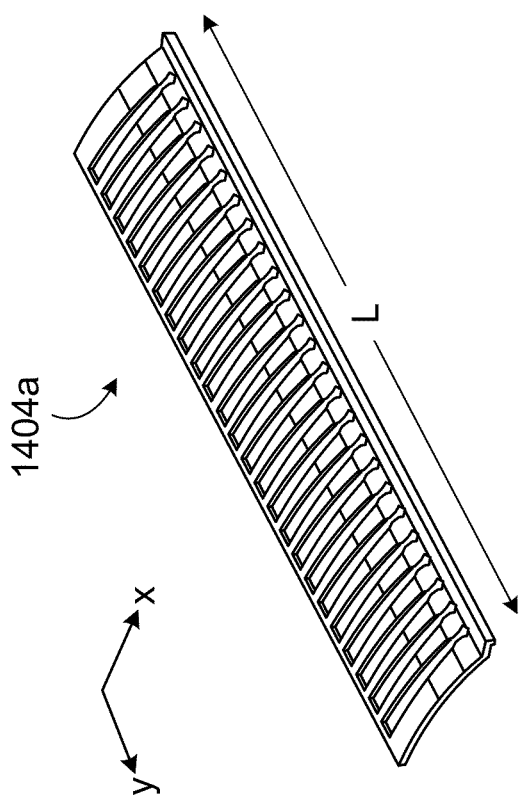

FIGS. 14C-14F show aspects of an example of the second reflector 1404a or 1404b. As described above, the second reflector 1404a (1404b) forms, along with the first reflector 1406a (1406b), the indirect optic 1402a (1402b). The indirect optics 1402a/b redirect light emitted by the indirect LEEs 1301a/b and output the redirected light in the angular ranges 162, 162'. The angular ranges 162, 162' into which the illumination device 1400 outputs light is determined at least in part by the choice of curvatures R1, R2 and R3 of a cross-section of the second reflector 1404a. In this example, the curvatures are approximately R1=130 mm, R2=90 mm, and R3=35 mm. FIGS. 14C and 14E-14F show that the second reflector 1404a (1406b) may either be semi-transparent or may have multiple apertures 1408 separated by a pitch A as indicated in FIG. 14E. In an aspect, each of the apertures 1408 of the second reflector 1404a (1406b) is aligned with a corresponding one of the indirect LEEs 1301a/b distributed along the y-axis. In this case, the pitch Δ corresponds to a separation of the indirect LEEs 1301a/b along the y-axis. In some implementations, the pitch A can be approximately 12 mm. FIG. 14F shows that an aperture 1408 fans out from a first aperture end, near an edge of the second reflector 1404a, corresponding to an approximate position 1409 of an indirect LEE with respect to the aperture, to a second aperture end near an opposite edge of the second reflector 1404a. In some implementations, the aperture width at the indirect LEE location 1409 is 4 mm, for example, and at the second aperture end is 8 mm, for example. Here, a ratio of the pitch to aperture width is 3 at the end of second reflector 1404a near the indirect LEEs 1301a/b and 1.5 at the other end of second reflector 1404a remote from the indirect LEEs 1301a/b.

In this manner, when the second reflector(s) 1404a/b of the indirect optic(s) 1402a/b has/ve apertures 1408, the indirect intensity distribution generated by the indirect illumination portion of the illumination device 1400 includes light from indirect LEEs 1301a/b that is transmitted through apertures 1408 towards a ceiling 1380 of a room, and light directed by the indirect optics 1402a/b in angular ranges 162, 162'. As in the other cases described above, the direct intensity distribution results from light output by the direct illumination portion of the illumination device 1400 in the direct angular ranges 152, 152' towards a floor of the room.

Figure 15:
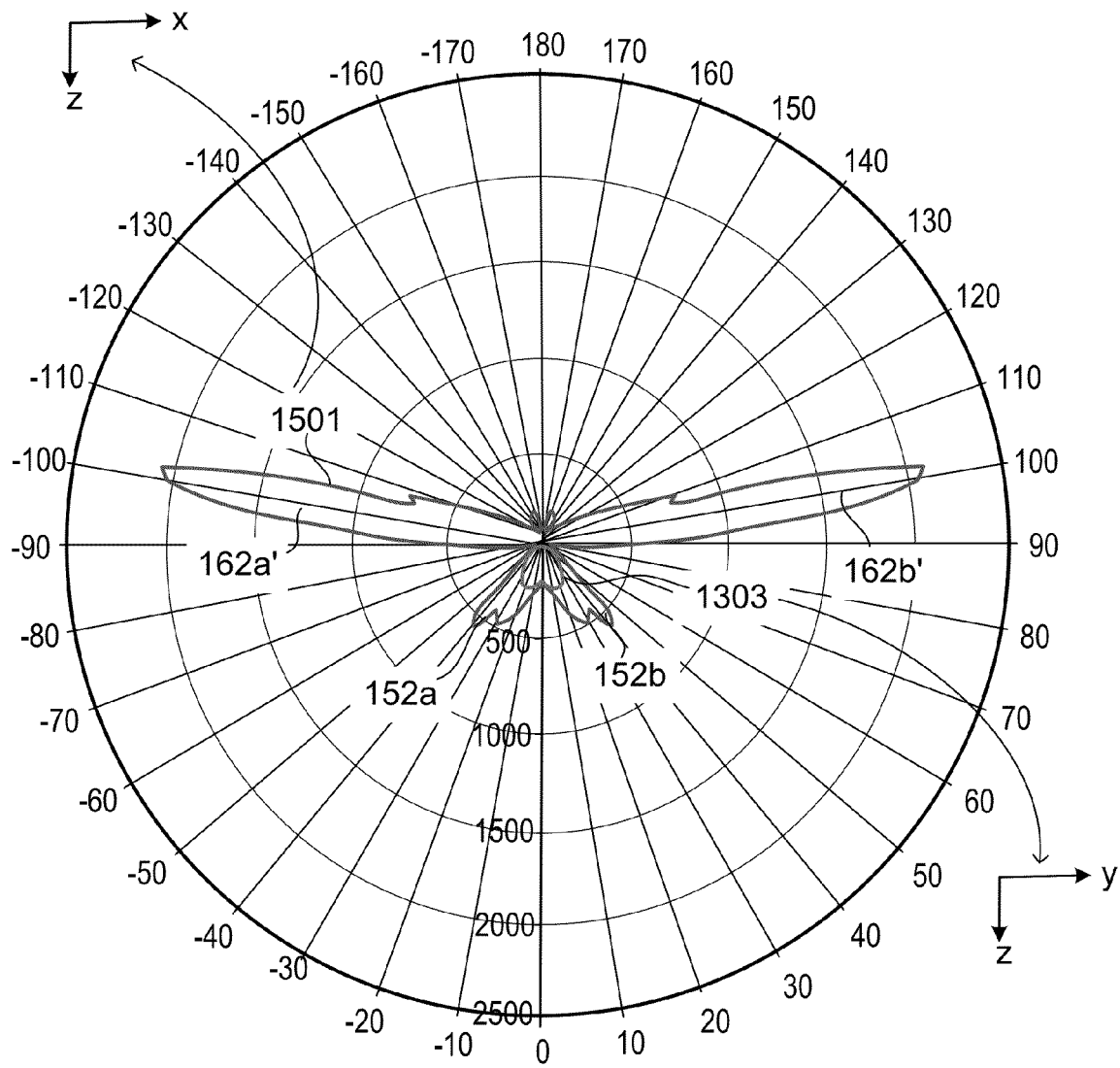
FIG. 15 is an intensity profile of the illumination device of FIGS. 14A-14B.

FIG. 15 shows sections of a simulated intensity profile of suspended illumination device 1400. The curve 1501 corresponds to illumination in a cross-sectional plane (x-z) of the illumination device 1400. The curve 1303 corresponds to illumination in a symmetry plane (y-z) of the illumination device 1400. Here, the light intensity profile 1303 corresponding to direct light output by the illumination device 1500 in the y-z symmetry plane has a divergence determined only by optical power (in this plane) of the first optical coupler 220 of the luminaire module 200.

Lobes 152a, 152b of the light intensity profile 1501 correspond to direct light output by the illumination device 1400 in the x-z cross-section within the direct angular ranges 152, 152'. Here, the lobes 152a, 152b of the light intensity profile 1501 corresponding to light output by the direct illumination portion of the illumination device 1400 are similar to the two lobes of the light intensity pattern 610 represented in FIG. 6. In this example, the luminaire module 200 and the direct secondary reflectors 1350, 1350' of the direct illumination portion of the illumination device 1400 are configured to direct substantially all of the direct (e.g., forward) light 152a into a range of polar angles between −50° and −30° and all of the direct (e.g., forward) light 152b into a range of polar angles between +30° and +50° in the x-z cross-sectional plane of the illumination device 1400, where 0° corresponds to the forward direction. The forward direction is given by a normal to the first surface 1310a of the mount 1310 and, and hence, it is parallel to the light guide 230. For an illumination device mounted on a ceiling 1380, the forward direction is toward the floor.

Further, lobes 162a', 162b' of the light intensity profile 1501 correspond to indirect light output by the illumination device 1500 in the x-z cross-section within the indirect angular ranges 162, 162'. In this example, the indirect optics 1402a, 1402b of the indirect illumination portion of the illumination device 1400 are configured to direct indirect (e.g., backward) light 162a' into a range of polar angles between −90° and −110° and indirect (e.g., backward) light 162b' into a range of polar angles between +90° and +110° in the x-z cross-sectional plane of the illumination device 1400.

As the indirect LEEs 1301a can be powered independently from the indirect LEEs 1301b and from the direct LEEs 201 of the luminaire module 200, multiple configurations of the light intensity profiles shown in FIG. 15 are possible for the illumination device 1400, as indicated in Table 6 below.

TABLE 6

| | Direct illumination | | | Indirect illumination | |
|---|---|---|---|---|---|
| LEE power combinations | Lobe 152a | Lobe 152b | Pattern 1303 | Lobe 162a' | Lobe 162b' |
| Direct LEEs ON; Indirect LEEs 1301a ON; Indirect LEEs 1301b ON | ON | ON | ON | ON | ON |
| Direct LEEs ON; Indirect LEEs 1301a OFF; Indirect LEEs 1301b ON | ON | ON | ON | OFF | ON |
| Direct LEEs ON; Indirect LEEs 1301a ON; Indirect LEEs 1301b OFF | ON | ON | ON | ON | OFF |
| Direct LEEs ON; Indirect LEEs 1301a OFF; Indirect LEEs 1301b OFF | ON | ON | ON | OFF | OFF |
| Direct LEEs OFF; Indirect LEEs 1301a ON; Indirect LEEs 1301b ON | OFF | OFF | OFF | ON | ON |
| Direct LEEs OFF; Indirect LEEs 1301a OFF; Indirect LEEs 1301b ON | OFF | OFF | OFF | OFF | ON |
| Direct LEEs OFF; Indirect LEEs 1301a ON; Indirect LEEs 1301b OFF | OFF | OFF | OFF | ON | OFF |
| Direct LEEs OFF; Indirect LEEs 1301a OFF; Indirect LEEs 1301b OFF | OFF | OFF | OFF | OFF | OFF |

In Table 6, turning direct/indirect LEEs ON causes respective direct/indirect light emission thereof to brighten over a threshold intensity value, while turning the direct/indirect LEEs OFF causes respective direct/indirect light emission thereof to dim under the threshold intensity value. In accordance with the various manners of powering the direct and indirect LEEs shown in Table 6, the following interdependent or independent ways of controlling the intensity distribution associated with the illumination device 1400 are possible: (i) direct lobes 152*a*, 152*b* of the illumination pattern 1501 in the x-z cross-section and the direct illumination pattern 1303 in the y-z symmetry plane are interdependently controlled with respect to each other; (ii) direct lobes 152*a*, 152*b* of the illumination pattern 1501 in the x-z cross-section and the direct illumination pattern 1303 in the y-z symmetry plane are independently controlled with respect to each of indirect lobes 162*a'*, 162*b'* of the illumination pattern 1501 in the x-z cross-section; and (iii) indirect lobes 162*a'*, 162*b'* of the illumination pattern 1501 in the x-z cross-section are independently controlled with respect to each other.

In the particular example illustrated in FIG. 15, the maximum intensity may be about 2100 cd, the efficiency may be about 90% and the total collected power may be about 3000 lm.

A suspended illumination device 1400 may be fabricated in 4 ft or 8 ft lengths and installed in a linear arrangement for example in an office environment. Such illumination devices may emit about 1250 lm/linear foot and provide a peak intensity of above 1500 cd in the indirect light distribution and 800 cd in the direct light distribution.

In some implementations, multiple illumination devices 1400 can be installed in a space to provide desired illumination for a target surface and/or a ceiling area. In general, the number, density, and orientation of the illumination devices in the space can vary as desired to provide an overall intensity profile suitable of the target surface. In some implementations, arrays of luminaire modules can be arranged on a ceiling. FIGS. 16 and 17 illustrate calculated illuminance profiles for an array of illumination devices 1400.

FIG. 16A illustrates a 2D contour plot (in units of Lux as function of x/y position in a horizontal plane parallel to the mount 1310, e.g. the plane may be parallel to the ceiling 1380 of the room) of a simulated illuminance profiles and corresponding lineouts in FIGS. 16B-C (at y=−1500 mm in FIG. 16C, and x about equal to −2000 mm in FIG. 16B) for the 2D plot in FIG. 16A. The simulated illuminance here may be emitted by a four-row array pendant illumination device (here the length L of each LEE row of the elongated illumination device 1400 is about 1204.8 cm long, the device 1400 is about 76.2 cm from a target surface 1690, and the number of direct light-emitting diodes is 40 per row # . . . ) positioned 30.48 cm away from a ceiling 1380 of a 44' (x) by 48' (y) room 1600, where the illumination (corresponding to the plots in FIGS. 16A-16C) is directed towards the ceiling 1380, e.g. the illustrated illuminance may be the indirect or background light as described above. Here, the ceiling 1380 is depicted as the highlighted surface of the room 1600. The uniformity (typically measured in max/min ratio) of the illuminance of the ceiling 1380 may be about 1.5 or better. The illuminance varies between about 900 lux and about 1400 lux across the lineout shown in FIG. 16C. The illuminance of the lineout shown in FIG. 16B stays within a range from about 500 lux to about 1000 lux.

FIG. 17A shows a simulated illuminance on the target surface 1690 (e.g., at the work surface) of the room 1600. FIG. 17A illustrates a 2D contour plot (in units of Lux as function of x/y position in a horizontal plane parallel to the mount 1310, e.g. the plane may be parallel to the wall or ceiling 1380 of the room 1600) of a simulated illuminance and corresponding lineouts in FIGS. 17B-C (at y=−500 mm in FIG. 17C, and x about equal to −4300 mm in FIG. 17B) for the 2D plot in FIG. 17A. Here, the target surface 1690 is depicted as the highlighted surface of the room 1600. The uniformity of the illuminance of the target surface 1690 may be about 1.15 or better. The illuminance profile illustrated in FIGS. 17A-C may be suitable for office space, for example. The illuminance varies between about 1350 lux and about 1600 lux across the lineout shown in FIG. 17C. The illuminance of the lineout shown in FIG. 17B stays within a range from about 1000 lux to about 1500 lux.

In the example implementations described above in connection with FIGS. 14A-14B, the illumination device 1400 is configured to output light into both direct angular ranges 152 and 152' and into both indirect angular ranges 162, 162'.

In other implementations, the illumination device 1400 is modified to output light into both direct angular ranges 152, 152' and in a single indirect angular range 162. Such illumination device configured to output indirect light on a single side of a y-z plane is referred to as a two-sided direct illumination and single-sided indirect illumination device and is denoted 1400'. The two-sided direct illumination and single-sided indirect illumination device 1400' is elongated along the y-axis like the illumination device 1400 shown in FIGS. 14A-14B. Also, the two-sided direct illumination and single-sided indirect illumination device 1400' and the illumination device 1400 have a common direct illumination portion including the luminaire module 200 and the direct secondary reflectors 1350, 1350'. Unlike the illumination device 1400, the two-sided direct illumination and single-sided indirect illumination device 1400' has a single-sided indirect illumination portion that includes indirect LEEs 1301*b* and corresponding indirect optics 1402*b*. Here, the indirect optics 1402*b* redirect light emitted by the indirect LEEs 1301*b* in a first indirect angular range into the second indirect angular range 162. A light intensity profile in the x-z cross-section of the two-sided direct illumination and single-sided indirect illumination device 1400' is similar to the light intensity 101' illustrated in FIG. 1C. In this case, the light intensity profile in the x-z cross-section of the two-sided direct illumination and single-sided indirect illumination device 1400' is represented in FIG. 15 as the curve 1501 with both direct lobes 152*a/b* and a single indirect lobe 162*b'*. Here, the direct lobes 152*a/b* correspond to light output by the two-sided direct illumination and single-sided indirect illumination device 1400' in the direct angular ranges 152, 152' and the single indirect lobe 162*b'* corresponds to light output by the two-sided direct illumination and single-sided indirect illumination device 1400' in the indirect angular range 162.

In some other implementations, the illumination device 1400 is modified to output light into a single direct angular range 152 and in both indirect angular ranges 162, 162'. Such illumination device configured to output direct light on a single side of a y-z plane is referred to as a single-sided direct illumination and two-sided indirect illumination device and is denoted 1400". The single-sided direct illumination and two-sided indirect illumination device 1400" is elongated along the y-axis like the illumination device 1400 shown in FIGS. 14A-14B. Also, the single-sided direct illumination and two-sided indirect illumination device 1400" and the illumination device 1400 have a common indirect illumination portion including indirect LEEs 1301*a/b* and indirect optics 1402*a/b*. Unlike the illumination device 1400, the single-sided direct illumination and two-sided indirect illumination device 1400" has a single-sided direct illumination portion that includes a single-sided luminaire module 200'—described above in connection with FIGS. 2A-2G—and a single direct secondary reflector 1350. The mount 1310 of the single-sided direct illumination and two-sided indirect illumination device 1400'' can support both the single-sided luminaire module 200' and the single direct secondary reflector 1350 such that light provided by the single-sided luminaire module 200' in the fourth angular range 142 is reflected by the single direct secondary reflector 1350 into a single direct angular range 152. This configuration of the direct illumination portion can be implemented as the single-sided illumination device 500' described above in connection with FIG. 5. A light intensity profile in the x-z cross-section of the single-sided direct illumination and two-sided indirect illumination device 1400'' is similar to the light intensity 101'' illustrated in FIG. 1D. In this case, the light intensity profile in the x-z cross-section of the single-sided direct illumination and two-sided indirect illumination device 1400'' is represented in FIG. 15 as the curve 1501 with both indirect lobes 162a'/b' and a single direct lobe 152b. Here, the indirect lobes 162a'/b' correspond to light output by the single-sided direct illumination and two-sided indirect illumination device 1400'' in the indirect angular ranges 162, 162', and the single direct lobe 152b corresponds to light output by the single-sided direct illumination and two-sided indirect illumination device 1400'' in the direct angular range 152.

In yet some other implementations, the illumination device 1400 is modified to output light into a single direct angular range 152 and in a single indirect angular range 162. Such illumination device configured to output direct and indirect light on a single side of a y-z plane is referred to as a single-sided direct/indirect illumination device and is denoted 1400'''. The single-sided direct/indirect illumination device 1400''' is elongated along the y-axis like the illumination device 1400 shown in FIGS. 14A-14B. Unlike the illumination device 1400, the single-sided direct/indirect illumination device 1400''' has a single-sided direct illumination portion that includes a single-sided luminaire module 200'—described above in connection with FIGS. 2A-2G—and a single direct secondary reflector 1350. The mount 1310 of the single-sided direct/indirect illumination device 1400''' can support both the single-sided luminaire module 200' and the single direct secondary reflector 1350 such that light provided by the single-sided luminaire module 200' in the fourth angular range 142 is reflected by the single direct secondary reflector 1350 into a single direct angular range 152. This configuration of the direct illumination portion can be implemented as the illumination device 500' described above in connection with FIG. 5. Also, the single-sided direct/indirect illumination device 1400''' has a single-sided indirect illumination portion that includes indirect LEEs 1301b and corresponding indirect optics 1402b. Here, the indirect optics 1402b redirect light emitted by the indirect LEEs 1301b in a first indirect angular range into the second indirect angular range 162. A light intensity profile in the x-z cross-section of the single-sided direct/indirect illumination device 1400''' is similar to the light intensity 101''' illustrated in FIG. 1E. In this case, the light intensity profile in the x-z cross-section of the single-sided direct/indirect illumination device 1400''' is represented in FIG. 5 as the curve 1501 with a single direct lobe 152b and a single indirect lobe 162b'. Here, the single direct lobe 152b corresponds to light output by the single-sided direct/indirect illumination device 1400''' in the direct angular range 152 and the single indirect lobe 162b' corresponds to light output by the single-sided direct/indirect illumination device 1400''' in the indirect angular range 162.

(vii) Third Implementation of Illumination Device Used to Provide Direct and Indirect Illumination FIG. 18A illustrates another example implementation of an illumination device 1800 (similar to the one described above in connection with FIGS. 13A-13B.)

The illumination device 1800 includes a mount 1810 that is elongated along the y-axis and supports a direct illumination portion and an indirect illumination portion of the illumination device 1800. For example, the direct illumination portion of the illumination device 1800 can be implemented as the illumination device 500 described above in connection with FIG. 5. Here, the direct portion of the illumination device 1800 includes a luminaire module 200 (e.g., as described above in connection with FIG. 2A) and direct secondary reflectors 1350, 1350', as described above in connection with FIGS. 13A-13B and 14A-14B. Once again, the luminaire module 200 and the direct secondary reflectors 1350, 1350' are elongated along the y-axis. Direct LEEs included in the luminaire module 200 are distributed along the y-axis on a first surface 1810a of the mount 1810. Also in analogy with the illumination devices 1300 and 1400 described above in connection with FIGS. 13A-13B and 14A-14B, the indirect illumination portion of the illumination device 1800 includes indirect LEEs 1301a/b and indirect optics 1802a/b, both of which also are supported by the mount 1810.

As described above in connection with FIGS. 13A-13B and 14A-14B, the luminaire module 200 and the direct secondary reflectors 1350, 1350' are arranged and configured such that the direct illumination portion of the illumination device 1800 provides light in angular ranges 152, 152' corresponding to the direct intensity distribution of the illumination device 1800. In some implementations, a prevalent direction of propagation of light in each of the angular ranges 152, 152' has a non-zero component parallel with a normal to the first surface 1810a of the mount 1810. Here, the light output by the illumination device 1800 as direct illumination in angular ranges 152, 152' corresponds to the two lobes of the light intensity 610 pattern represented in FIG. 6.

In other implementations, not illustrated in FIG. 18A, the direct illumination portion of the illumination device 1800 can be implemented as the illumination device 800 described above in connection with FIGS. 8A-8C. In such cases, the light output by the direct illumination portion of the illumination device 1800 as direct illumination in angular ranges 152, 152' corresponds to the lobes 910, 910' of the light intensity pattern represented in FIG. 9.

Referring again to FIG. 18A, the indirect LEEs are operatively arranged in two rows 1301a and 1301b. Each of the two rows of indirect LEEs 1301a and 1301b includes multiple indirect LEEs distributed along the y-axis direction on respective surfaces of the mount 1810 that are substantially parallel to the first surface 1810a of the mount and are located on an opposite side of the mount with respect to the first surface. In this case, these surfaces are oriented substantially parallel to a ceiling 1380 when the illumination device 1800 is suspended from the ceiling. The two rows of multiple LEEs 1301a and 1301b can be powered to emit light independently from each other or from the direct LEEs of the luminaire module 200.

Each of the indirect optics 1802a/b includes a single reflector attached to a corresponding surface of the mount 1810 that is substantially parallel to the first surface 1810a of the mount and is located on an opposite side of the mount with respect to the first surface. In this case, the surfaces of the mount 1810, to which the indirect optics 1802a/b are attached, are oriented substantially parallel to a ceiling 1380 when the illumination device 1800 is suspended from the ceiling. In this manner, the indirect optics 1802a/b are configured to cast light emitted by the indirect LEEs 1301a/b in angular ranges 162, 162' corresponding to the indirect intensity distribution of the illumination device 1800. In some implementations, a prevalent direction of propagation of light in each of the angular ranges 162, 162' has a non-zero component antiparallel with a normal to the first surface 1810a of the mount 1810.

In some implementations, the illumination device 1800 is suspended from a ceiling 1380 using a combination 1308 of rods and wires. In some implementations, the indirect optics 1802a and 1802b may be closed off at two ends by walls in the x-z plane (not shown in FIG. 18) in analogy with the end-walls 1470 of illumination device 1400. The end-walls that close off the indirect optics 1802a and 1802b can be configured to reflect components of incident light 162a", 162b" along the y-axis.

The indirect intensity distribution may be used to indirectly illuminate the target surface with light scattered or reflected from the ceiling 1380, for instance.

Figure 18B:
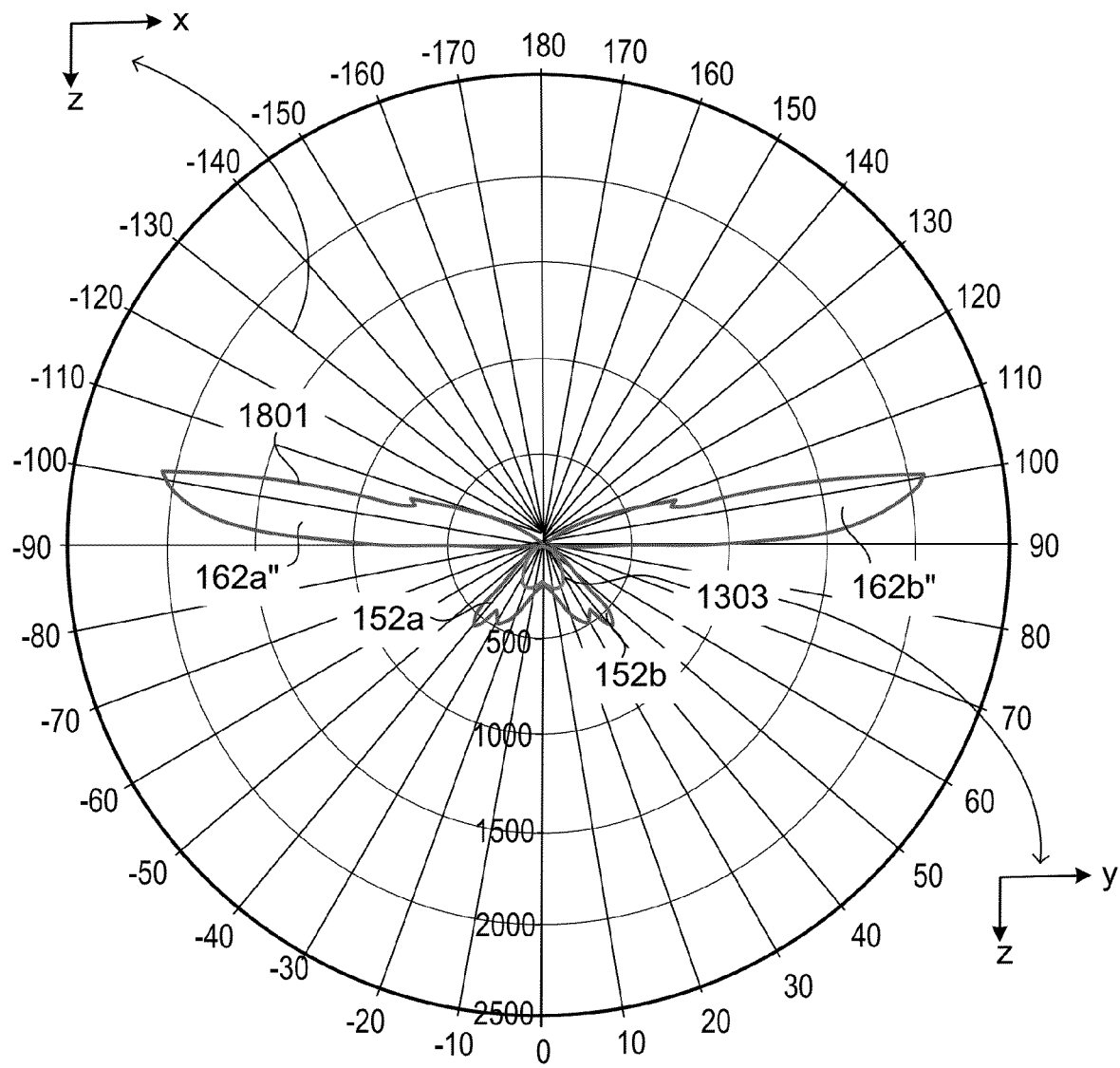

FIG. 18B shows sections of light intensity profile of suspended illumination device 1800. The curve 1801 corresponds to illumination in a cross-sectional plane (x-z) of the illumination device 1800. The curve 1303 corresponds to illumination in a symmetry plane (y-z) of the illumination device 1800. Here, the light intensity profile 1303 corresponding to direct light output by the illumination device 1800 in the y-z symmetry plane has a divergence determined only by optical power (in this plane) of the first optical coupler 220 of the luminaire module 200.

Lobes 152a, 152b of the light intensity profile 1801 correspond to direct light output by the illumination device 1800 in the x-z cross-section within the direct angular ranges 152, 152'. Here, the lobes 152a, 152b of the light intensity profile 1801 corresponding to light output by the direct illumination portion of the illumination device 1800 are similar to the two lobes of the light intensity pattern 610 represented in FIG. 6. In this example, the luminaire module 200 and the direct secondary reflectors 1350, 1350' of the direct illumination portion of the illumination device 1800 are configured to direct substantially all of the direct (e.g., forward) light 152a into a range of polar angles between −50° and −30° and all of the direct (e.g., forward) light 152b into a range of polar angles between +30° and +50° in the x-z cross-sectional plane of the illumination device 1800, where 0° corresponds to the forward direction. The forward direction is given by a normal to the first surface 1810a of the mount 1810 and, and hence, it is parallel to the light guide 230. For an illumination device mounted on a ceiling 1380, the forward direction is toward the floor.

Further, lobes 162a", 162b" of the light intensity profile 1801 correspond to indirect light output by the illumination device 1800 in the x-z cross-section within the indirect angular ranges 162, 162'. In this example, the indirect optics 1802a, 1802b of the indirect illumination portion of the illumination device 1800 are configured to direct substantially all of the indirect (e.g., backward) light 162a" into a range of polar angles between −90° and −110° and all of the indirect (e.g., backward) light 162b" into a range of polar angles between +90° and +110° in the x-z cross-sectional plane of the illumination device 1800.

As the indirect LEEs 1301a can be powered independently from the indirect LEEs 1301b and from the direct LEEs of the luminaire module 200, multiple configurations of the light intensity profiles shown in FIG. 18B are possible for the illumination device 1800, as indicated in Table 7 below.

TABLE 7

| LEE power combinations | Direct illumination | | | Indirect illumination | |
|---|---|---|---|---|---|
| | Lobe 152a | Lobe 152b | Pattern 1303 | Lobe 162a" | Lobe 162b" |
| Direct LEEs ON; Indirect LEEs 1301a ON; Indirect LEEs 1301b ON | ON | ON | ON | ON | ON |
| Direct LEEs ON; Indirect LEEs 1301a OFF; Indirect LEEs 1301b ON | ON | ON | ON | OFF | ON |
| Direct LEEs ON; Indirect LEEs 1301a ON; Indirect LEEs 1301b OFF | ON | ON | ON | ON | OFF |
| Direct LEEs ON; Indirect LEEs 1301a OFF; Indirect LEEs 1301b OFF | ON | ON | ON | OFF | OFF |
| Direct LEEs OFF; Indirect LEEs 1301a ON; Indirect LEEs 1301b ON | OFF | OFF | OFF | ON | ON |
| Direct LEEs OFF; Indirect LEEs 1301a OFF; Indirect LEEs 1301b ON | OFF | OFF | OFF | OFF | ON |
| Direct LEEs OFF; Indirect LEEs 1301a ON; Indirect LEEs 1301b OFF | OFF | OFF | OFF | ON | OFF |
| Direct LEEs OFF; Indirect LEEs 1301a OFF; Indirect LEEs 1301b OFF | OFF | OFF | OFF | OFF | OFF |

In Table 7, turning direct/indirect LEEs ON causes respective direct/indirect light emission thereof to brighten over a threshold intensity value, while turning the direct/indirect LEEs OFF causes respective direct/indirect light emission thereof to dim under the threshold intensity value. In accordance with the various manners of powering the direct and indirect LEEs shown in Table 7, the following interdependent or independent ways of controlling the intensity distribution associated with the illumination device 1800 are possible: (i) direct lobes 152a, 152b of the illumination pattern 1801 in the x-z cross-section and the direct illumination pattern 1303 in the y-z symmetry plane are interdependently controlled with respect to each other; (ii) direct lobes 152a, 152b of the illumination pattern 1801 in the x-z cross-section and the direct illumination pattern 1303 in the y-z symmetry plane are independently controlled with respect to each of indirect lobes 162a", 162b" of the illumination pattern 1801 in the x-z cross-section; and (iii) indirect lobes 162a", 162b" of the illumination pattern 1801 in the x-z cross-section are independently controlled with respect to each other.

In the example implementations described above in connection with FIG. 18A, the illumination device 1800 is configured to output light into both direct angular ranges 152 and 152' and into both indirect angular ranges 162, 162'.

In other implementations, the illumination device 1800 is modified to output light into both direct angular ranges 152, 152' and in a single indirect angular range 162. Such illumination device configured to output indirect light on a single side of a y-z plane is referred to as a two-sided direct illumination and single-sided indirect illumination device and is denoted 1800'. The two-sided direct illumination and single-sided indirect illumination device 1800' is elongated along the y-axis like the illumination device 1800 shown in FIG. 18A. Also, the two-sided direct illumination and single-sided indirect illumination device 1800' and the illumination device 1800 have a common direct illumination portion including the luminaire module 200 and the direct secondary reflectors 1350, 1350'. Unlike the illumination device 1800, the two-sided direct illumination and single-sided indirect illumination device 1800' has a single-sided indirect illumination portion that includes indirect LEEs 1301*b* and corresponding indirect optics 1802*b*. Here, the indirect optics 1802*b* redirect light emitted by the indirect LEEs 1301*b* in a first indirect angular range into the second indirect angular range 162. A light intensity profile in the x-z cross-section of the two-sided direct illumination and single-sided indirect illumination device 1800' is similar to the light intensity 101' illustrated in FIG. 1C. In this case, the light intensity profile in the x-z cross-section of the two-sided direct illumination and single-sided indirect illumination device 1800' is represented in FIG. 18B as the curve 1801 with both direct lobes 152*a/b* and a single indirect lobe 162*b*". Here, the direct lobes 152*a/b* correspond to light output by the two-sided direct illumination and single-sided indirect illumination device 1800' in the direct angular ranges 152, 152' and the single indirect lobe 162*b*" corresponds to light output by the two-sided direct illumination and single-sided indirect illumination device 1800' in the indirect angular range 162.

In some other implementations, the illumination device 1800 is modified to output light into a single direct angular range 152 and in both indirect angular ranges 162, 162'. Such illumination device configured to output direct light on a single side of a y-z plane is referred to as a single-sided direct illumination and two-sided indirect illumination device and is denoted 1800". The single-sided direct illumination and two-sided indirect illumination device 1800" is elongated along the y-axis like the illumination device 1800 shown in FIG. 18A. Also, the single-sided direct illumination and two-sided indirect illumination device 1800" and the illumination device 1800 have a common indirect illumination portion including indirect LEEs 1301*a/b* and indirect optics 1802*a/b*. Unlike the illumination device 1800, the single-sided direct illumination and two-sided indirect illumination device 1800" has a single-sided direct illumination portion that includes a single-sided luminaire module 200'—described above in connection with FIGS. 2A-2G—and a single direct secondary reflector 1350. The mount 1810 of the single-sided direct illumination and two-sided indirect illumination device 1800" can support both the single-sided luminaire module 200' and the single direct secondary reflector 1350 such that light provided by the single-sided luminaire module 200' in the fourth angular range 142 is reflected by the single direct secondary reflector 1350 into a single direct angular range 152. This configuration of the direct illumination portion can be implemented as the single-sided illumination device 500' described above in connection with FIG. 5. A light intensity profile in the x-z cross-section of the single-sided direct illumination and two-sided indirect illumination device 1800" is similar to the light intensity 101" illustrated in FIG. 1D. In this case, the light intensity profile in the x-z cross-section of the single-sided direct illumination and two-sided indirect illumination device 1800" is represented in FIG. 18B as the curve 1801 with both indirect lobes 162*a"/b*" and a single direct lobe 152*b*. Here, the indirect lobes 162*a"/b*" correspond to light output by the single-sided direct illumination and two-sided indirect illumination device 1800" in the indirect angular ranges 162, 162', and the single direct lobe 152*b* corresponds to light output by the single-sided direct illumination and two-sided indirect illumination device 1800" in the direct angular range 152.

In yet some other implementations, the illumination device 1800 is modified to output light into a single direct angular range 152 and in a single indirect angular range 162. Such illumination device configured to output direct and indirect light on a single side of a y-z plane is referred to as a single-sided direct/indirect illumination device and is denoted 1800'''. The single-sided direct/indirect illumination device 1800''' is elongated along the y-axis like the illumination device 1800 shown in FIG. 18A. Unlike the illumination device 1800, the single-sided direct/indirect illumination device 1800''' has a single-sided direct illumination portion that includes a single-sided luminaire module 200'—described above in connection with FIGS. 2A-2G—and a single direct secondary reflector 1350. The mount 1810 of the single-sided direct/indirect illumination device 1800' can support both the single-sided luminaire module 200' and the single direct secondary reflector 1350 such that light provided by the single-sided luminaire module 200' in the fourth angular range 142 is reflected by the single direct secondary reflector 1350 into a single direct angular range 152. This configuration of the direct illumination portion can be implemented as the illumination device 500' described above in connection with FIG. 5. Also, the single-sided direct/indirect illumination device 1800' has a single-sided indirect illumination portion that includes indirect LEEs 1301*b* and corresponding indirect optics 1802*b*. Here, the indirect optics 1802*b* redirect light emitted by the indirect LEEs 1301*b* in a first indirect angular range into the second indirect angular range 162. A light intensity profile in the x-z cross-section of the single-sided direct/indirect illumination device 1800' is similar to the light intensity 101' illustrated in FIG. 1E. In this case, the light intensity profile in the x-z cross-section of the single-sided direct/indirect illumination device 1800' is represented in FIG. 18B as the curve 1801 with a single direct lobe 152*b* and a single indirect lobe 162*b*". Here, the single direct lobe 152*b* corresponds to light output by the single-sided direct/indirect illumination device 1800' in the direct angular range 152 and the single indirect lobe 162*b*" corresponds to light output by the single-sided direct/indirect illumination device 1800' in the indirect angular range 162.

(viii) Fourth Implementation of Illumination Device Used to Provide Direct and Indirect Illumination FIG. 19A illustrates another example implementation of an illumination device 1900 (as described above in connection with FIGS. 13A-13B including further features.) The illumination device 1900 includes a mount 1910 and a frame 1950, both of which are elongated along the y-axis. End faces 1950*a* and 1950*b* (the latter not shown in FIG. 19A) couple the frame 1950 with the mount 1910. The end faces 1950*a/b* of the frame 1950 are similar to end faces 850, 850' of the frame of illumination device 900 described above in connection with FIGS. 9A-9C.

A direct illumination portion of the illumination device 1900 is supported by the mount 1910, and an indirect illumination portion of the illumination device 1900 is supported by the mount 1910 and the frame 1950. In this example, the direct illumination portion of the illumination device 1900 is implemented as the illumination device 500 described above in connection with FIG. 5, and the indirect illumination portion of the illumination device 1900 is implemented as a configuration of the illumination device 800 described above in connection with FIGS. 8A-8C that is "inverted" or "upside-down" with respect to the x-y plane and positioned on top of the illumination device 500.

Here, the direct illumination portion of the illumination device 1900 includes a luminaire module 200 (e.g., as described above in connection with FIG. 2A) and direct secondary reflectors 1350, 1350', as described above in connection with FIGS. 13A-13B, 14A-14B and 18. Once again, the luminaire module 200 and the direct secondary reflectors 1350, 1350' are elongated along the y-axis. Direct LEEs included in the luminaire module 200 are distributed along the y-axis on a first surface 1910*a* of the mount 1910. Further in this case, the indirect portion of the illumination device 1900 includes indirect LEEs 1301 supported by the mount 1910 and an indirect optics system supported by the combination of the frame 1950 and the mount 1910.

As described above in connection with FIGS. 13A-13B, 14A-14B and 18, the luminaire module 200 and the direct secondary reflectors 1350, 1350' are arranged and configured such that the direct illumination portion of the illumination device 1900 provides light in angular ranges 152, 152' corresponding to the direct intensity distribution of the illumination device 1900. In some implementations, a prevalent direction of propagation of light in each of the angular ranges 152, 152' has a non-zero component parallel with a normal to the first surface 1910a of the mount 1910. Here, the light output by the illumination device 1900 as direct illumination in angular ranges 152, 152' corresponds to the two lobes of the light intensity 610 pattern represented in FIG. 6.

In other implementations, not illustrated in FIG. 19A, the direct illumination portion of the illumination device 1900 can be implemented as the illumination device 800 described above in connection with FIGS. 8A-8C. In such cases, the light output by the direct illumination portion of the illumination device 1900 as direct illumination in angular ranges 152, 152' corresponds to the lobes 910, 910' of the light intensity pattern represented in FIG. 9.

Referring again to FIG. 19A, the indirect LEEs are operatively arranged in a row 1301 which includes multiple indirect LEEs distributed along the y-axis direction on a surface of the mount 1910 that is substantially parallel to the first surface 1910a of the mount and is located on an opposite side of the mount with respect to the first surface. In this case, the surface that supports the row of LEEs 1301 is oriented substantially parallel to a ceiling 1380 when the illumination device 1900 is suspended from the ceiling. The row of LEEs 1301 can be powered to emit light independently from the direct LEEs of the luminaire module 200.

The indirect optics system of illumination device 1900 includes an optical coupler 1920 (also referred to as a collimating optic 1920) elongated along the y-axis and supported by the mount 1910. The optical coupler 1920 is configured to collimate (at least in the x-z cross-section) the light emitted by the indirect light emitting elements 1301.

Further, the indirect optics system of illumination device 1900 includes two reflectors 1940, 1940'. Each of the two reflectors 1940, 1940' is supported on a corresponding surface of mount 1910 that is substantially parallel to the first surface 1910a of the mount and is located on an opposite side of the mount with respect to the first surface. In this case, the surfaces of the mount 1910 that support the two reflectors 1940, 1940' are oriented substantially parallel to a ceiling 1380 when the illumination device 1900 is suspended from the ceiling. The two reflectors 1940, 1940' are elongated along the y-axis.

The indirect optics system of illumination device 1900 also includes a redirecting optic 1930 attached to the frame 1950 to be spaced apart from the optical coupler 1920 supported by the mount 1910. The redirecting optic 1930 can be a reflector elongated along the y-axis which includes two portions separated by an apex 1935, in analogy with the redirecting surface 830 of the illumination device 800 described above in connection with FIG. 8C. An x-z cross section of the redirecting optic 1930 can be shaped as any one of the examples of redirecting surface 243 described above in connection with FIGS. 2B-2G. In some implementations, the apex 1935 and the row of indirect LEEs 1301 are parallel and coplanar. Additionally, a divergence of the light collimated by the optical coupler 1920 and the relative separation between the apex 1935 and the optical coupler 1920 are configured such that all the light collimated by the optical coupler impinges on the redirecting optic 1930. One portion of the redirecting surface 1930 and the first reflector 1940 are arranged to redirect light that is partially collimated by the optical coupler 1920 as first redirected light in angular range 162. The second portion of the redirecting surface 1930 and the second reflector 1940' are arranged to redirect light that is partially collimated by the optical coupler 1920 as second redirected light in angular range 162'. The angular ranges 162, 162' form the indirect intensity distribution of the illumination device 1900. In some implementations, a prevalent direction of propagation of light in each of the angular ranges 162, 162' has a non-zero component antiparallel with a normal to the first surface 1910a of the mount 1910.

In some implementations, the reflectors 1940, 1940' are parabolic light reflectors, e.g., parabolic mirrors. In some implementation, the apex 1935 of the redirecting surface 1930 is rounded and has a non-zero radius of curvature. In some implementations, the redirecting surface 1930 is v-shaped or is shaped as an arc of a circle, parabola or ellipse. In some implementations, each of the portions of the redirecting surface 1930 separated from each other via the apex 1935 can have arcuate shapes in a cross-sectional plane perpendicular to the y-axis. In some implementation, the reflectors 1940 and 1940' are integral parts of the mount 1910. In some implementations, the end-faces 1950a/b of the frame 1950 that supports the redirecting optics 1930 can be configured to reflect components of incident light 162a, 162a' along the y-axis. In some implementations, the illumination device 1900 is suspended to a ceiling 1380 using a combination 1308 of rods and wires.

In general, the luminaire module 200, and the direct secondary reflectors 1350, 1350', on one hand, and the collimating optic 1920, the reflectors 1940, 1940' and the redirecting optic 1930 of the indirect optics system, on the other hand may be iteratively modified in their relative spatial position and/or optical properties (spatial shape of reflective surfaces, index of refraction of solid material, spectrum of emitted or output light etc.) to provide specified direct and indirect illumination distribution.

Figure 19B:
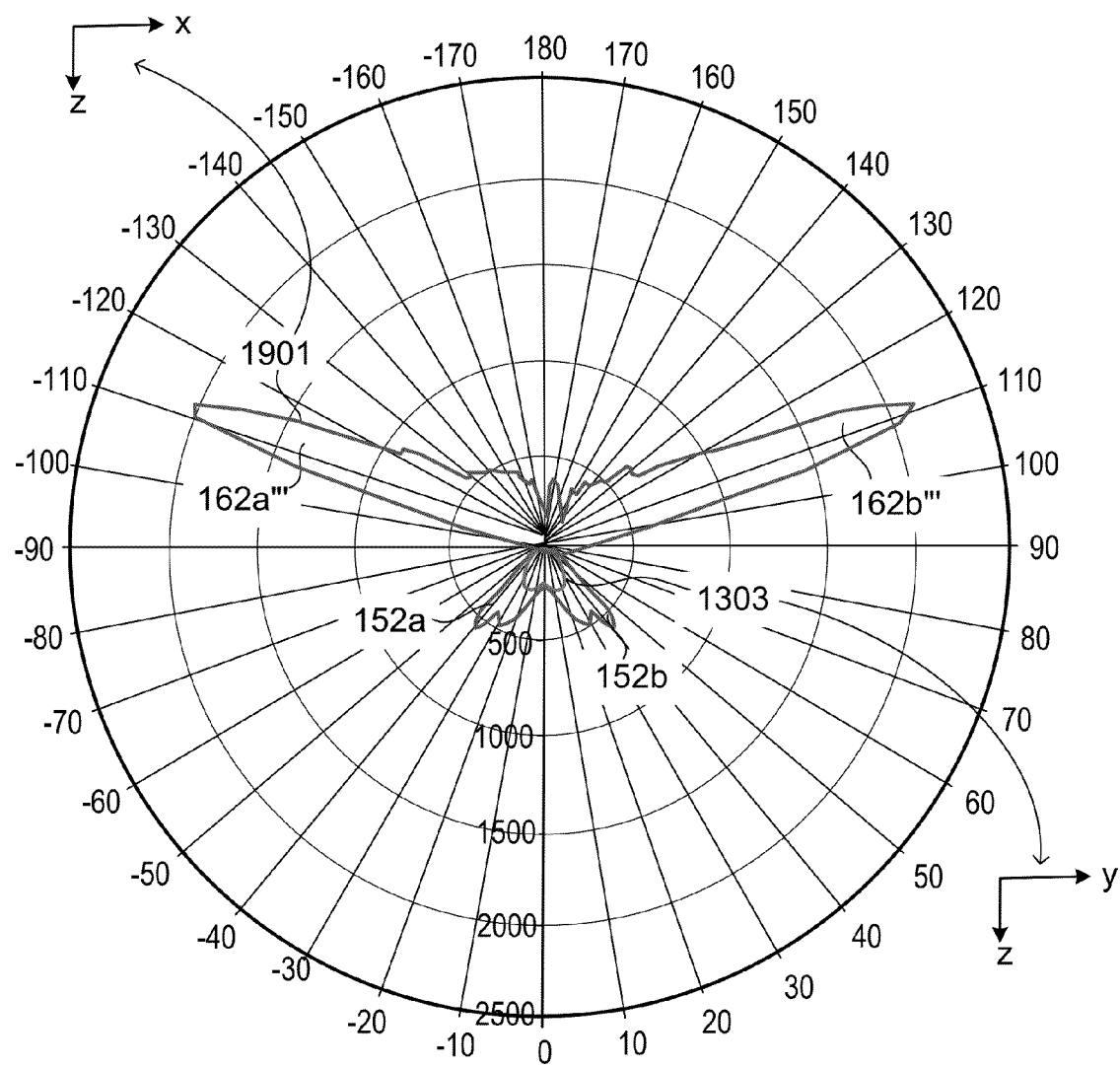

FIG. 19B shows sections of light intensity profile of suspended illumination device 1900. The curve 1901 corresponds to illumination in a cross-sectional plane (x-z) of the illumination device 1900. The curve 1303 corresponds to illumination in a symmetry plane (y-z) of the illumination device 1900. Here, the light intensity profile 1303 corresponding to direct light output by the illumination device 1900 in the y-z symmetry plane has a divergence determined only by optical power (in this plane) of the first optical coupler 220 of the luminaire module 200.

Lobes 152a, 152b of the light intensity profile 1901 correspond to direct light output by the illumination device 1900 in the x-z cross-section within the direct angular ranges 152, 152'. Here, the lobes 152a, 152b of the light intensity profile 1901 corresponding to light output by the direct illumination portion of the illumination device 1900 are similar to the two lobes of the light intensity pattern 610 represented in FIG. 6. In this example, the luminaire module 200 and the direct secondary reflectors 1350, 1350' of the direct illumination portion of the illumination device 1900 are configured to direct substantially all of the direct (e.g., forward) light 152a into a range of polar angles between −50° and −30° and all of the direct (e.g., forward) light 152b into a range of polar angles between +30° and +50° in the x-z cross-sectional plane of the illumination device 1900, where 0° corresponds to the forward direction. The forward direction is given by a normal to the first surface 1910*a* of the mount 1910 and, and hence, it is parallel to the light guide 230. For an illumination device mounted on a ceiling 1380, the forward direction is toward the floor.

Further, lobes 162*a'''*, 162*b'''* of the light intensity profile 1901 correspond to indirect light output by the illumination device 1900 in the x-z cross-section within the indirect angular ranges 162, 162'. In this example, collimating optic 1920, the reflectors 1940, 1940' and the redirecting optic 1930 of the indirect optics system of the illumination device 1900 are configured to direct substantially all of the indirect (e.g., backward) light 162*a'''* into a range of polar angles between −105° and −115° and all of the indirect (e.g., backward) light 162*b''''* into a range of polar angles between +105° and +115° in the x-z cross-sectional plane of the illumination device 1900.

As the indirect LEEs 1301 can be powered independently from the direct LEEs of the luminaire module 200, multiple configurations of the light intensity profiles shown in FIG. 19B are possible for the illumination device 1900, as indicated in Table 8 below.

TABLE 8

| LEE power combinations | Direct illumination | | | Indirect illumination | |
|---|---|---|---|---|---|
| | Lobe 152a | Lobe 152b | Pattern 1303 | Lobe 162a''' | Lobe 162b''' |
| Direct LEEs ON; Indirect LEEs 1301 ON | ON | ON | ON | ON | ON |
| Direct LEEs ON; Indirect LEEs 1301 OFF | ON | ON | ON | OFF | OFF |
| Direct LEEs OFF; Indirect LEEs 1301 ON | OFF | OFF | OFF | ON | ON |
| Direct LEEs OFF; Indirect LEEs 1301 OFF | OFF | OFF | OFF | OFF | OFF |

In Table 8, turning direct/indirect LEEs ON causes respective direct/indirect light emission thereof to brighten over a threshold intensity value, while turning the direct/indirect LEEs OFF causes respective direct/indirect light emission thereof to dim under the threshold intensity value. In accordance with the various manners of powering the direct and indirect LEEs shown in Table 8, the following interdependent or independent ways of controlling the intensity distribution associated with the illumination device 1900 are possible: (i) direct lobes 152*a*, 152*b* of the illumination pattern 1901 in the x-z cross-section and the direct illumination pattern 1303 in the y-z symmetry plane are interdependently controlled with respect to each other; (ii) direct lobes 152*a*, 152*b* of the illumination pattern 1901 in the x-z cross-section and the direct illumination pattern 1303 in the y-z symmetry plane are independently controlled with respect to indirect lobes 162*a'''*, 162*b'''* of the illumination pattern 1901 in the x-z cross-section; and (iii) indirect lobes 162*a'''*, 162*b'''* of the illumination pattern 1901 in the x-z cross-section are interdependently controlled with respect to each other.

In the example implementations described above in connection with FIG. 19A, the illumination device 1900 is configured to output light into both direct angular ranges 152 and 152' and into both indirect angular ranges 162, 162'.

In other implementations, the illumination device 1900 is modified to output light into both direct angular ranges 152, 152' and into a single indirect angular range 162. Such illumination device configured to output indirect light on a single side of a y-z plane is referred to as a two-sided direct illumination and single-sided indirect illumination device and is denoted 1900'. The two-sided direct illumination and single-sided indirect illumination device 1900' is elongated along the y-axis like the illumination device 1900 shown in FIG. 19A. Also, the two-sided direct illumination and single-sided indirect illumination device 1900' and the illumination device 1900 have a common direct illumination portion including the luminaire module 200 and the direct secondary reflectors 1350, 1350'. Unlike the illumination device 1900, the two-sided direct illumination and single-sided indirect illumination device 1900' has a single-sided indirect illumination portion that includes indirect LEEs 1301 and an optical coupler 1920 configured to collimate the light emitted by the indirect LEEs. The single-sided indirect illumination portion also includes a redirecting optic 1930 and a single reflector 1940. The redirecting optic 1930 has a single reflective surface arranged and configured to redirect all the collimated light provided by the optical coupler 1920 towards the single reflector 1940. The single reflector 1940 is configured to reflect the light from the redirecting optic into a single indirect angular range 162. This configuration of the single-sided indirect illumination portion can be implemented as an inverted version (relative to the x-y plane) of the single-sided illumination device 800' described above in connection with FIGS. 8A-8C. A light intensity profile in the x-z cross-section of the two-sided direct illumination and single-sided indirect illumination device 1900' is similar to the light intensity 101' illustrated in FIG. 1C. In this case, the light intensity profile in the x-z cross-section of the two-sided direct illumination and single-sided indirect illumination device 1900' is represented in FIG. 19B as the curve 1901 with both direct lobes 152*a/b* and a single indirect lobe 162*r*. Here, the direct lobes 152*a/b* correspond to light output by the two-sided direct illumination and single-sided indirect illumination device 1900' in the direct angular ranges 152, 152' and the single indirect lobe 162*b'* corresponds to light output by the two-sided direct illumination and single-sided indirect illumination device 1900' in the indirect angular range 162.

In some other implementations, the illumination device 1900 is modified to output light into a single direct angular range 152 and in both indirect angular ranges 162, 162'. Such illumination device configured to output direct light on a single side of a y-z plane is referred to as a single-sided direct illumination and two-sided indirect illumination device and is denoted 1900''. The single-sided direct illumination and two-sided indirect illumination device 1900'' is elongated along the y-axis like the illumination device 1900 shown in FIG. 19A. Also, the single-sided direct illumination and two-sided indirect illumination device 1900'' and the illumination device 1900 have a common indirect illumination portion including indirect LEEs 1301, optical coupler 1920, redirecting optic 1930 and reflectors 1940, 1940'. Unlike the illumination device 1900, the single-sided direct illumination and two-sided indirect illumination device 1900'' has a single-sided direct illumination portion that includes a single-sided luminaire module 200'—described above in connection with FIGS. 2A-2G—and a single direct secondary reflector 1350. The mount 1910 of the single-sided direct illumination and two-sided indirect illumination device 1900'' can support both the single-sided luminaire module 200' and the single direct secondary reflector 1350 such that light provided by the single-sided luminaire module 200' in the fourth angular range 142 is reflected by the single direct secondary reflector 1350 into a single direct angular range 152. This configuration of the direct illumination portion can be implemented as the single-sided illumination device 500' described above in connection with FIG. 5. A light intensity profile in the x-z cross-section of the single-sided direct illumination and two-sided indirect illumination device 1900" is similar to the light intensity 101" illustrated in FIG. 1D. In this case, the light intensity profile in the x-z cross-section of the single-sided direct illumination and two-sided indirect illumination device 1900" is represented in FIG. 19B as the curve 1901 with both indirect lobes 162a'''/b''' and a single direct lobe 152b. Here, the indirect lobes 162a'''/b''' correspond to light output by the single-sided direct illumination and two-sided indirect illumination device 1900" in the indirect angular ranges 162, 162', and the single direct lobe 152b corresponds to light output by the single-sided direct illumination and two-sided indirect illumination device 1900" in the direct angular range 152.

In yet some other implementations, the illumination device 1900 is modified to output light into a single direct angular range 152 and in a single indirect angular range 162. Such illumination device configured to output direct and indirect light on a single side of a y-z plane is referred to as a single-sided direct/indirect illumination device and is denoted 1900'''. The single-sided direct/indirect illumination device 1900''' is elongated along the y-axis like the illumination device 1900 shown in FIG. 19A. Unlike the illumination device 1900, the single-sided direct/indirect illumination device 1900''' has a single-sided direct illumination portion that includes a single-sided luminaire module 200'—described above in connection with FIGS. 2A-2G—and a single direct secondary reflector 1350. The mount 1910 of the single-sided direct/indirect illumination device 1900' can support both the single-sided luminaire module 200' and the single direct secondary reflector 1350 such that light provided by the single-sided luminaire module 200' in the fourth angular range 142 is reflected by the single direct secondary reflector 1350 into a single direct angular range 152. This configuration of the single-sided direct illumination portion can be implemented as the illumination device 500' described above in connection with FIG. 5. Also, the single-sided direct/indirect illumination device 1900' has a single-sided indirect illumination portion that includes indirect LEEs 1301 and an optical coupler 1920, the latter being configured to collimate the light emitted by the indirect LEEs. The single-sided indirect illumination portion also includes a redirecting optic 1930 and a single reflector 1940. The redirecting optic 1930 has a single reflective surface arranged and configured to redirect all the collimated light provided by the optical coupler 1920 towards the single reflector 1940. The single reflector 1940 is configured to reflect the light from the redirecting optic into a single indirect angular range 162. This configuration of the single-sided indirect illumination portion can be implemented as an inverted version (relative to the x-y plane) of the single-sided illumination device 800' described above in connection with FIGS. 8A-8C. A light intensity profile in the x-z cross-section of the single-sided direct/indirect illumination device 1900''' is similar to the light intensity 101' illustrated in FIG. 1E. In this case, the light intensity profile in the x-z cross-section of the single-sided direct/indirect illumination device 1900' is represented in FIG. 19B as the curve 1901 with a single direct lobe 152b and a single indirect lobe 162b'. Here, the single direct lobe 152b corresponds to light output by the single-sided direct/indirect illumination device 1900' in the direct angular range 152 and the single indirect lobe 162b' corresponds to light output by the single-sided direct/indirect illumination device 1900' in the indirect angular range 162.

(ix) Fifth Implementation of Illumination Device Used to Provide Direct and Indirect Illumination FIG. 20A illustrates another example of an illumination device 2000 (as described above in connection with FIGS. 13A-13B including further features.) The illumination device 2000 includes a mount 2010 that is elongated along the y-axis and supports a direct illumination portion and an indirect illumination portion of the illumination device 2000. For example, the direct illumination portion of the illumination device 2000 can be implemented as the illumination device 500 described above in connection with FIG. 5. Here, the direct portion of the illumination device 2000 includes a luminaire module 200 (e.g., as described above in connection with FIG. 2A) and direct secondary reflectors 1350, 1350', as described above in connection with FIGS. 13A-13B, 14A-14B, 18 and 19. Once again, the luminaire module 200 and the direct secondary reflectors 1350, 1350' are elongated along the y-axis. Direct LEEs included in the luminaire module 200 are distributed along the y-axis on a first surface 2010a of the mount 2010. In this example, the indirect illumination portion of the illumination device 2000 includes indirect LEEs 1301 and a solid indirect optic 2020, both of which also are supported by the mount 2010.

As described above in connection with FIGS. 13A-13B, 14A-14B, 18 and 19, the luminaire module 200 and the direct secondary reflectors 1350, 1350' are arranged and configured such that the direct illumination portion of the illumination device 2000 provides light in angular ranges 152, 152' corresponding to the direct intensity distribution of the illumination device 2000. In some implementations, a prevalent direction of propagation of light in each of the angular ranges 152, 152' has a non-zero component parallel with a normal to the first surface 2010a of the mount 2010. Here, the light output by the illumination device 2000 as direct illumination in angular ranges 152, 152' corresponds to the two lobes of the light intensity 610 pattern represented in FIG. 6.

In other implementations, not illustrated in FIG. 20A, the direct illumination portion of the illumination device 2000 can be implemented as the illumination device 800 described above in connection with FIGS. 8A-8C. In such cases, the light output by the direct illumination portion of the illumination device 2000 as direct illumination in angular ranges 152, 152' corresponds to the lobes 910, 910' of the light intensity pattern represented in FIG. 9.

Referring again to FIG. 20A, the indirect LEEs are operatively arranged in a row 1301. The row of indirect LEEs 1301 includes multiple indirect LEEs distributed along the y-axis direction on a surface of the mount 2010 that is substantially parallel to the first surface 2010a of the mount and is located on an opposite side of the mount with respect to the first surface. In this case, the surface that supports the row of LEEs 1301 is oriented substantially parallel to a ceiling 1380 when the illumination device 2000 is suspended from the ceiling. The row of LEEs 1301 can be powered to emit light independently from the direct LEEs of the luminaire module 200.

The solid indirect optic 2020 is formed from a transparent material and includes a redirecting surface 2030. The solid indirect optic 2020 is elongated along the y-axis and is supported on a corresponding surface of a mount 2010 that is substantially parallel to the first surface of the mount and is located on an opposite side of the mount with respect to the first surface. In this case, the surface of the mount 2010 that supports the solid indirect optics 2020 is oriented substantially parallel to a ceiling 1380 when the illumination device 2000 is suspended from the ceiling.

The solid indirect optic 2020 is arranged and configured to redirect light emitted by the indirect LEEs 1301 in a broad angular range and to narrow an angular range thereof. A redirecting surface 2030 of the solid indirect optic 2020 has an apex 2035 in analogy with the redirecting surface 243 of the optical extractor 240 described above in connection with FIG. 2A. A cross section of the redirecting surface 2030 can be shaped as any one of the examples of redirecting surface 243 described above in connection with FIGS. 2B-2G. In some implementations, the apex 2035 and the row of indirect LEEs 1301 are parallel and coplanar. One portion of the redirecting surface 2030 is arranged and configured to output light from the solid indirect optic 2020 through TIR as first output light in angular range 162. The second portion of the redirecting surface 2030 is arranged and configured to output light from the solid indirect optic 2020 through TIR as second output light in angular range 162'. The angular ranges 162, 162' form the indirect intensity distribution of the illumination device 2000. In some implementations, a prevalent direction of propagation of light in each of the angular ranges 162, 162' has a non-zero component antiparallel with a normal to the first surface 2010a of the mount 2010.

The indirect intensity distribution may be used to indirectly illuminate the target surface with light scattered or reflected from the ceiling 1380, for instance. In some implementations, the illumination device 2000 is suspended to a ceiling 1380 using a combination of rods and wires 1308a/b.

In general, two or more of the luminaire modules 200, the direct secondary reflectors 1350, 1350', the solid indirect optics 2020, the indirect LEEs 1301 and an arrangement of the apex 2035 may be iteratively modified in their spatial position and/or optical properties (spatial shape of reflective surfaces, index of refraction of solid material, spectrum of emitted or guided light etc.) to provide a predetermined direct and/or indirect illumination distribution.

Figure 20B:
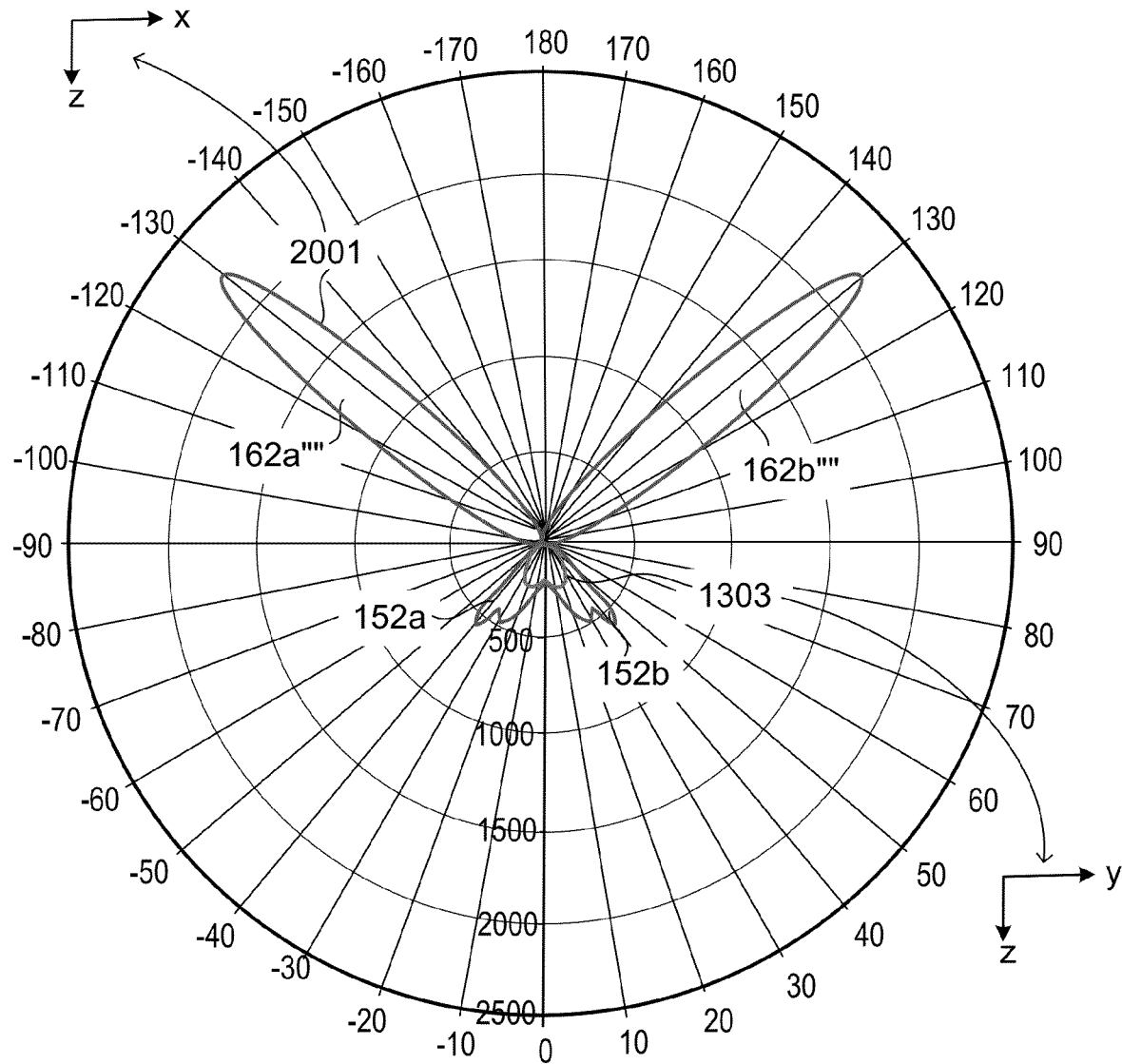

FIG. 20B shows sections of light intensity profile of suspended illumination device 2000. The curve 2001 corresponds to illumination in a cross-sectional plane (x-z) of the illumination device 2000. The curve 1303 corresponds to illumination in a symmetry plane (y-z) of the illumination device 2000. Here, the light intensity profile 1303 corresponding to direct light output by the illumination device 2000 in the y-z symmetry plane has a divergence determined only by optical power (in this plane) of the first optical coupler 220 of the luminaire module 200.

Lobes 152a, 152b of the light intensity profile 2001 correspond to direct light output by the illumination device 2000 in the x-z cross-section within the direct angular ranges 152, 152'. Here, the lobes 152a, 152b of the light intensity profile 2001 corresponding to light output by the direct illumination portion of the illumination device 2000 are similar to the two lobes of the light intensity pattern 610 represented in FIG. 6. In this example, the luminaire module 200 and the direct secondary reflectors 1350, 1350' of the direct illumination portion of the illumination device 2000 are configured to direct substantially all of the direct (e.g., forward) light 152a into a range of polar angles between −50° and −30° and all of the direct (e.g., forward) light 152b into a range of polar angles between +30° and +50° in the x-z cross-sectional plane of the illumination device 2000, where 0° corresponds to the forward direction. The forward direction is given by a normal to the first surface 2010a of the mount 2010 and, and hence, it is parallel to the light guide 230. For an illumination device mounted on a ceiling 1380, the forward direction is toward the floor.

Further, lobes 162a'''', 162b'''' of the light intensity profile 2001 correspond to indirect light output by the illumination device 2000 in the x-z cross-section within the indirect angular ranges 162, 162'. In this example, the redirecting surface 2030 of the solid indirect optic 2020 of the illumination device 2000 are configured to direct substantially all of the indirect (e.g., backward) light 162a'''' into a range of polar angles between −120° and −140° and all of the indirect (e.g., backward) light 162b'''' into a range of polar angles between +120° and +140° in the x-z cross-sectional plane of the illumination device 2000.

As the indirect LEEs 1301 can be powered independently from the direct LEEs of the luminaire module 200, multiple configurations of the light intensity profiles shown in FIG. 20B are possible for the illumination device 2000, as indicated in Table 9 below.

TABLE 9

| | Direct illumination | | | Indirect illumination | |
|---|---|---|---|---|---|
| LEE power combinations | Lobe 152a | Lobe 152b | Pattern 1303 | Lobe 162a'''' | Lobe 162b'''' |
| Direct LEEs ON; Indirect LEEs 1301 ON | ON | ON | ON | ON | ON |
| Direct LEEs ON; Indirect LEEs 1301 OFF | ON | ON | ON | OFF | OFF |
| Direct LEEs OFF; Indirect LEEs 1301 ON | OFF | OFF | OFF | ON | ON |
| Direct LEEs OFF; Indirect LEEs 1301 OFF | OFF | OFF | OFF | OFF | OFF |

In Table 9, turning direct/indirect LEEs ON causes respective direct/indirect light emission thereof to brighten over a threshold intensity value, while turning the direct/indirect LEEs OFF causes respective direct/indirect light emission thereof to dim under the threshold intensity value. In accordance with the various manners of powering the direct and indirect LEEs shown in Table 9, the following interdependent or independent ways of controlling the intensity distribution associated with the illumination device 2000 are possible: (i) direct lobes 152a, 152b of the illumination pattern 2001 in the x-z cross-section and the direct illumination pattern 1303 in the y-z symmetry plane are interdependently controlled with respect to each other; (ii) direct lobes 152a, 152b of the illumination pattern 2001 in the x-z cross-section and the direct illumination pattern 1303 in the y-z symmetry plane are independently controlled with respect to indirect lobes 162a'''', 162b'''' of the illumination pattern 2001 in the x-z cross-section; and (iii) indirect lobes 162a'''', 162b'''' of the illumination pattern 2001 in the x-z cross-section are interdependently controlled with respect to each other.

In the example implementations described above in connection with FIG. 20A, the illumination device 2000 is configured to output light into both direct angular ranges 152 and 152' and into both indirect angular ranges 162, 162'.

In other implementations, the illumination device 2000 is modified to output light into both direct angular ranges 152, 152' and into a single indirect angular range 162. Such illumination device configured to output indirect light on a single side of a y-z plane is referred to as a two-sided direct illumination and single-sided indirect illumination device and is denoted 2000'. The two-sided direct illumination and single-sided indirect illumination device 2000' is elongated along the y-axis like the illumination device 2000 shown in FIG. 20A. Also, the two-sided direct illumination and single-sided indirect illumination device 2000' and the illumination device 2000 have a common direct illumination portion including the luminaire module 200 and the direct secondary reflectors 1350, 1350'. Unlike the illumination device 2000, the two-sided direct illumination and single-sided indirect illumination device 2000' has a single-sided indirect illumination portion that includes indirect LEEs 1301 and a solid indirect optic 2020 configured to collimate the light emitted by the indirect LEEs. The solid indirect optic 2020 has a redirecting surface 2030 arranged and shaped to output light from the solid indirect optic 2020 through TIR into a single indirect angular range 162. A light intensity profile in the x-z cross-section of the two-sided direct illumination and single-sided indirect illumination device 2000' is similar to the light intensity 101' illustrated in FIG. 1C. In this case, the light intensity profile in the x-z cross-section of the two-sided direct illumination and single-sided indirect illumination device 2000' is represented in FIG. 20B as the curve 2001 with both direct lobes 152a/b and a single indirect lobe 162b''''. Here, the direct lobes 152a/b correspond to light output by the two-sided direct illumination and single-sided indirect illumination device 2000' in the direct angular ranges 152, 152' and the single indirect lobe 162b'''' corresponds to light output by the two-sided direct illumination and single-sided indirect illumination device 2000' in the indirect angular range 162.

In some other implementations, the illumination device 2000 is modified to output light into a single direct angular range 152 and in both indirect angular ranges 162, 162'. Such illumination device configured to output direct light on a single side of a y-z plane is referred to as a single-sided direct illumination and two-sided indirect illumination device and is denoted 2000''. The single-sided direct illumination and two-sided indirect illumination device 2000'' is elongated along the y-axis like the illumination device 2000 shown in FIG. 20A. Also, the single-sided direct illumination and two-sided indirect illumination device 2000'' and the illumination device 2000 have a common indirect illumination portion including indirect LEEs 1301 and a solid indirect optic 2020. Here, a redirecting surface 2030 of the solid indirect optic has an apex 2035 to separate the redirecting surface 2030 into two portions. Unlike the illumination device 2000, the single-sided direct illumination and two-sided indirect illumination device 2000'' has a single-sided direct illumination portion that includes a single-sided luminaire module 200'—described above in connection with FIGS. 2A-2G—and a single direct secondary reflector 1350. The mount 2010 of the single-sided direct illumination and two-sided indirect illumination device 2000'' can support both the single-sided luminaire module 200' and the single direct secondary reflector 1350 such that light provided by the single-sided luminaire module 200' in the fourth angular range 142 is reflected by the single direct secondary reflector 1350 into a single direct angular range 152. This configuration of the direct illumination portion can be implemented as the single-sided illumination device 500' described above in connection with FIG. 5. A light intensity profile in the x-z cross-section of the single-sided direct illumination and two-sided indirect illumination device 2000'' is similar to the light intensity 101'' illustrated in FIG. 1D. In this case, the light intensity profile in the x-z cross-section of the single-sided direct illumination and two-sided indirect illumination device 2000'' is represented in FIG. 20B as the curve 2001 with both indirect lobes 162a''''/b'''' and a single direct lobe 152b. Here, the indirect lobes 162a''/b'' correspond to light output by the single-sided direct illumination and two-sided indirect illumination device 2000'' in the indirect angular ranges 162, 162', and the single direct lobe 152b corresponds to light output by the single-sided direct illumination and two-sided indirect illumination device 2000'' in the direct angular range 152.

In yet some other implementations, the illumination device 2000 is modified to output light into a single direct angular range 152 and in a single indirect angular range 162. Such illumination device configured to output direct and indirect light on a single side of a y-z plane is referred to as a single-sided direct/indirect illumination device and is denoted 2000'''. The single-sided direct/indirect illumination device 2000''' is elongated along the y-axis like the illumination device 2000 shown in FIG. 20A. Unlike the illumination device 2000, the single-sided direct/indirect illumination device 2000''' has a single-sided direct illumination portion that includes a single-sided luminaire module 200'—described above in connection with FIGS. 2A-2G—and a single direct secondary reflector 1350. The mount 2010 of the single-sided direct/indirect illumination device 2000' can support both the single-sided luminaire module 200' and the single direct secondary reflector 1350 such that light provided by the single-sided luminaire module 200' in the fourth angular range 142 is reflected by the single direct secondary reflector 1350 into a single direct angular range 152. This configuration of the single-sided direct illumination portion can be implemented as the illumination device 500' described above in connection with FIG. 5. Also, the single-sided direct/indirect illumination device 1800' has a single-sided indirect illumination portion that includes indirect LEEs 1301 and a solid indirect optic 2020, the latter being configured to collimate the light emitted by the indirect LEEs. The solid indirect optic 2020 has a redirecting surface 2030 arranged and shaped to output light from the solid indirect optic 2020 through TIR into a single indirect angular range 162. A light intensity profile in the x-z cross-section of the single-sided direct/indirect illumination device 2000' is similar to the light intensity 101''' illustrated in FIG. 1E. In this case, the light intensity profile in the x-z cross-section of the single-sided direct/indirect illumination device 2000''' is represented in FIG. 20B as the curve 2001 with a single direct lobe 152b and a single indirect lobe 162b''''. Here, the single direct lobe 152b corresponds to light output by the single-sided direct/indirect illumination device 2000' in the direct angular range 152 and the single indirect lobe 162b'''' corresponds to light output by the single-sided direct/indirect illumination device 2000''' in the indirect angular range 162.

The term "light-emitting element" (LEE), also referred to as a light emitter, is used herein to denote any device that emits radiation in one or more regions of the electromagnetic spectrum from among the visible region, the infrared region and/or the ultraviolet region, when activated. Activation of an LEE can be achieved by applying a potential difference across components of the LEE or passing a current through components of the LEE, for example. A light-emitting element can have monochromatic, quasi-monochromatic, polychromatic or broadband spectral emission characteristics. Examples of light-emitting elements include semiconductor, organic, polymer/polymeric light-emitting diodes (e.g., organic light-emitting diodes, OLEDs), other monochromatic, quasi-monochromatic or other light-emitting elements. Furthermore, the term light-emitting element is used to refer to the specific device that emits the radiation, for example a LED die, and can equally be used to refer to a combination of the specific device that emits the radiation (e.g., a LED die) together with a housing or package within which the specific device or devices are placed. Examples of light emitting elements include also lasers and more specifically semiconductor lasers, such as vertical cavity surface emitting lasers (VCSELs) and edge emitting lasers. Further examples include superluminescent diodes and other superluminescent devices.

Providing light in an "angular range" refers to providing light that propagates in a prevalent direction and has a divergence with respect to the propagation direction. In this context, the term "prevalent direction of propagation" refers to a direction along which a portion of an intensity distribution of the propagating light has a maximum. For example, the prevalent direction of propagation associated with the angular range can be an orientation of a lobe of the intensity distribution. Also in this context, the term "divergence" refers to a solid angle outside of which the intensity distribution of the propagating light drops below a predefined fraction of a maximum of the intensity distribution. For example, the divergence associated with the angular range can be the width of the lobe of the intensity distribution. The predefined fraction can be 10%, 5%, 1%, or other values, depending on the lighting application.

An angular range includes (i) a divergence of the angular range and (ii) a prevalent direction of propagation of light in the angular range, where the prevalent direction of propagation corresponds to a direction along which a portion of an emitted light intensity distribution has a maximum, and the divergence corresponds to a solid angle outside of which the intensity distribution drops below a predefined fraction of the maximum of the intensity distribution. E.g., the predefined fraction is 5%.

The preceding figures and accompanying description illustrate example methods, systems and devices for illumination. It will be understood that these methods, systems, and devices are for illustration purposes only and that the described or similar techniques may be performed at any appropriate time, including concurrently, individually, or in combination. In addition, many of the steps in these processes may take place simultaneously, concurrently, and/or in different orders than as shown. Moreover, the described methods/devices may use additional steps/parts, fewer steps/parts, and/or different steps/parts, as long as the methods/devices remain appropriate.

In other words, although this disclosure has been described in terms of certain aspects or implementations and generally associated methods, alterations and permutations of these aspects or implementations will be apparent to those skilled in the art. Accordingly, the above description of example implementations does not define or constrain this disclosure. Further implementations are described in the following claims.

What is claimed is:

1. An illumination device, comprising:
a mount having a first surface, the first surface being elongated and having a longitudinal dimension and a transverse dimension shorter than the longitudinal dimension;
a direct illumination portion of the illumination device supported by the mount; and an indirect illumination portion of the illumination device supported by the mount, wherein the direct illumination portion of the illumination device comprises:
multiple direct light-emitting elements (LEEs) operatively disposed along the first surface of the mount and distributed along the longitudinal dimension, such that the direct LEEs emit, during operation, light in a first direct angular range with respect to a normal to the first surface of the mount, and
direct optics arranged in an elongated configuration along the longitudinal dimension of the first surface and optically coupled with the direct LEEs, the direct optics configured to redirect light received from the direct LEEs in the first direct angular range, and to output the redirected light in a second direct angular range, wherein the direct optics comprise:
a light guide, a redirecting surface and one or more direct secondary reflectors, such that
the light guide guides light emitted by the direct LEEs from an input end to an output end of the light guide,
the light guided by the light guide is reflected by the redirecting surface to the one or more direct secondary reflectors,
a direction of propagation of the light reflected by the redirecting surface has a non-zero component antiparallel with the normal to the first surface of the mount, and
the light reflected by the redirecting surface is reflected by the one or more direct secondary reflectors in the second direct angular range as direct illumination provided by the illumination device, wherein (i) a divergence of the second direct angular range is smaller than a divergence of the first direct angular range in a plane perpendicular to the longitudinal dimension of the first surface of the mount, and (ii) a prevalent direction of propagation of light in the second direct angular range has a non-zero component parallel with the normal to the first surface of the mount,
wherein the indirect portion of the illumination device comprises:
multiple indirect LEEs operatively disposed along another surface of the mount different from the first surface and distributed along the longitudinal dimension, such that the indirect LEEs emit, during operation, light in a first indirect angular range with respect to the normal to the first surface of the mount, and
indirect optics arranged in an elongated configuration along the longitudinal dimension of the first surface and optically coupled with the indirect LEEs, the indirect optics configured to redirect light received from the indirect LEEs in the first indirect angular range, and to output the redirected light in a second indirect angular range, wherein (i) a divergence of the second indirect angular range is smaller than a divergence of the first indirect angular range in a plane perpendicular to the longitudinal dimension of the first surface of the mount, and (ii) a prevalent direction of propagation of light in the second indirect angular range has a non-zero component antiparallel with the normal to the first surface of the mount, and
wherein the multiple indirect LEEs are powered independently from the direct LEEs.

2. The illumination device of claim 1, wherein
the one or more direct secondary reflectors comprise two direct secondary reflectors,
the light reflected by the redirecting surface is reflected by the two direct secondary reflectors in the second direct angular range and in a third direct angular range as direct illumination provided by the illumination device, and prevalent directions of propagation of light in both the second and third direct angular ranges have non-zero components parallel with the normal to the first surface of the mount and have non-zero components perpendicular to the normal to the first surface of the mount that are antiparallel with each other.

3. The illumination device of claim 1, wherein
the multiple indirect LEEs comprise a first set of multiple indirect LEEs that emit light in the first indirect angular range, such that prevalent direction of propagation of light in the first indirect angular range is oblique relative to the normal to the first surface of the mount, and
the indirect optics comprise a first indirect reflector that reflects the light emitted by the first set of multiple indirect LEEs in the first indirect angular range in the second indirect angular range, such that a prevalent direction of propagation of light output as indirect illumination provided by the illumination device in the second indirect angular range has a non-zero component antiparallel with the normal to the first surface of the mount.

4. The illumination device of claim 3 wherein
the multiple indirect LEEs further comprise a second set of multiple indirect LEEs that emit light in a third indirect angular range, such that prevalent directions of propagation of light in the first and third indirect angular ranges are oblique relative to the normal to the first surface of the mount, and have non-zero components perpendicular to the normal to the first surface of the mount that are antiparallel with each other, and
the indirect optics further comprise a second indirect reflector that reflects the light emitted by the second set of multiple indirect LEEs in the third indirect angular range in a fourth indirect angular range, such that prevalent directions of propagation of light output as indirect illumination provided by the illumination device in both the second and fourth indirect angular ranges have non-zero components antiparallel with the normal to the first surface of the mount and have non-zero components perpendicular to the normal to the first surface of the mount that are antiparallel with each other.

5. The illumination device of claim 3, wherein the indirect optics further comprise a third indirect reflector, such that the first and third indirect reflectors reflect the light emitted by the first set of multiple indirect LEEs in the first indirect angular range in the second indirect angular range.

6. The illumination device of claim 4, wherein the indirect optics further comprise a third indirect reflector and a fourth indirect reflector, such that
the first and third indirect reflectors reflect the light emitted by the first set of multiple indirect LEEs in the first indirect angular range in the second indirect angular range, and
the second and fourth indirect reflectors reflect the light emitted by the second set of multiple indirect LEEs in the third indirect angular range in the fourth indirect angular range.

7. The illumination device of claim 5 wherein the third indirect reflector has apertures that allow light reflected by the first indirect reflector in a fifth angular range to pass through the apertures of the third indirect reflector, such that a prevalent direction of propagation of light output as indirect illumination provided by the illumination device in the fifth indirect angular range has a non-zero component antiparallel with the normal to the first surface of the mount.

8. The illumination device of claim 6 wherein
the third indirect reflector has apertures that allow light reflected by the first indirect reflector in a fifth angular range to pass through the apertures of the third indirect reflector, and
the fourth indirect reflector has apertures that allow light reflected by the second indirect reflector in a sixth angular range to pass through the apertures of the fourth indirect reflector, such that prevalent directions of propagation of light output as indirect illumination provided by the illumination device in both the fifth and sixth indirect angular ranges have non-zero components antiparallel with the normal to the first surface of the mount and have non-zero components perpendicular to the normal to the first surface of the mount that are antiparallel with each other.

9. The illumination device of claim 1, wherein
the multiple indirect LEEs comprise a first set of multiple indirect LEEs that emit light in the first indirect angular range, such that a prevalent direction of propagation of light in the first indirect angular range is antiparallel with the normal to the first surface of the mount, and
the indirect optics comprise a first indirect reflector that reflects the light emitted by the first set of multiple indirect LEEs in the first indirect angular range in the second indirect angular range, such that prevalent directions of propagation of light output as indirect illumination provided by the illumination device in the second indirect angular range has a non-zero component antiparallel with the normal to the first surface of the mount.

10. The illumination device of claim 9 wherein
the multiple indirect LEEs further comprise a second set of multiple indirect LEEs that emit light in a third indirect angular range, such that a prevalent direction of propagation of light in the third indirect angular range is antiparallel with the normal to the first surface of the mount, and
the indirect optics further comprise a second indirect reflector that reflects the light emitted by the second set of multiple indirect LEEs in the third indirect angular range in a fourth indirect angular range, such that prevalent directions of propagation of light output as indirect illumination provided by the illumination device in both the second and fourth indirect angular ranges have non-zero components antiparallel with the normal to the first surface of the mount and have non-zero components perpendicular to the normal to the first surface of the mount that are antiparallel with each other.

11. The illumination device of claim 10, wherein the first set of multiple indirect LEEs are powered independently from the second set of multiple indirect LEEs.

12. An illumination device, comprising:
a mount having a first surface, the first surface being elongated and having a longitudinal dimension and a transverse dimension shorter than the longitudinal dimension;
a direct illumination portion of the illumination device supported by the mount; and
an indirect illumination portion of the illumination device supported by the mount,
wherein the direct portion of the illumination device comprises:
multiple direct light-emitting elements (LEEs) operatively disposed along the first surface of the mount and distributed along the longitudinal dimension, such that the direct LEEs emit, during operation, light in a first direct angular range with respect to a normal to the first surface of the mount, and
direct optics arranged in an elongated configuration along the longitudinal dimension of the first surface and optically coupled with the direct LEEs, the direct optics configured to redirect light received from the direct LEEs in the first direct angular range, and to output the redirected light in a second direct angular range, wherein (i) a divergence of the second direct angular range is smaller than a divergence of the first direct angular range in a plane perpendicular to the longitudinal dimension of the first surface of the mount, and (ii) a prevalent direction of propagation of light in the second direct angular range has a non-zero component parallel with the normal to the first surface of the mount,
wherein the indirect portion of the illumination device comprises:
multiple indirect LEEs operatively disposed along another surface of the mount different from the first surface and distributed along the longitudinal dimension, such that the indirect LEEs emit, during operation, light in a first indirect angular range with respect to the normal to the first surface of the mount, and indirect optics arranged in an elongated configuration along the longitudinal dimension of the first surface and optically coupled with the indirect LEEs, the indirect optics configured to redirect light received from the indirect LEEs in the first indirect angular range, and to output the redirected light in a second indirect angular range, wherein the indirect optics comprise an indirect optical coupler, an indirect redirecting surface and a first indirect reflector, such that the indirect optical coupler is spaced apart from the indirect redirecting surface such that light emitted by the indirect LEEs in the first indirect angular range that is redirected by the indirect optical coupler impinges on the indirect redirecting surface, the indirect redirecting surface redirects a first portion of the impinging light to the first indirect reflector, and the first indirect reflector reflects the first portion of the impinging light redirected by the indirect redirecting surface in the second indirect angular range, such that a prevalent direction of propagation of light output as indirect illumination by the illumination device in the second indirect angular range has a non-zero component antiparallel with the normal to the first surface of the mount, and a divergence of the second indirect angular range is smaller than a divergence of the first indirect angular range in a plane perpendicular to the longitudinal dimension of the first surface of the mount, and wherein the multiple indirect LEEs are powered independently from the direct LEEs.

13. The illumination device of claim 12 wherein the indirect optics further comprise a second indirect reflector that reflects a second portion of the impinging light redirected by the redirecting surface in a third indirect angular range, such that prevalent directions of propagation of light output as indirect illumination by the illumination device in both the second and third indirect angular ranges have non-zero components antiparallel with the normal to the first surface of the mount and have non-zero components perpendicular to the normal to the first surface of the mount that are antiparallel with each other.

14. The illumination device of claim 1, wherein the prevalent direction of propagation of light in the second indirect angular range is antiparallel with the normal to the first surface of the mount, and the indirect optics comprise a solid indirect optic, such that a first portion of the light emitted by the indirect LEEs in the first indirect angular range is redirected by a redirecting surface of the solid indirect optic into the second indirect angular range, such that a prevalent direction of propagation of light output as indirect illumination by the illumination device in the second indirect angular range has a non-zero component antiparallel with the normal to the first surface of the mount.

15. The illumination device of claim 14 wherein a second portion of the light emitted by the indirect LEEs in the first indirect angular range is redirected by the redirecting surface into a third indirect angular range, and such that prevalent directions of propagation of light output as indirect illumination by the illumination device in both the second and third indirect angular ranges have non-zero components antiparallel with the normal to the first surface of the mount and have non-zero components perpendicular to the normal to the first surface of the mount that are antiparallel with each other.

16. The illumination device of claim 4, wherein the first set of multiple indirect LEEs are powered independently from the second set of multiple indirect LEEs.

17. The illumination device of claim 12, wherein the direct optics comprise a light guide, a redirecting surface and one or more direct secondary reflectors, such that the light guide guides light emitted by the direct LEEs from an input end to an output end of the light guide, the light guided by the light guide is reflected by the redirecting surface to the one or more direct secondary reflectors, a direction of propagation of the light reflected by the redirecting surface has a non-zero component antiparallel with the normal to the first surface of the mount, and the light reflected by the redirecting surface is reflected by the one or more direct secondary reflectors at least in the second direct angular range as direct illumination provided by the illumination device.

* * * * *